(12) United States Patent
Yamakawa et al.

(10) Patent No.: US 8,432,591 B2
(45) Date of Patent: Apr. 30, 2013

(54) LIGHT IRRADIATION DEVICE FOR RECORDING INFORMATION IN A HOLOGRAM RECORDING MEDIUM

(75) Inventors: Akio Yamakawa, Tokyo (JP); Yoshiki Okamoto, Kanagawa (JP); Kenji Tanaka, Tokyo (JP); Kazutatsu Tokuyama, Tokyo (JP); Koji Takasaki, Chiba (JP)

(73) Assignee: Sony Corporation, Tokyo (JP)

( * ) Notice: Subject to any disclaimer, the term of this patent is extended or adjusted under 35 U.S.C. 154(b) by 595 days.

(21) Appl. No.: 12/704,587

(22) Filed: Feb. 12, 2010

(65) Prior Publication Data

US 2010/0245955 A1 Sep. 30, 2010

(30) Foreign Application Priority Data

Mar. 27, 2009 (JP) ................................. 2009-078995

(51) Int. Cl.
*G03H 1/04* (2006.01)
(52) U.S. Cl.
USPC .............................. 359/35; 359/11; 369/103
(58) Field of Classification Search .................. None
See application file for complete search history.

(56) References Cited

U.S. PATENT DOCUMENTS

| | | | |
|---|---|---|---|
| 2005/0135217 A1* | 6/2005 | Tateishi et al. | 369/103 |
| 2007/0223348 A1* | 9/2007 | Sasaki | 369/103 |
| 2007/0292803 A1* | 12/2007 | Matsumoto et al. | 430/270.1 |
| 2010/0182663 A1* | 7/2010 | Yamakawa et al. | 359/11 |
| 2010/0265808 A1* | 10/2010 | Yamakawa et al. | 369/103 |

FOREIGN PATENT DOCUMENTS

JP 2007-079438 3/2009

* cited by examiner

*Primary Examiner* — Arnel C Lavarias
(74) *Attorney, Agent, or Firm* — Robert J. Depke; The Chicago Technology Law Group, LLC

(57) ABSTRACT

A light irradiation device includes: a focus servo control unit including a light source, a spatial light modulating unit, and a light irradiating unit, for focus servo control so that the ideal focal position of light via an objective lens is such that distance between an ideal focal position and a hologram recording medium surface is smaller than distance from the surface to the lower layer side face of the recording layer, and the focal position of light via the objective lens is constant at the ideal focal position; an objective-lens/relay-lens distance adjusting unit to adjust distance between the objective lens and a relay lens close to the objective lens; a light reception unit to receive marker light; and a constant distance control unit to control the objective-lens/relay-lens distance adjusting unit based on error between the ideal position of the marker light, and the actual position of the marker light.

11 Claims, 26 Drawing Sheets

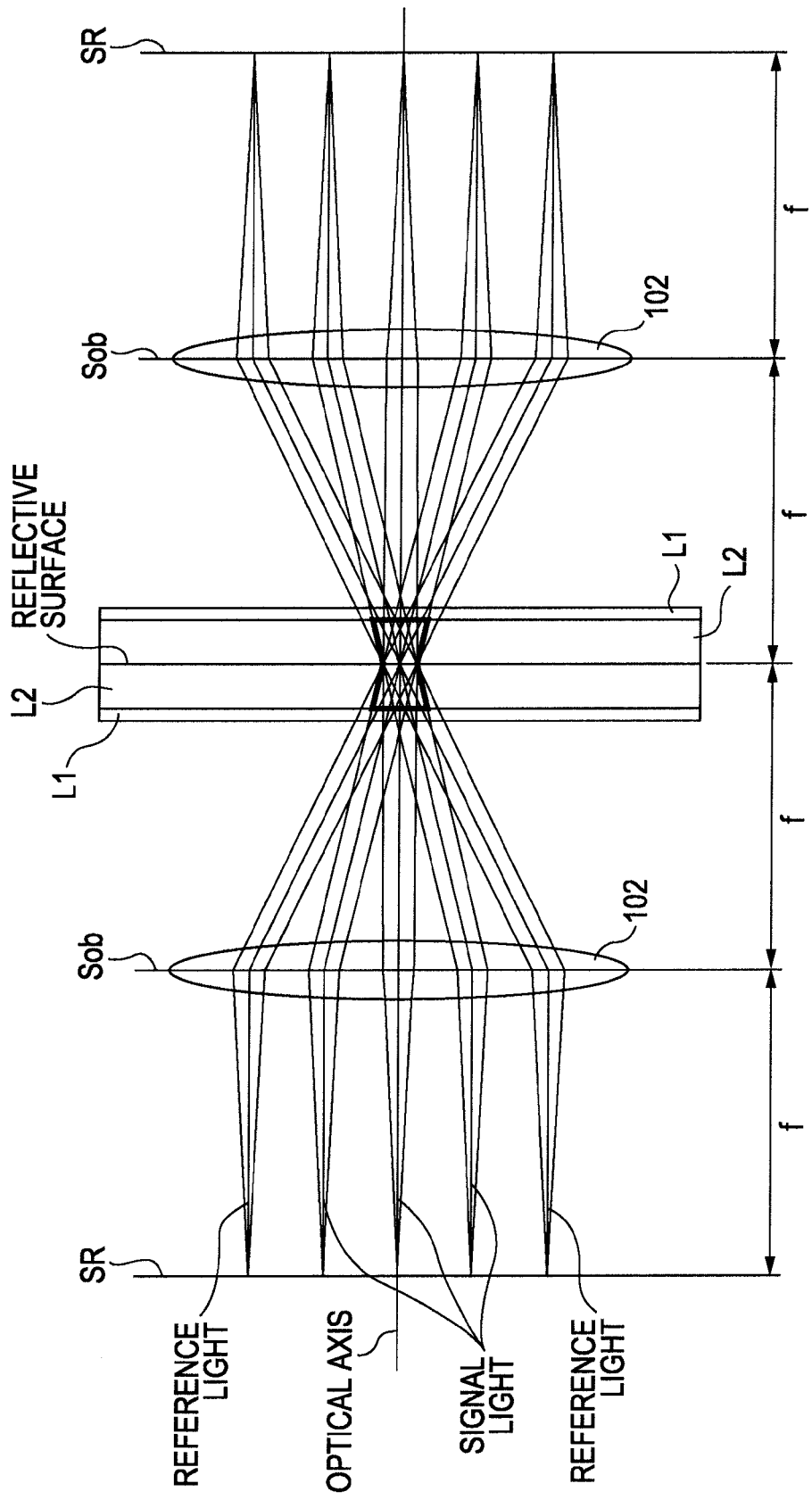

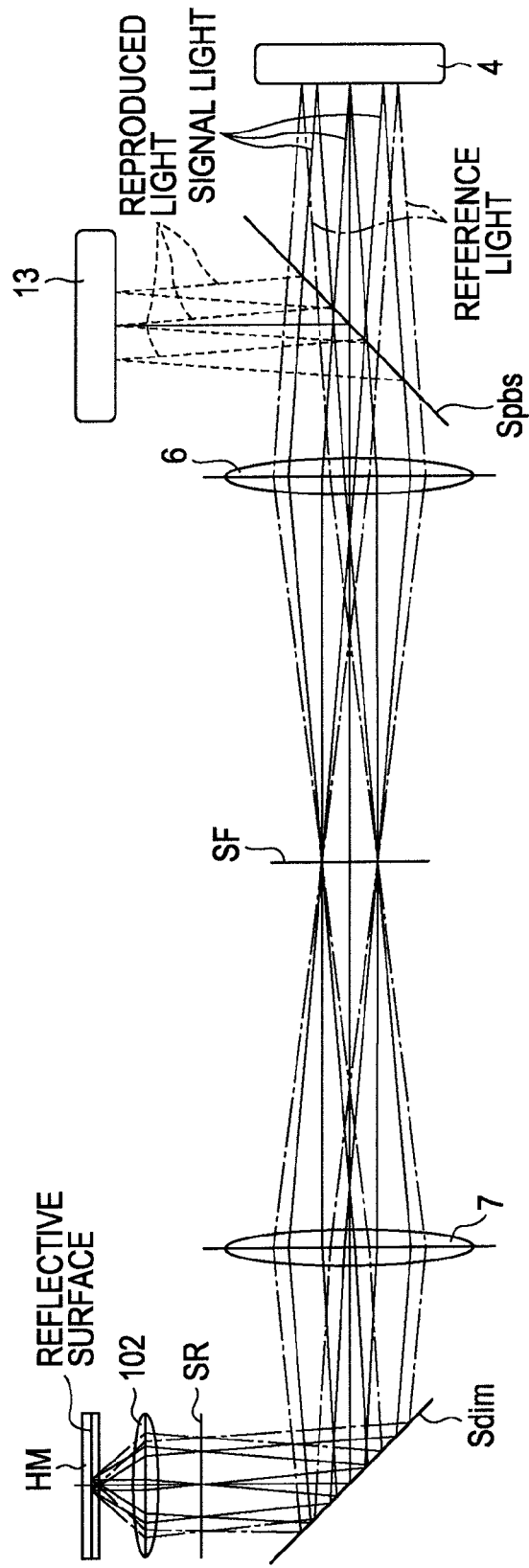

LIGHT IRRADIATION DEVICE FOR RECORDING INFORMATION IN A HOLOGRAM RECORDING MEDIUM

The present application contains subject matter related to that disclosed in Japanese Priority Patent Application JP 2009-078995 filed in the Japan Patent Office on Mar. 27, 2009, the entire content of which is hereby incorporated by reference.

BACKGROUND OF THE INVENTION

1. Field of the Invention

The present invention specifically relates to, of light irradiation devices which irradiate light on a hologram recording medium, a light irradiation device including a mechanism for adjusting distance between an objective lens and a relay lens, and also relates to a control method for controlling the distance between the objective lens and the relay lens so as to be constant.

2. Description of the Related Art

The hologram recording/reproducing method for executing recording of data using a hologram format has been in practical use, as disclosed in Japanese Unexamined Patent Application Publication No. 2007-79438 for example. With the hologram recording/reproducing method, at the time of recording, signal light to which spatial light intensity modulation (intensity modulation) according to data to be recorded is applied, and reference light to which a predetermined light intensity pattern is applied are generated, and these are irradiated on a hologram recording medium, thereby forming a hologram on a recording medium to execute recording of data.

Also, at the time of reproducing, the reference light is irradiated on a recording medium. Thus, the same reference light as at the time of recording (having the same intensity pattern as at the time of recording) is irradiated on the hologram formed according to irradiation of signal light and reference light at the time of recording, thereby obtaining diffracted light according to the recording signal light component. That is to say, the reproduced image corresponding to data thus recorded (reproduced light) is obtained. The reproduced light thus obtained is detected by an image sensor, for example, such as a CCD (Charge Coupled Device) sensor, a CMOS (Complementary Metal Oxide Semiconductor) sensor, or the like, thereby reproducing recorded information.

Also, as such a hologram recording/reproducing method, so-called coaxial method has been in use wherein reference light and signal light are disposed on the same optical axis, and these are irradiated on a hologram recording medium via a common objective lens.

Here, with the hologram recording/reproducing method, the signal light is made up of data of zeroes and ones being arrayed two-dimensionally by an on/off pattern of light being applied as a light intensity pattern. That is to say, the signal light handles multiple bits worth of information of recorded data. With the hologram recording/reproducing method, the increments of multiple bits worth of data that can be arrayed within the signal light are taken as the minimum increments of recording/reproducing. A hologram to be recorded with one-time interference between the signal light and reference light is referred to as "hologram page" in that multiple data bits are included such as described above.

With the hologram recording/reproducing system, data is sequentially recorded in increments of such hologram pages. Currently, with the system using the above coaxial method in particular, an arrangement can be conceived to execute recording of data in increments of such hologram pages while rotationally driving a disc-shaped recording medium such as an optical disc system such as CD (Compact Disc) or DVD (Digital Versatile Disc) according to the related art, or the like.

In this case, tracks are formed spirally or concentrically as to a disc-shaped hologram recording medium beforehand, and formation of a hologram according to irradiation of signal light/reference light is executed sequentially while tracing the tracks, thereby forming a hologram page along the tracks.

In the case of using the technique for thus forming a hologram page at a position along with the tracks, control of recording/reproducing position has to be executed, such as tracking servo for tracing a beam spot on the tracks, or access control as to a predetermined address, or the like.

Currently, it has also been conceived to irradiate a dedicated laser beam separately at the time of executing such control of a recording/reproducing position. That is to say, this is a technique for irradiating a laser beam used for recording/reproducing a hologram (laser beam for irradiating signal light/reference light; laser beam for recording/reproducing), and a laser beam used for controlling the recording/reproducing position of a hologram (laser beam for position control) separately.

In order to handle such a technique for irradiating a laser beam used for position control separately, the hologram recording medium is configured so as to have a cross-sectional configuration such as shown in FIG. 22, for example.

With the hologram recording medium HM shown in FIG. 22, a recording layer L1 where recording of a hologram is executed, and a position control information recording layer where address information for position control, and the like are recorded with an uneven cross-sectional configuration on the substrate L6, are formed separately.

Specifically, with the hologram recording medium HM, a cover layer L1, a recording layer L2, a reflective film L3, an intermediate layer L4, a reflective film L5, and a substrate L6 are formed. The reflective film L3 which is formed on the lower layer of the recording layer L2 is provided, on which reference light according to the laser beam for recording/reproducing is irradiated at the time of reproducing, and when the reproduced image corresponding to the hologram recorded on the recording layer L2 is obtained, to return this to the device side as reflected light.

Also, with the substrate L6, a track for guiding the recording/reproducing position of a hologram on the recording layer L2 is formed spirally or concentrically. For example, the track is formed by recording of information such as address information by a pit row, or the like being executed.

The reflective film L5 formed on the upper layer of the substrate L6 is provided to obtain reflected light regarding the information recorded on the substrate L6. Note that the intermediate layer L4 is provided as an adhesive material, for example, such as a resin or the like.

Here, in order to execute suitable position control based on the reflected light of the laser beam for position control regarding the hologram recording medium HM having the cross-sectional configuration such as described above, the laser beam for position control has to reach as far as a reflective film L5 to which an uneven cross-sectional shape is given. That is to say, from this point of view, the laser beam for position control has to transmit the reflective film L3 formed on an upper layer than the reflective film L5.

On the other hand, in order to return the reproduced image corresponding to the hologram recorded on the recording layer L2 to the device side as reflected light, the reflective film L3 has to reflect the laser beam for recording/reproducing.

These points are taken into consideration, and accordingly, a laser beam having a different wavelength from the laser beam for recording/reproducing a hologram is used as the laser beam for position control. For example, a blue-violet laser beam with a wavelength $\lambda=405$ nm or so is used as the laser beam for recording/reproducing a hologram, and on the other hand, for example, a red laser beam with a wavelength $\lambda=650$ nm or so is used as the laser beam for position control.

Thereupon, a reflective file having wavelength selectivity that the blue-violet laser beam for recording/reproducing is reflected, the red laser beam for position control is transmitted is used as the reflective film L3 formed between the recording layer L2 and the reflective film L5 where recording of position control information has been executed.

According to such a configuration, at the time of recording/reproducing, the laser beam for position control reaches the reflective film L5, and reflected light information for position control is suitably detected, and also the reproduced image of the hologram recorded on the recording layer L2 is suitably detected on the device side.

FIG. 23 is a diagram illustrating the configuration of a recording/reproducing device serving as an example of the related art for executing recording/reproducing as to the hologram recording medium HM having the above configuration (principally regarding the optical system alone) in a simple manner.

First, with the recording/reproducing device, an optical system for irradiating signal light and reference light for recording/reproducing of a hologram is provided with a first laser 1, a collimation lens 2, a polarized beam splitter 3, an SLM 4, a polarized beam splitter 5, a relay lens 6, a relay lens 7, a dichroic mirror 8, a partial diffraction element 9, a quarter-wave plate 10, an objective lens 102, and an image sensor 13.

The first laser 1 outputs, for example, the above blue-violet laser beam with a wavelength $\lambda=405$ nm or so as the laser beam for recording/reproducing a hologram. The laser beam emitted from the first laser 1 is input to the polarized beam splitter 3 via the collimation lens 2.

The polarized beam splitter 3 transmits, of linear polarized light components orthogonal to each input laser beam, one of the linear polarized light components, and reflects the other linear polarized light component. For example, in this case, the polarized beam splitter 3 is configured so as to transmit a p-polarized light component, and reflect an s-polarized light component. Accordingly, with the laser beam input to the polarized beam splitter 3, the s-polarized light component alone is reflected so as to be guided to the SLM 4.

The SLM 4 is configured so as to include a reflection-type liquid crystal element serving as an FLC (Ferroelectric Liquid Crystal) for example, and is configured so as to control the polarization direction as to incident light in increments of pixels.

This SLM 4 executes spatial light modulation for each pixel, so as to change the polarization direction of incident light 90 degrees, or so as not to change the polarization direction of incident light, according to the driving signal from the modulation control unit 101 in the drawing. Specifically, the SLM 4 is configured so as to execute polarization direction control in increments of pixels according to the driving signal so that angular change in the polarization direction is 90 degrees regarding a pixel of which the driving signal is turned on, and angular change in the polarization direction is 0 degree regarding a pixel of which the driving signal is turned off.

As shown in the drawing, the emission light from the SLM 4 (light reflected at the SLM 4) is input to the polarized beam splitter 3 again. Here, the recording/reproducing device shown in FIG. 23 executes polarization direction control in increments of pixels by the SLM 4, and spatial light intensity modulation (light intensity modulation, or simply referred to as "intensity modulation") in increments of pixels by taking advantage of the selective transmission/reflection properties of the polarized beam splitter 3 according to the polarization direction of incident light.

FIGS. 24A and 24B illustrate the imaginary of intensity modulation realized by a combination between such an SLM 4 and a polarized beam splitter 3. FIG. 24A schematically illustrates the light of a pixel of which the driving signal is on, and FIG. 24B schematically illustrates the light of a pixel of which the driving signal is off, respectively.

As also described above, the polarized beam splitter 3 transmits p-polarized light, and reflects s-polarized light, and consequently, s-polarized light is input to the SLM 4.

According to this premise, the light of a pixel of which the polarization direction is changed 90 degrees by the SLM 4 (light of a pixel of which driving signal is on) is input to the polarized beam splitter 3 using the p-polarized light. Thus, the light of a pixel of which the driving signal is on at the SLM 4 transmits the polarized beam splitter 3, and is guided to the hologram recording medium HM side (FIG. 24A).

On the other hand, the light of a pixel of which the driving signal is off, and the polarization direction is not changed is input to the polarized beam splitter 3 using the s-polarized light. That is to say, the light of a pixel of which the driving signal is off at the SLM 4 is reflected at the polarized beam splitter 3, and is guided to the hologram recording medium HM side (FIG. 24B).

Thus, an intensity modulating unit configured to subject to light intensity modulation in increments of pixels is made up of a combination between the polarization direction control-type SLM 4 and the polarized beam splitter 3. According to such an intensity modulating unit, signal light and reference light are generated at the time of recording, and reference light is generated at the time of reproducing.

The laser beam for recording/reproducing subjected to spatial light modulation by the intensity modulating unit is input to the polarized beam splitter 5. This polarized beam splitter 5 is also configured so as to transmit p-polarized light and reflect s-polarized light, and accordingly, the laser beam emitted from the intensity modulating unit (light transmitted through the polarized beam splitter 3) transmits the polarized beam splitter 5.

The laser beam transmitted through the polarized beam splitter 5 is input to a relay lens system where the relay lens 6 and the relay lens 7 are disposed in this order. As shown in the drawing, the light flux of the laser beams transmitted through the polarized beam splitter 5 condenses in a predetermined focal position by the relay lens 6, and the laser beam flux which is diffusion light after condensing is converted into parallel beams by the relay lens 7.

The laser beam passed through the relay lens system is input to the dichroic mirror 8. The dichroic mirror 8 is configured so as to selectively reflect light according to a predetermined wavelength band. Specifically, this case is configured so as to selectively reflect the light of the wavelength band of the laser beam for recording/reproducing according to a wavelength $\lambda$ of 405 nm or so. Accordingly, the laser beam for recording/reproducing input via the relay lens system is reflected at the dichroic mirror 8.

The laser beam for recording/reproducing reflected at the dichroic mirror 8 is input to the objective lens 102 via the partial diffraction element 9 and the quarter-wave plate 10. The partial diffraction element 9 and the quarter-wave plate 10 are provided to prevent reference light, reflected at the hologram recording medium HM at the time or reproducing (reflected reference light), from being guided to the image sensor 13 and becoming noise in the reproduced light. Note that the suppression operation of reflected reference light by the partial diffraction element 9 and the quarter-wave plate 10 will be described later.

The objective lens 102 is held movably in the focus direction (direction toward/away from the hologram recording medium HM) by a focus actuator 12 shown in the drawing. The later-described position control unit 19 controls the driving operation of the objective lens 102 by the focus actuator 12, and accordingly, the focus servo control of the laser beam is executed.

Note that while omitted from the drawings, control of the tracking direction of the laser beam (the radial direction of the hologram recording medium HM) can be executed, for example, by controlling a tracking driving unit configured to drive the whole of the optical system in the tracking direction, or the like.

The laser beam for recording/reproducing is irradiated on the hologram recording medium HM so as to condense by the objective lens 102. Here, as also described above, at the time of recording, signal light and reference light are generated by intensity modulation by the intensity modulating unit (SLM 4 and polarized beam splitter 3), and the signal light and reference light are irradiated on the hologram recording medium 100 using the routes described above. Thus, a hologram to which recorded data is reflected using an interference pattern between the signal light and the reference light is formed on the recording layer L2, and data recording is realized.

Also, at the time of reproducing, the reference light alone is generated by the intensity modulating unit, and is irradiated on the hologram recording medium HM using the above route. The reference light is thus irradiated, and accordingly, the reproduced image corresponding to the hologram formed on the recording layer L2 is obtained as the reflected light from the reflective film L3. This reproduced image is returned to the device side via the objective lens 102.

Here, the reference light irradiated on the hologram recording medium HM at the time of reproducing (referred to as "outbound reference light") is input to the partial diffraction element 9 using the p-polarized light according to the operation of the previous intensity modulating unit. As also described later, the partial diffraction element 9 is configured so as to transmit all outbound light, and accordingly, the outbound reference light using the p-polarized light is passed through the quarter-wave plate 10. Thus, the outbound reference light using the p-polarized light via the quarter-wave plate 10 is converted into circularly polarized light in a predetermined rotational direction, and is irradiated on the hologram recording medium HM.

The reference light irradiated on the hologram recording medium HM is reflected at the reflective film L3, and is guided to the objective lens 102 as reflected reference light (inbound reference light). At this time, the circularly polarized light rotational direction of the homeward reference light is converted to the rotational direction opposite to the predetermined rotational direction due to reflection off of the reflective film L3, and accordingly, the homeward reference light is converted into s-polarized light by passing through the quarter-wave plate 10.

Now, based on transition of such a polarized state, the suppression operation of the reflected reference light by the partial diffraction element 9 and the quarter-wave plate 10 will be described.

The partial diffraction element 9 is configured of a polarized light selecting diffraction element having the selective diffraction property corresponding to the polarized state of linear polarized light (one of the linear polarized light component is diffracted, and the other linear polarized light component is transmitted) being formed with a region where reference light is input (region except for the center portion), for example, such as a liquid crystal element or the like. Specifically, in this case, the polarized light selecting diffraction element included in the partial diffraction element 9 is configured so as to transmit p-polarized light and diffract s-polarized light. Thus, the outbound reference light transmits the partial diffraction element 9, and the reference light alone of the inbound path is diffracted (suppressed) at the partial diffraction element 9.

As a result thereof, prevention of a situation where the reflected reference light which is inbound light is detected as a noise component as to the reproduced image, and the S/N ratio deteriorates is achieved.

Note that a region where the signal light is input of the partial diffraction element 9 (region where the reproduced image is input) is configured of, for example, a transparent material, or a hole portion so as to transmit both of the outbound light and the inbound light. Thus, the signal light at the time of recording, and the reproduced image at the time of reproducing are arranged so as to transmit the partial diffraction element 9.

Now, as can be understood from the above description, with the hologram recording/reproducing system, reference light is irradiated on the recorded hologram, and a diffraction phenomenon is taken advantage of so as to obtain a reproduced image, but the diffraction efficiency at this time is generally less than several percentages through 1 percentage. Thus, the reference light to be returned to the device side as reflected light such as described above has great intensity as to the reproduced image. That is to say, the reference light which is the reflected light becomes a noise component not negligible for detection of a reproduced image. Accordingly, suppression of the reflected reference light is achieved by the partial diffraction element 9 and the quarter-wave plate 10, and thus, great improvement in the S/N ratio is achieved.

The reproduced image obtained at the time of reproducing such as described above transmits the partial diffraction element 9. The reproduced image transmitted through the partial diffraction element 9 is irradiated at the dichroic mirror 8, and is then input to the polarized beam splitter 5 via the above-described relay lens system (relay lens 7, relay lens 6, in this order). As can be understood from the above description, the reflected light from the hologram recording medium HM is converted into s-polarized light via the quarter-wave plate 10, and accordingly, the reproduced image thus input to the polarized beam splitter 5 is reflected at the polarized beam splitter 5, and is input to the image sensor 13.

Thus, at the time of reproducing, the reproduced image from the hologram recording medium HM is detected by the image sensor 13, and accordingly, reproducing of data by a data reproducing unit 21 in the drawing is executed.

Also, with the recording/reproducing device shown in FIG. 23, there is provided an optical system for executing irradiation of a laser beam for position control, and detection of reflected light of the laser beam for position control. Specifically, this optical system is made up of a second laser 14, a collimation lens 15, a polarized beam splitter 16, a condenser lens 17, and a photodetector (PD) 18 shown in FIG. 23.

The second laser 14 outputs the above red laser beam with a wavelength λ of 650 nm or so the laser beam for position control. The emission light from the second laser 14 is input to the dichroic mirror 8 via the collimation lens 15, and the polarized beam splitter 16 in this order. Here, the polarized beam splitter 16 is also configured so as to transmit p-polarize light, and reflect s-polarized light.

As also described above, the dichroic mirror 8 is configured so as to selectively reflect a laser beam for recording/reproducing (405 nm in this case), and accordingly, transmits the laser beam for position control from the second laser 14.

The laser beam for position control transmitted through the dichroic mirror 8 is irradiated, in the same way as the laser beam for recording/reproducing, on the hologram recording medium HM via the partial diffraction element 9, quarter-wave plate 10, and objective lens 102 in this order.

Note that the dichroic mirror 8 is provided, and accordingly, the laser beam for position control and the laser beam for recording/reproducing are synthesized on the same optical axis, and also this synthesized light is irradiated on the hologram recording medium HM via the common objective lens 102. That is to say, thus, an arrangement is made wherein the beam spot of the laser beam for position control and the beam spot of the laser beam for recording/reproducing are formed on the same position in a direction within the recording surface, and consequently, position control operation based on the laser beam for position control such as described below is executed, and accordingly, the recording/reproducing position of the hologram is controlled so as to position on a track.

Also, with regard to focus direction, according to position control operation as described below (focus servo control), the focal position of the laser beam for position control is controlled so as to position on the reflective film L5 of the hologram recording medium HM (see FIG. 22).

At this time, with the recording/reproducing device, adjustment is executed so that the focal position of the laser beam for position control, and the focal position of the laser beam for recording/reproducing are separated by predetermined distance. Specifically, in this case, the laser beam for recording/reproducing condenses in the reflective film L3 immediately below the recording layer L2, and accordingly, adjustment is executed so that the focal position of the laser beam for recording/reproducing is disposed in the front side by distance from the reflective film L5 surface to the reflective film L3 surface as to the focal position of the laser beam for position control (see FIG. 22).

Thus, an arrangement is made wherein as focus servo is executed with the focal position of the laser beam for position control as on the reflective film L5, the focal position of the laser beam for recording/reproducing is automatically set to above the reflective film L3.

In FIG. 23, in response to the laser beam for position control being irradiated on the hologram recording medium HM, the reflected light corresponding to the recorded information on the reflective film L5 is obtained. This reflected light is input to the polarized beam splitter 16 via the objective lens 102, quarter-wave plate 10, partial diffraction element 9, and dichroic mirror 8 in this order. Thus, the polarized beam splitter 16 reflects the reflected light of the laser beam for position control input thereto via the dichroic mirror 8 (the laser beam for position control reflected at the hologram recording medium HM is also converted into s-polarized light by operation of the quarter-wave plate 10). The reflected light of the laser beam for position control reflected at the polarized beam splitter 16 is irradiated on the detection surface of the photodetector 18 via the condenser lens 17 so as to condense.

The photodetector 18 receives the reflected light of the laser beam for position control irradiated such as described above, converts this into an electrical signal, and supplies this to the position control unit 19.

The position control unit 19 is configured so as to include a matrix circuit for generating various types of signals used for position control such as a reproducing signal (RF signal) regarding a pit row formed on the reflective film L5 by matrix computation, a tracking error signal, a focus error signal, and the like, a computing circuit for generating a servo signal, and a driving control unit for driving and controlling each used unit such as the focus actuator 12, the above tracking driving unit, and the like.

While omitted from the drawings, with the recording/reproducing device, there are provided an address detecting circuit and a clock generating circuit which are used for executing detection of address information and generation of clock based on the above reproducing signal.

The position control unit 19 controls the tracking driving unit based on the address information and the tracking error signal, thereby controlling the beam spot position of the laser beam for position control. According to control of such a beam spot position, the beam spot position of the laser beam for recording/reproducing can be moved to a predetermined address, or can be followed on the tracks (tracking servo control), or the like. That is to say, thus, control regarding the recording/reproducing position of a hologram is executed.

Also, the position control unit 19 controls the driving operation of the objective lens 102 in the focus direction by the focus actuator 12 based on the focus error signal, thereby executing focus servo control for following the focal position of the laser beam for position control on the reflective film L5. As described above, focus servo control regarding such a laser beam for position control is executed, and accordingly, the focal position of the laser beam for recording/reproducing follows on the reflective film L3.

Here, focus servo control such as described above is executed, and accordingly, along with the position in the focus direction of the objective lens 102 changing so as to follow the plane shaking of the hologram recording medium HM or the like, distance between the relay lens 7 and the objective lens 102 changes successively.

With a hologram recording/reproducing system, upon distance between the relay lens 7 and the objective lens 102 being thus changed by focus servo control, recording/reproducing a hologram is not readily executed in that 1) reference light is not readily irradiated with the same conditions at the time of recording/reproducing, and 2) blurring occurs on a reproduced image, a fact which is widely recognized.

This point will be described with reference to FIGS. 25 and 26. FIG. 25 illustrates the behavior of light with the optical system regarding light emitted from each pixel of the SLM 4. Note that, in FIG. 25, with regard to signal light to be generated along with the spatial light modulation of the SLM 4, only three pixels worth of light beam thereof are illustrated, and with regard to reference light, only two pixels worth of light beam are illustrated.

Also, in FIG. 25, of the configuration of the whole optical system, only the SLM 4, relay lenses 6 and 7, and objective lens 102 are extracted and illustrated. Also, in this drawing, the hologram recording medium HM is also illustrated together therewith.

Also, the flat surface Spbs in the drawing represents the reflective surface of the polarized beam splitter 5, and also the flat surface Sdim represents the reflective surface of the dichroic mirror 8. Also, the Fourier surface (frequency flat surface) SF in the drawing is the focal point surface of the relay lens 6, and becomes a surface coupled to the focal point surface of the objective lens 102. Also, the real image surface SR in the drawing is the object surface of the objective lens 102, and is coupled to the modulation surface (image generating surface) of the SLM 4. The light reception surface of the image sensor 13 is coupled to the real image surface SR.

Here, let us say that the positions of the objective lens 102 and the relay lens 7 shown in FIG. 25 are each an ideal position assumed at the time of optical system design. Note that, in the case of the recording/reproducing device according to the related art shown in FIG. 23, the position where each light beam passes through is the same regarding outbound and inbound, and accordingly, one drawing is used to show both.

As shown in FIG. 25, the light beam emitted from each pixel of the SLM 4 is input to the relay lens 6 via the flat surface Spbs (polarized beam splitter 5) in the state of diffusion light. At this time, the emitted light beam from each pixel is in a state in which each optical axis is in parallel.

The light beam of each pixel input to the relay lens 6 is converted from the diffusion light to parallel light such as shown in the drawing, and also the optical axis of each light beam except from the light beam on the laser beam axis (the optical axis of the whole laser beam flux) is bent on the laser beam axis side. Thus, with the Fourier surface SF, each light beam condenses on the laser beam axis in a parallel light state.

Each light beam condensing on the laser beam axis of the Fourier surface SF such as described above is input to the relay lens 7, but at this time, each light beam (except for the light beam of the center pixel including the laser beam axis) emitted from the relay lens 6 intersects the laser beam axis on the Fourier surface SF. Thus, the relationship of the input/output position of each light beam between the relay lens 6 and the relay lens 7 assumes an axial symmetrical relationship with the laser beam axis as the center.

Each light beam is converted into converged light by passing through the relay lens 7 such as shown in the drawing, and also the optical axis of each light beam becomes parallel. Each light beam passed through the relay lens 7 is reflected at the flat surface Sdim (dichroic mirror 8), and condenses in the corresponding position on the real image surface SR. At this time, each light beam via the relay lens 7 is in a state in which each optical axis is in parallel such as shown in the above, and accordingly, the condensing position of each light beam is not overlapped, and becomes a different position, on the real image surface SR.

Each light beam condensing on the real image surface SR such as shown in the drawing is input to the objective lens 102 in a diffusion light state (the optical axis of each light beam is in parallel at this time). Each light beam input to the objective lens 102 is in a parallel state such as shown in the drawing. With the reflective surface (reflective film L3 surface) serving as the condensing surface of the objective lens 102 in the drawing, each light beam in such a parallel light state condenses on the laser beam axis. Note that, as can be understood from this, the focal point surface of the objective lens 102 and the above Fourier surface SF have coupling relationship.

Here, FIG. 25 illustrates each light beam of the reproduced light reflected at the flat surface Spbs and guided to the image sensor 13 (each light beam of the reproduced image obtained within the signal light area A2 at the time of reproducing), but the reason why the reproduced light alone is guided to the image sensor 13 such as shown in the drawing is because the reflected reference light is suppressed by the partial diffraction element 9 (and the quarter-wave plate 10) described above.

Note that each light beam of the reproduced light reaches the flat surface Spbs passing through the same positions as with each light beam of the signal light in the drawing, and is reflected at this flat surface Spbs and guided to the image sensor 13.

At this time, each light beam of the reproduced light emitted to the flat surface Spbs side from the relay lens 6 is in a converged light state and also in a state where each optical axis is in parallel, and condenses in a separate position on the detection surface of the image sensor 13. Thus, the same image as the reproduced image on the real image surface SR is obtained on the detection surface of the image sensor 13.

FIG. 26 illustrates the situation of each light beam of signal light and reference light in a state where the reflective surface and the objective lens 102 are in an ideal position ((a) in FIG. 26), and the situation of each light beam at the time of the objective lens 102 being driven following the displacement from the ideal position of the reflective surface ((b) in FIG. 26) in a comparative manner.

Note that, in these drawings, each light beam which is outbound light on the real image surface SR shown in FIG. 25 and thereafter is indicated with a solid line. A dashed line in the drawing indicates the situation of each light beam reflected at the reflective surface (just the reference light beams in the drawings, for the sake of convenience).

First, such as shown in (a) in FIG. 26, in a state in which the reflective surface and the objective lens 102 are each disposed in an ideal position, such as described in FIG. 25, each light beam emitted from the objective lens 102 is in a parallel light state, and accordingly, each light beam reflected at the reflective surface is also returned to the objective lens 102 side in a parallel light state.

Thus, such as described above in FIG. 25, each light beam of the reproduced image is obtained in the same light beam region as each light beam of the signal light at the time of recording.

Let us say that from this state shown in (a) in FIG. 26, the reflective surface moves by $\Delta Z$ in a direction away from the objective lens 102 due to plane shaking or the like, and along therewith, the objective lens 102 is driven by focus servo control toward the reflective surface by $\Delta Z$.

In response to this, distance from the real image surface SR to the objective lens 102 is separated by $\Delta Z$ such as shown in (b) in FIG. 26, and accordingly, the width of each light beam input to the objective lens 102 is expanded.

Thus, the width of each light beam input to the objective lens 102 is expanded from the ideal state shown in (a) in FIG. 26, and accordingly, each light beam emitted from the objective lens 102 is not in a parallel light state but in a converged light state such as shown in the drawing.

Here, (b) in FIG. 26 illustrates a case where the reflective surface moves in a direction away from the objective lens 102 as an example, but conversely, in the case that the reflective surface moves in a direction toward the objective lens 102, the objective lens 102 is driven so as to move to the light source side, and the width of each light beam input to the objective lens 102 becomes thinner than in the case of (a) in FIG. 26. That is to say, in this case, conversely, each light beam emitted from the objective lens 102 is in a diffusion light state.

As can be understood from the above description, in response to the objective lens 102 being driven so as to follow the operation of the reflective surface by focus servo, the state of each light beam of the signal light and reference light emitted from the objective lens 102 differs successively. Therefore, reference light is not readily irradiated with the same conditions at the time of recording/at the time of reproducing, and accordingly, a hologram is not readily suitably recorded.

Also, in response to each light beam emitted from the objective lens 102 being not in a parallel light state such as described above, the focal position of each light beam which is inbound light is not identical to the real image surface SR, and accordingly, at the time of reproducing, blurring also occurs on an image received at the image sensor 13.

That is to say, such as shown in (b) in FIG. 26, in the case that the reflective surface moves in a direction away from the objective lens 102, and the emission light from the objective lens 102 becomes converged light, with the inbound path, the width of each light beam input to the objective lens 102 from the reflective surface is narrower than the case of (a) in FIG. 26, and consequently, each light beam which is inbound light emitted from the objective lens 102 focuses on the front side of the real image surface SR.

Also, as can be understood from this, conversely, in the case that the reflective surface moves toward the objective lens 102, each light beam which is inbound light emitted from the objective lens 102 focuses on a deeper side than the real image surface SR.

As also described above, the real image surface SR (the real image surface of the outbound path) and the light reception surface of the image sensor 13 have coupling relationship, and accordingly, the same focal position deviation also occurs on the image sensor 13, and according thereto, blurring of the reproduced image occurs.

In order to solve such a problem, the recording/reproducing device according to the related art has a configuration for maintaining distance between the objective lens 102 which displaces successively by focus servo, and the relay lens 7 so as to be constant. Specifically, this is made up of a relay lens driving unit 103, a position sensor 104, a position sensor 105, and a relay lens position control unit 106, shown in FIG. 23.

With the recording/reproducing device according to the related art, each of the positions of the objective lens 102 and the relay lens 7 is detected by the position sensors 104 and 105, and control is executed so that the position from the ideal position of each of the objective lens 102 and the relay lens 7 (movement distance) becomes the same.

Specifically, the relay lens position control unit 106 obtains the motion amount of the objective lens 102 (movement amount $\Delta Z$: having ± polarity with the ideal position as a reference) from the position information of the objective lens 102 detected by the position sensor 104, and controls the relay lens driving unit 103 so that the relay lens 7 is moved until the motion amount (movement amount) of the relay lens 7 obtained from the position information detected by the position sensor 105 becomes the above movement amount $\Delta Z$. Thus, the distance between the objective lens 102 and the relay lens 7 can be maintained constant.

In the case that the distance between the objective lens 102 and the relay lens 7 is maintained constant, distance from the real image surface SR serving as the condensing point of each light beam emitted from the relay lens 7 to the objective lens 102 can be maintained constant. That is to say, the distance between the real image surface SR and the objective lens 102 can be set to the distance shown in (a) in FIG. 26 so as to be constant, and the emission light from the objective lens 102 can become constant parallel light. As a result thereof, even in the event that the objective lens 102 displaces according to focus servo, recording/reproducing can suitably be executed.

SUMMARY OF THE INVENTION

However, with the recording/reproducing device according to the related art, in order to maintain the distance between the objective lens 102 and the relay lens 7 constant, a technique has been used wherein a position sensor is provided to each thereof as described above, control for monitoring the motion of the objective lens 102, and moving the relay lens 7 by an amount corresponding to the movement amount thereof is executed while monitoring the motion of the relay lens 7.

With such a control technique according to the related art, the position sensors 104 and 105 for detecting the positions of the objective lens 102 and the relay lens 7 have to be provided, which causes increase in device manufacturing cost correspondingly.

Also, such a control technique according to the related art is so-called open control, high precision is demanded for the reference positioning and attachment precision and the like of the position sensors, and accordingly, this point also causes increase in device manufacturing cost.

It has been found to be desirable to provide a light irradiation device having the following configuration.

According to an embodiment of the present invention, a light irradiation device includes: a focus servo control unit, which includes a light source configured to irradiate light on a hologram recording medium having a recording layer where information is recorded with an interference pattern between signal light and reference light, a spatial light modulating unit configured to subject light from the light source to spatial light modulation to execute generation of the signal light and/or the reference light, and generation marker light at a position away from an optical axis within an input surface of the light from the light source, and a light irradiating unit configured to irradiate light subjected to spatial light modulation by the spatial light modulating unit on the hologram recording medium via a relay lens system and an objective lens, configured to execute focus servo control so that the ideal focal position of light to be irradiated via the objective lens is set so as to satisfy a condition that distance between the ideal focal position and the hologram recording medium surface is smaller than distance from the surface to the lower layer side face of the recording layer, and also the focal position of light to be irradiated via the objective lens is constant at the ideal focal position; an objective-lens/relay-lens distance adjusting unit configured to adjust distance between the objective lens and a relay lens disposed closer to the objective lens of relay lenses making up the relay lens system on the optical axis; a light reception unit configured to receive the marker light via the hologram recording medium; and a constant distance control unit configured to control the objective-lens/relay-lens distance adjusting unit based on error between the ideal light reception position of the marker light, and the actual light reception position of the marker light by the light reception unit.

With the above configuration, the ideal focal position of light to be irradiated via the objective lens is set so that distance between this ideal focal position and the hologram recording medium surface is smaller than distance from this surface to the lower layer side face of the recording layer. That is to say, with the present invention, the ideal focal position of the recording/reproduced light of a hologram is set so as to be shifted to a position which is a side further to the front (objective lens side) than the lower layer side face of the recording layer which is the ideal focal position (on the reflective surface in the case of a reflection-type recording medium) according to the related art.

Thus, with a system wherein the focal position of the reproduced/reproduced light of a hologram is shifted to a side further to the front than the position according to the related art, along with the distance between the objective lens and the relay lens changing from the ideal distance, the position of an image detected on the light reception surface (excluding the image on the optical axis) is shifted from the ideal light reception position. Specifically, when the distance between the objective lens and the relay lens is greater than the ideal distance, the position of an image detected on the light reception surface is shifted to the outer side than the ideal light reception position, and conversely, when the distance between the objective lens and the relay lens is smaller than the ideal distance, the position of an image detected on the light reception surface is shifted to the inner side than the ideal light reception position (this point will be described later).

The present invention takes advantage of this point, and with an embodiment thereof marker light is generated at a position away from the optical axis such as described above, and the objective-lens/relay-lens distance adjusting unit is controlled based on error between the ideal light reception position of the marker light, and the actual light reception position of the marker light.

Thus, control can be made so that the distance between the objective lens and the relay lens is constantly the ideal distance.

As described above, according to the above configuration, control can be made wherein the ideal focal position of the reproduced/reproduced light of a hologram is shifted to a side further to the front than the ideal focal position according to the related art, and then marker light is generated at a position away from the optical axis, and the distance between the objective lens and the relay lens is controlled based on error between the ideal light reception position of the marker light, and the actual light reception position of the marker light, whereby control can be made so that the distance between the objective lens and the relay lens is constantly the ideal distance.

Thus, according to the above configuration, the amount of error from the ideal distance for the distance between the objective lens and the relay lens can be optically detected, and accordingly, positions sensors for detecting the position of each of the objective lens and the relay lens which have been unavoidable with the related art for control so that the distance between the objective lens and the relay lens remains constant, can be omitted. That is to say, thus, reduction in device manufacturing cost can be achieved.

Also, according to the above configuration, an error signal representing error from the ideal distance of the distance between the objective lens and the relay lens can be obtained with a push pull signal (a signal of which the amplitude changes, with amplitude of "0" at the time of the ideal distance as a reference).

Also, according to the above configuration, control of the distance between the objective lens and the relay lens so as to be constant can be executed with closed loop control, and accordingly, high-precision control can be executed correspondingly.

BRIEF DESCRIPTION OF THE DRAWINGS

FIG. 6 is a diagram for describing the shape of a hologram to be formed on the hologram recording medium by a recording/reproducing system according to the related art;

FIG. 25 is a diagram illustrating the behavior of light as the whole of an optical system in the case of a case according to the related art.

DESCRIPTION OF THE PREFERRED EMBODIMENTS

Figure 1:
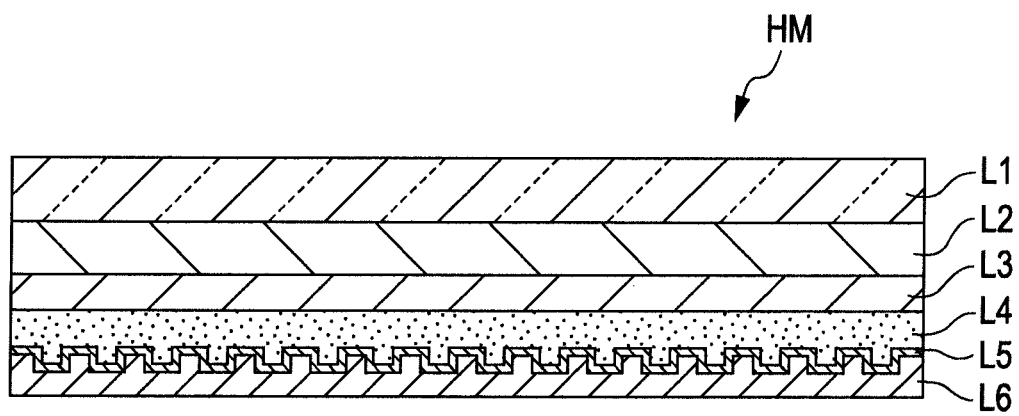
FIG. 1 is a cross-sectional configuration diagram illustrating a configuration example of a hologram recording medium used for an embodiment.
Figure 22:
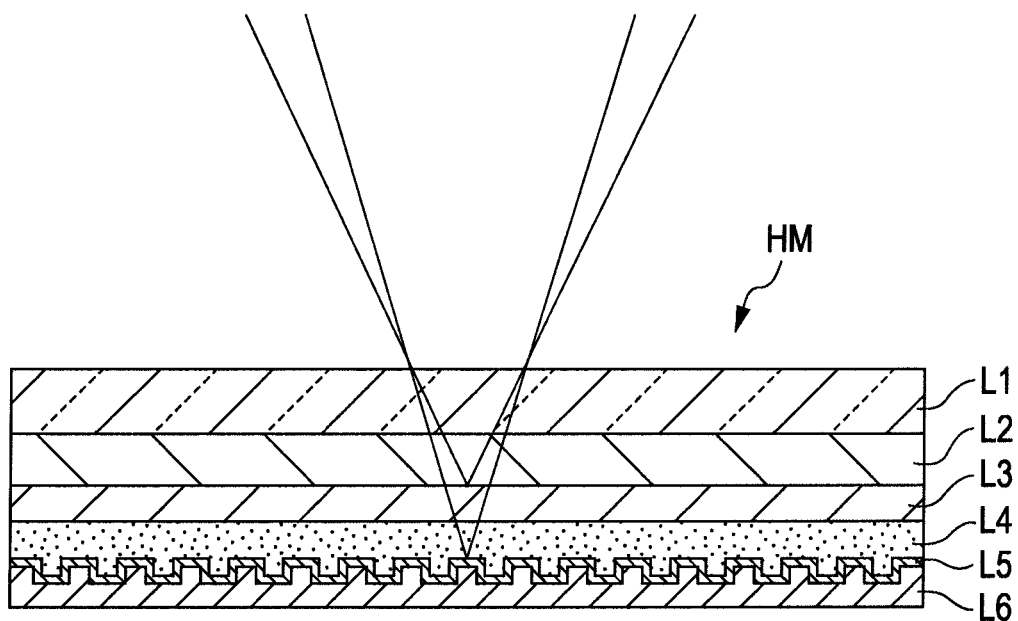
FIG. 22 is a cross-sectional diagram illustrating a configuration example of the hologram recording medium.

An embodiment for carrying out the present invention (hereafter, referred to as "embodiment") will be described below. Description will be made in accordance with the following sequence.
1. Configuration of Hologram Recording/Reproducing System
1-1. Configuration of Recording Medium
1-2. Configuration of Recording/Reproducing Device
1-3. Shift of Focal Position
1-4. Change of Behavior of Light Following Focal Position Shift
1-5. Constant Distance Control between Objective Lens and Relay Lens Serving as Embodiment
1-6. Configuration for Realizing Constant Distance Control of Embodiment
1-7. Conclusion
2. Modifications
1. Configuration of Hologram Recording/Reproducing System
1-1. Configuration of Recording Medium FIG. 1 is a cross-sectional configuration diagram of a hologram recording medium HM according to the present embodiment. As can be understood from comparison between this FIG. 1 and the previous FIG. 22, the hologram recording medium HM used for the present embodiment has the same cross-sectional configuration as the hologram recording medium HM according to the related art.

Each layer formed on the hologram recording medium HM will be described for confirmation. First, the array sequence of each layer is from the upper layer side to the lower layer side a cover layer L1, a recording layer L2, a reflective film L3, an intermediate layer L4, a reflective film L5, and a substrate L6.

Note that, with regard to "upper layer" and "lower layer" mentioned here, a surface where light for recording/reproducing is input is the upper surface thereof, the surface opposite side of this upper surface is the lower surface thereof, with the upper surface side being the upper layer, and the lower surface side being the lower layer.

The cover layer L1 in this case is configured of, for example, plastic, glass, or the like, and is provided for protecting the recording layer L2 formed on the lower layer thereof.

Also, with regard to the recording layer L2, as the material thereof, a material capable of recording of information by refractive index change according to the intensity distribution of irradiation light occurring, for example, such as photopolymer or the like, is selected, and recording/reproducing of a hologram by later-described laser beam for recording/reproducing is executed.

Also, when the reproduced image corresponding to the hologram recorded in the recording layer L2 according to irradiation of reference light at the time of reproducing is obtained, the reflective film L3 is provided to return this to the device side as reflected light. As this reflective film L3, in the same way as the reflective film L3 in FIG. 22, a film having wavelength selectivity is selected. As also described later, with the present embodiment as well, as a laser beam for recording/reproducing a hologram a blue-violet laser beam with a wavelength λ of 405 nm or so is irradiated, and as a laser beam for position control a red laser beam with a wavelength λ of 650 nm or so is irradiated. In response to this, a reflective film having wavelength selectivity is used as the reflective film L3 which reflects the blue-violet laser beam for recording/reproducing, and transmits the red laser beam for position control.

Also, the substrate L6 and the reflective film L5 are provided on the substrate L6 to control the recording/reproducing position of a hologram, and tracks for guiding the recording/reproducing position of a hologram of the recording layer L2 are formed spirally or concentrically. For example, in this case as well, a track is formed by pit rows recording information, such as address information and the like. The reflective film L5 is formed on the face (surface) where the above track of the substrate L6 is formed, for example, by spattering, vapor deposition, or the like. Note that, as long as this reflective film L5 is configured so as to reflect position control light, this does not have to have particular wavelength selectively.

The intermediate layer L4 formed between the reflective film L5 and the above reflective film L3 is, for example, an adhesive material such as a resin or the like.

1-2. Configuration of Recording/Reproducing Device

Figure 2:
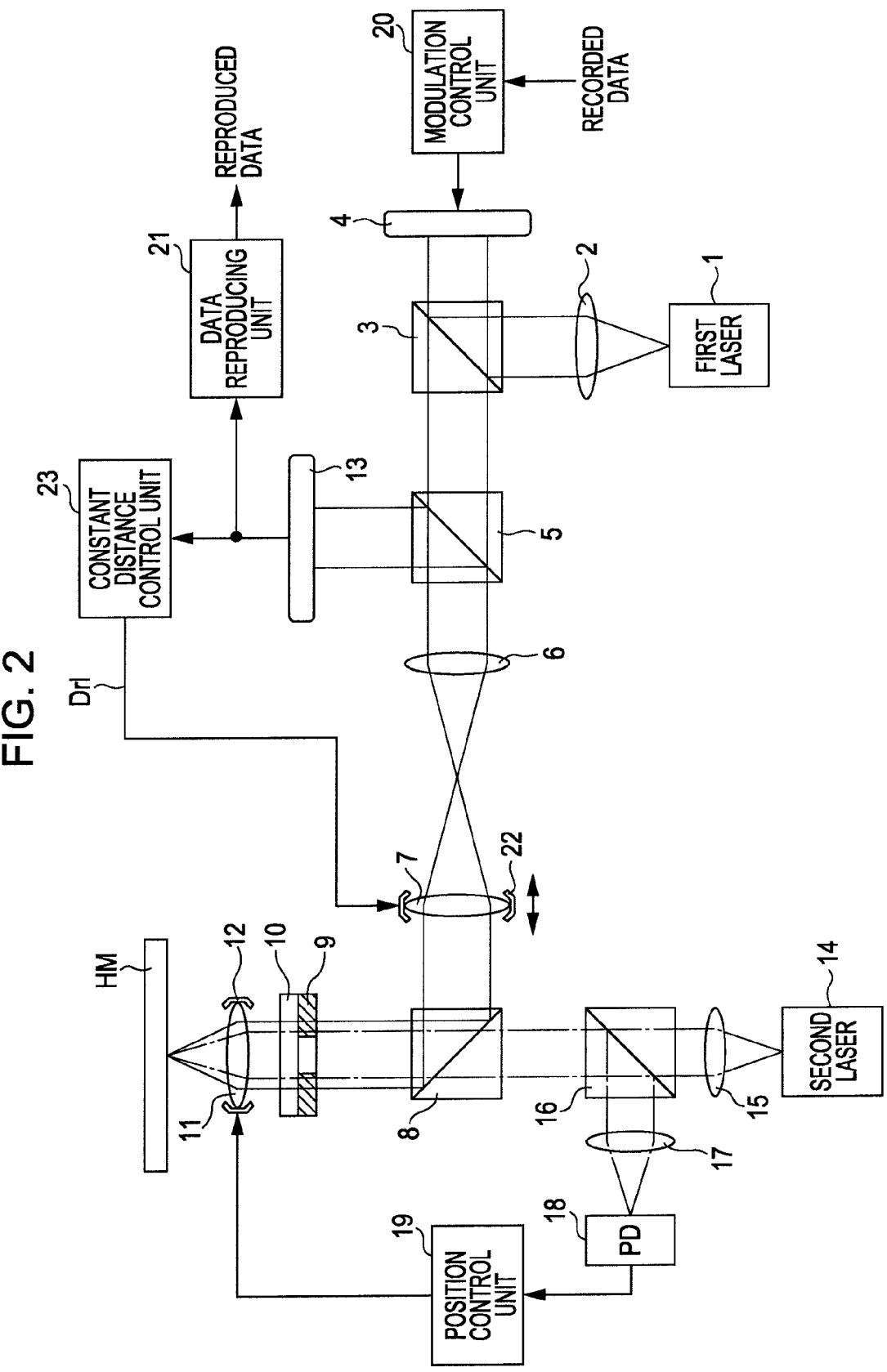
FIG. 2 is a diagram illustrating the internal configuration of a light irradiation device as according to an embodiment.

FIG. 2 is a diagram illustrating the internal configuration of a light irradiation device serving as an embodiment which executes recording/reproducing of a hologram as to the above hologram recording medium HM.

Now, with the present embodiment, a case is exemplified wherein the light irradiation device according to the present invention is applied to a recording/reproducing device which executes both of recording and reproducing of a hologram. FIG. 2 principally illustrates the configuration of the optical system of the recording/reproducing device according to the present embodiment.

In FIG. 2, the hologram recording medium HM is held so as to be rotationally driven by a spindle motor of which the drawing is omitted. With the recording/reproducing device, a laser beam for recording/reproducing a hologram, and a laser beam for position control are irradiated on the hologram recording medium HM in such a held state.

Figure 23:
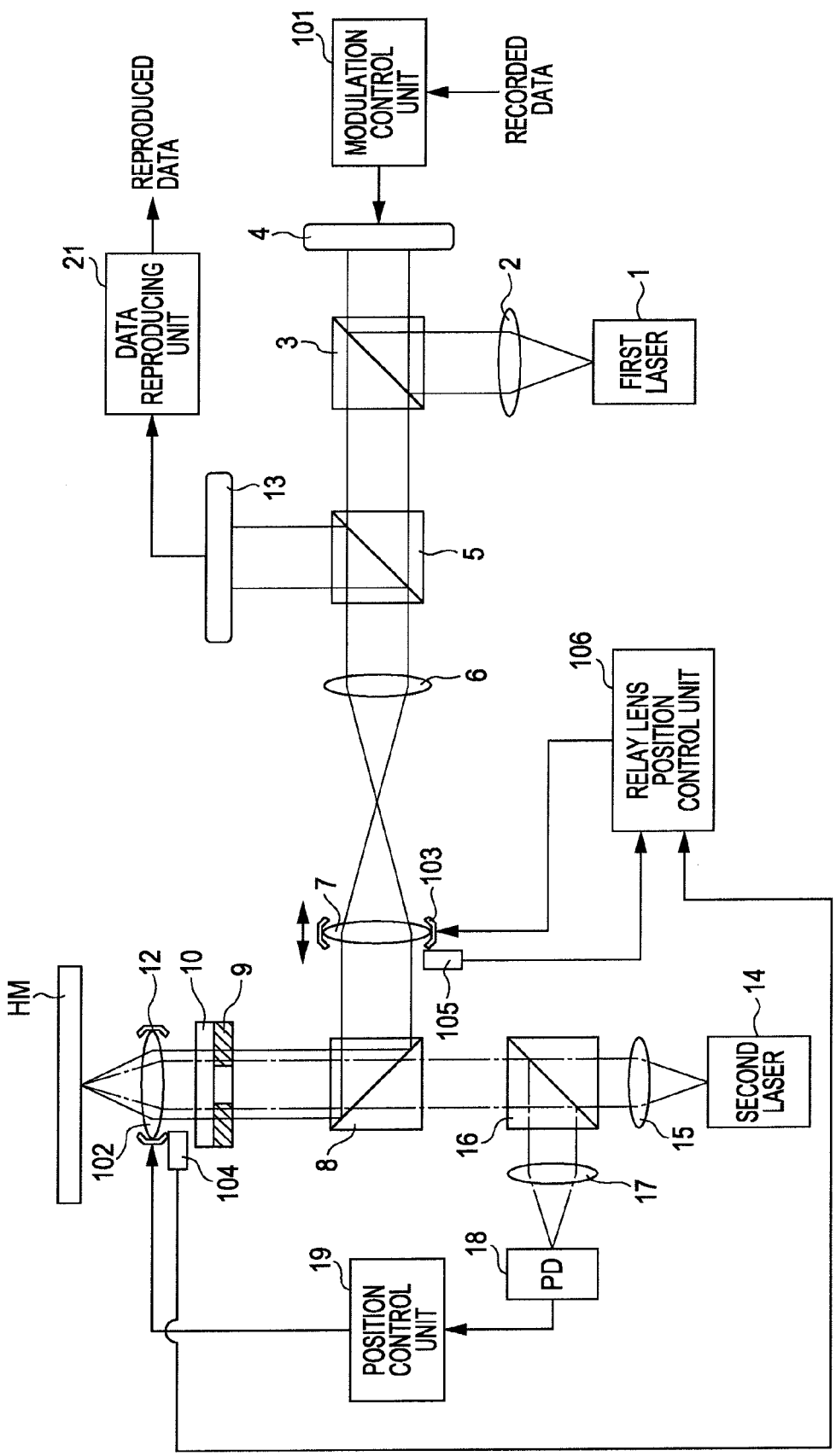
FIG. 23 is a diagram illustrating the internal configuration of a recording/reproducing device as an example of the related art.
Figure 24A:
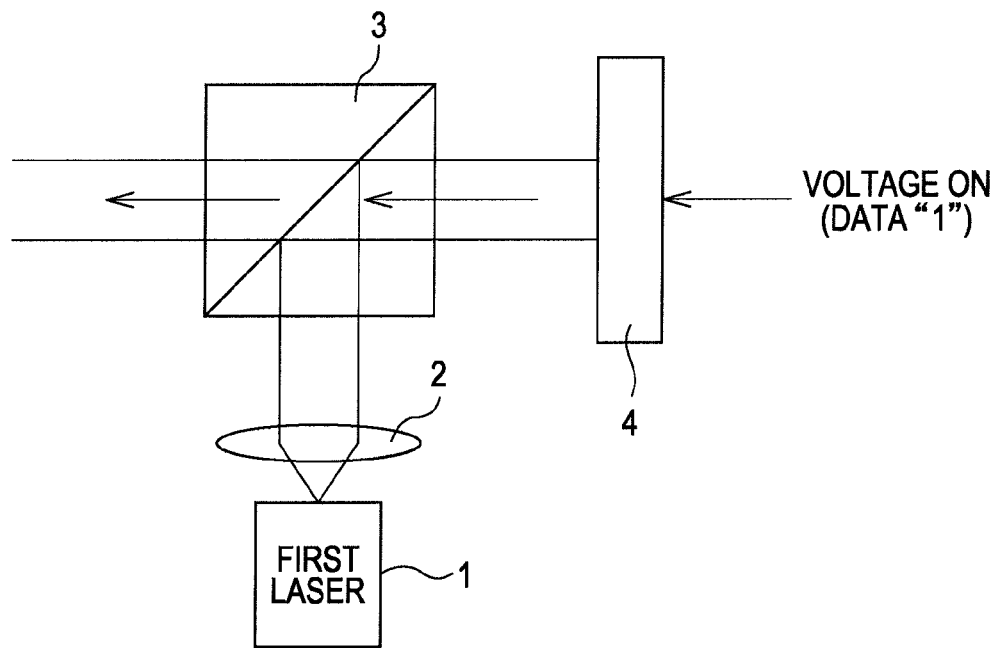
FIGS. 24A and 24B are diagrams for describing intensity modulation to be realized with a combination of a polarization direction control type of a spatial light modulator and a polarized beam splitter.
Figure 24B:
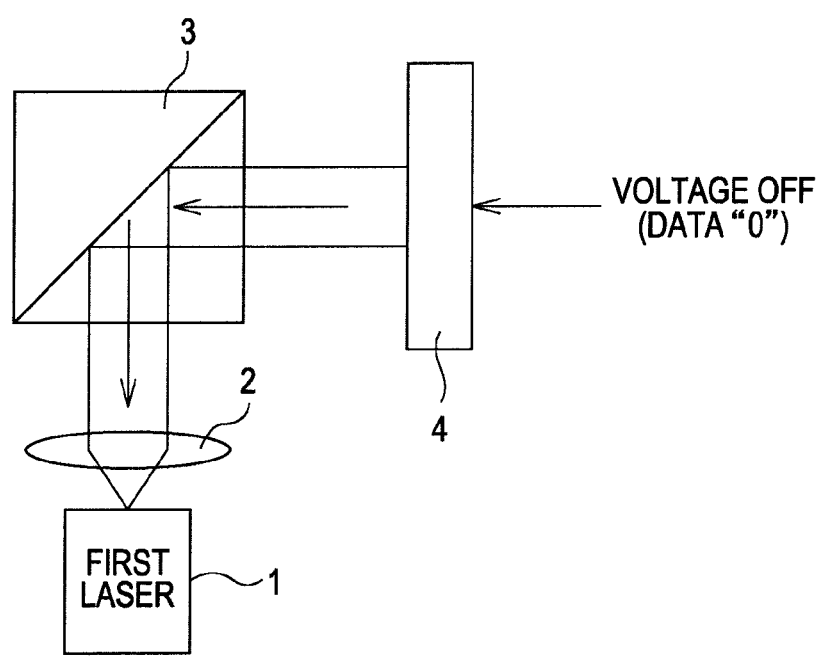

In FIG. 2, the same position as that of the recording/reproducing device shown in FIG. 23 is denoted with the same reference numeral. As can be understood from comparison with FIG. 23, the recording/reproducing device according to the present embodiment has generally the same configuration as the recording/reproducing device according to the related art, executes recording/reproducing of a hologram by irradiation of reproduced/reproduced light with the first laser 1 as a light source, and also executes control of recording/reproducing of a hologram by irradiation of position control light with the second laser 14 as a light source (also including focus servo).

The recording/reproducing device according to the present embodiment also uses the coaxial method as a hologram recording/reproducing method. Specifically, signal light and reference light are disposed on the same axis, and are both irradiated on the hologram recording medium set to a predetermined position, thereby executing recording of data according to formation of a hologram, and at the time of reproducing, the reference light is irradiated on the hologram recording medium, thereby obtaining the reproduced image of a hologram (reproduced signal light) to execute reproducing of the recorded data.

With the recording/reproducing device according to the present embodiment, as an optical system for irradiating signal light and reference light for recording/reproducing of a hologram, there are provided a first laser 1, a collimation lens 2, a polarized beam splitter 3, an SLM 4, a polarized beam splitter 5, a relay lens 6, a relay lens 7, a dichroic mirror 8, a partial diffraction element 9, a quarter-wave plate 10, an objective lens 11, and an image sensor 13.

In this case as well, the first laser 1 outputs, for example, a blue-violet laser beam with a wavelength $\lambda=405$ nm as a laser beam for recording/reproducing of a hologram. The laser beam emitted from the first laser 1 is input to the polarized beam splitter 3 via the collimation lens 2.

In this case as well, an intensity modulating unit which subjects incident light to spatial light intensity modulation is formed of the polarized beam splitter 3 and the SLM 4.

The polarized beam splitter in this case is also configured, for example, so as to transmit p-polarized light and reflect s-polarized light. Accordingly, with the laser beam input to the polarized beam splitter 3, the s-polarized light component alone is reflected and guided to the SLM 4.

The SLM 4 is configured so as to include, for example, a reflection-type liquid crystal element serving as an FLC (Ferroelectric Liquid Crystal), and is configured so as to control the polarization direction of incident light in increments of pixels.

The SLM 4 executes spatial light modulation so as to change the polarization direction of incident light 90 degrees for each pixel according to the driving signal from the modulation control unit 20 in the drawing, or so as not to change the polarization direction of incident light. Specifically, an arrangement is made wherein control in the polarization direction is executed in increments of pixels according to a driving signal so that a pixel of which the driving signal is on has angular change of 90 degrees in the polarization direction, and a pixel of which the driving signal is off has angular change of 0 degree in the polarization direction.

The emission light from the SLM 4 (light reflected at the SLM 4) is input to the polarized beam splitter 3 again, and thus, light (p-polarized light) passed through a pixel of which the driving signal is on of the SLM 4 transmits the polarized beam splitter 3, and light (s-polarized light) passed through a pixel of which the driving signal is off is reflected at the polarized beam splitter 3, and consequently, an intensity modulating unit which subjects incident light to spatial light intensity modulation (also referred to as "intensity modulation") in increments of pixels of the SLM 4 is realized.

Figure 3:
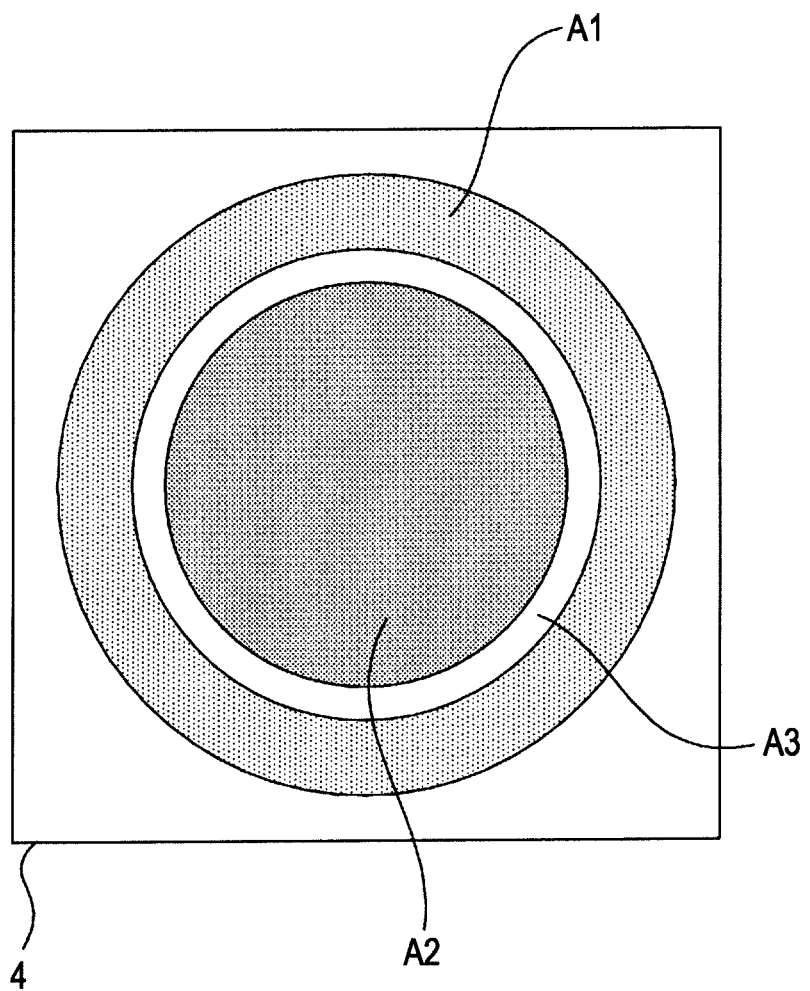
FIG. 3 is a diagram for describing each area of a reference light area, a signal light area, and a gap area to be set to a spatial light modulator.

Now, in the case of the coaxial method being used, with the SLM 4, in order to dispose signal light and reference light on the same optical axis, areas shown in FIG. 3 are set. As shown in FIG. 3, with the SLM 4, a predetermined range of a circular area including the center thereof (identical to the optical axis center) is set as a signal light area A2. A ring-shaped reference light area A1 is set to the outer side of the signal light area A2 across a gap area A3. According to settings of the signal light area A2 and the reference light area A1, signal light and reference light can be irradiated so as to be disposed on the same optical axis.

Also, the gap area A3 is determined to be a region for preventing reference light generated at the reference light area A1 from leaking to the signal light area A2 and becoming noise in signal light. Accordingly, the gap area A3 is basically to be a non-transmitting region for shielding incident light.

Note that the pixel shape of the SLM 4 is a rectangular shape, and accordingly, strictly speaking, the signal light area A2 does not have a circular shape. Similarly, strictly speaking, the reference light area A1 and the gap area A3 do not have a ring shape. In this sense, the signal light area A2 is an approximate circular area, and the reference light area A1 and the gap area A3 are approximate ring-shaped areas.

In FIG. 2, the modulation control unit 20 executes driving control as to the SLM 4, thereby generating signal light and reference light at the time of recording, and generating reference light alone at the time of reproducing.

Specifically, at the time of recording, the modulation control unit 20 generates a driving signal for setting the pixels of the signal light area A2 of the SLM 4 to an on/off pattern according to recorded data to be supplied, and setting the pixels of the reference light area A1 to a predetermined on/off pattern, and turning off all the other pixels, and supplies this to the SLM 4. Spatial light modulation (polarization direction control) by the SLM 4 is executed based on this driving signal, and accordingly, signal light and reference light disposed so as to have the same center (optical axis) are obtained as emission light from the polarized beam splitter 3.

Also, at the time of reproducing, the modulation control unit 20 drives and controls the SLM 4 by the driving signal for setting the pixels within the reference area A1 to the predetermined on/off pattern, and turning off all the other pixels, and thus, generates the reference light alone.

The recording/reproducing device according to the present embodiment generates marker light for obtaining distance error between the objective lens 11 and the relay lens 7 both at the time of recording a hologram and at the time of reproducing a hologram. Generation of such marker light is realized with the driving control of the SLM 4 by the modulation control unit 20, but this point will be described later again.

Note that, at the time of recording, the modulation control unit 20 operates so as to generate an on/off pattern within the signal light area A2 for each predetermined increment of a recorded data string to be input, and thus, sequentially generate signal light in which data for each predetermined increment of the recorded data string is stored. Thus, recording of data in increments of hologram pages (data increments that can be recorded by one-time interference between signal light and reference light) is sequentially executed as to the hologram recording medium HM.

The laser beam subjected to intensity modulation at the intensity modulating unit made up of the polarized beam splitter 3 and the SLM 4 is input to the polarized beam splitter 5. This polarized beam splitter 5 is also configured so as to transmit p-polarized light and reflect s-polarized light. Accordingly, the above laser beam transmits the polarized beam splitter 5.

The laser beam transmitted through the polarized beam splitter 5 is input to the relay lens system where the relay lens 6 and the relay lens 7 are disposed in this order. As shown in the drawing, the light flux of the laser beams transmitted through the polarized beam splitter 5 condenses in a predetermined focal position by the relay lens 6, and the laser beam flux which is diffusion light after condensing is converted into parallel light by the relay lens 7. As shown in the drawing, of the relay lenses 6 and 7 making up the relay lens system, a relay lens driving unit 22 is provided as to the relay lens 7 disposed closer to the objective lens 11.

This relay lens driving unit 22 drives the relay lens 7 held movably in a direction parallel to the optical axis of the laser beam (both arrow directions in the drawing) based on the control by a later-described constant distance control unit 23.

The laser beam passed through the relay lens system is input to the dichroic mirror 8. The dichroic mirror 8 is configured so as to selectively reflect light made up of a predetermined wavelength band. In this case as well, the dichroic mirror 8 is configured so as to selectively reflect light of the wavelength band of the laser beam for recording/reproducing with a wavelength $\lambda=405$ nm or so, and thus, the laser beam for recording/reproducing input via the relay lens system is reflected at the dichroic mirror 8.

The laser beam for recording/reproducing reflected at the dichroic mirror 8 is input to the objective lens 11 via the partial diffraction element 9, and the quarter-wave plate 10 in this order. In this case as well, the partial diffraction element 9 is configured by a polarized light selecting diffraction element having the selective diffraction property corresponding to the polarized state of linear polarized light (one of the linear polarized light component is diffracted, and the other linear polarized light component is transmitted) being formed with a region where reference light is input, for example, such as a liquid crystal diffraction element or the like. Specifically, in this case, the polarized light selecting diffraction element included in the partial diffraction element 9 is configured so as to transmit p-polarized light and diffract s-polarized light.

Also, the quarter-wave plate 10 is disposed so as to be in a state in which as to the polarization direction axis of incident light (p-polarized light in this case), the optical reference axis thereof is inclined 45 degrees, and serves as a linear polarized light/circular polarized light conversion element.

Prevention of deterioration in the S/N ratio by the inbound reference light (reflected reference light) obtained as the reflected light from the hologram recording medium HM is achieved by the partial diffraction element 9 and the quarter-wave plate 10. That is to say, the outbound reference light input with p-polarized light transmits the partial diffraction element 9. Also, the inbound reference light (reflected reference light) input with s-polarized light via the hologram recording medium HM (reflective film L3), objective lens 11, and quarter-wave plate 10 in this order is diffracted (suppressed) at the partial diffraction element 9.

As also described above, the reflected reference light is light of which the intensity is too strong as compared to the reproduced image of a hologram obtained by taking advantage of a diffraction phenomenon. Thus, the reflected reference light becomes a noise component not negligible as to the reproduced image, and if this is guided to the image sensor 13, excessive deterioration in the S/N ratio is caused. Suppression of the reflected reference light by the partial diffraction element 9 and the quarter-wave plate 10 is executed, whereby such deterioration in the S/N ratio can be prevented effectively.

Note that, in this case as well, a region where the signal light is input of the partial diffraction element 9 (region where the reproduced image is input) is configured of, for example, a transparent material, or a hole portion so as to transmit both of the outbound light and the inbound light. That is to say, thus, an arrangement is made wherein the signal light at the time of recording is suitably irradiated on the hologram recording medium HM, and also the reproduced image at the time of reproducing is suitably guided to the image sensor 13.

Also, in this case, in order to allow the image sensor 13 to receive marker light generated within the gap area A3 such as described later, the partial diffraction element 9 is configured so as to transmit both of the outbound light and the inbound light of the marker light, by a region between a region where signal light is input and a region where reference light is input being also configured of a transparent material or a hole portion.

The objective lens 11 is held moveably in a direction toward/away from the hologram recording medium HM (focus direction) by the focus actuator 12 shown in the drawing. The later-described position control unit 19 controls the driving operation of the objective lens 11 by the focus actuator 12, and accordingly, the focus servo control of the laser beam is executed.

Note that while omitted from the drawings, control of the tracking direction of the laser beam (the radial direction of the hologram recording medium HM) can be executed, for example, by controlling a tracking driving unit configured to drive the whole of the optical system in the tracking direction, or the like.

Now, the present invention relates to principally control in the focus direction of a laser beam, and accordingly, a specific configuration for position control in the tracking direction should not be restricted particularly, and various of configurations may be used.

The laser beam for recording/reproducing is irradiated on the hologram recording medium HM so as to condense by the objective lens 11. Here, such as described above, at the time of recording, signal light and reference light are generated with the intensity modulation of the intensity modulating unit (the SLM 4 and the polarized beam splitter 3) based on the control from the modulation control unit 20. Subsequently, these signal light and reference light are irradiated on the hologram recording medium HM using the routes as described above. Thus, a hologram is formed on the recording layer L2 wherein recorded data is reflected with an interference pattern between the signal light and the reference light. That is to say, recording of data is executed.

Also, at the time of reproducing, based on the control of the modulation control unit 20, the intensity modulating unit generates reference light, and this reference light is irradiated on the hologram recording medium HM according to the above route. The reference light is thus irradiated, and accordingly, the reproduced image corresponding to the hologram formed on the recording layer L2 is obtained as the reflected light from the reflective film L3. This reproduced image is returned to the device side via the objective lens 11.

As described above, with the partial diffraction element 9, the incident region of signal light is determined to be a transmitted region. Accordingly, the reproduced image which was obtained from the hologram recording medium HM as described above, and passed through the objective lens 11, and the quarter-wave plate 10 in this order, transmits this partial diffraction element 9. The reproduced image passed through the partial diffraction element 9 is reflected at the dichroic mirror 8, and is then input to the polarized beam splitter 5 via the above relay lens system (relay lens 7, relay lens 6, in this order). The reflected light from the hologram recording medium HM is converted into s-polarized light by the operation of the quarter-wave plate 10, and accordingly, the reproduced image thus input to the polarized beam splitter 5 is reflected at this polarized beam splitter 5, and is input to the image sensor 13.

The image sensor 13 is, for example, a CCD (Charge Coupled Device) sensor or CMOS (complementary Metal Oxide Semiconductor) sensor or the like, receives the reproduced image from the hologram recording medium HM thus guided, and converts this into an electrical signal to obtain an image signal. The image signal thus obtained is a signal wherein an on/off pattern (i.e., a data pattern of "0" and "1") applied to signal light at the time of recording is reflected. That is to say, the image signal thus detected at the image sensor 13 becomes a readout signal of data recorded in the hologram recording medium HM.

The image signal which is the readout signal obtained by the image sensor 13 is supplied to the data reproducing unit 21. The data reproducing unit 21 executes identification of data of "0" and "1" for each pixel increment value of the SLM 4 included in the image signal from the image sensor 13, and demodulation processing of recorded modulated code to reproduce the recorded data if appropriate.

Also, in the case of the present embodiment, the readout signal by the image sensor 13 is also supplied to the constant distance control unit 23. The constant distance control unit 23 controls the driving operation of the relay lens 7 by the relay lens driving unit 22 based on the readout signal, thereby executing control so that the distance between the objective lens 11 and the relay lens 7 is constant in predetermined ideal distance.

Note that a specific technique of constant distance control realized by the constant distance control unit 23, and the internal configuration thereof will be described later again.

Also, with the recording/reproducing device shown in FIG. 2, in addition to the optical system for recording/reproducing a hologram described above, as an optical system (position control optical system) for executing the control of the recording/reproducing of a hologram, a second laser 14, a collimation lens 15, a polarized beam splitter 16, a condenser lens 17, and a photodetector (PD) 18 are provided.

With this position control optical system, the second laser 14 outputs the above red laser beam of a wavelength λ=650 nm or so as a laser beam for position control. The emission light from the second laser 14 is input to the dichroic mirror 8 via the collimation lens 15, and the polarized beam splitter 16 in this order. Here, the polarized beam splitter 16 is also configured so as to transmit p-polarized light and reflect s-polarized light.

As also described above, the dichroic mirror 8 is configured so as to selectively reflect the light of the wavelength band of the laser beam for recording/reproducing (λ=405 nm or so in this case), and accordingly, transmits the laser beam for position control from the second laser 14.

The laser beam for position control transmitted through the dichroic mirror 8 is, in the same way as the laser beam for recording/reproducing, irradiated on the hologram recording medium HM via the partial diffraction element 9, quarter-wave plate 10, and objective lens 11 in this order.

Note that the dichroic mirror 8 is provided, and accordingly, the laser beam for position control and the laser beam for recording/reproducing are synthesized on the same optical axis, and also this synthesized light is irradiated on the hologram recording medium HM via the common objective lens 11. That is to say, thus, an arrangement is made so that the beam spot of the laser beam for position control and the beam spot of the laser beam for recording/reproducing are formed on the same position in a direction parallel to the recording surface, and as a result thereof, position control operation based on the laser beam for position control such as described later is executed, and accordingly, control is executed so that the recording/reproducing position of a hologram is a position along a track.

Also, the wavelength difference between the laser beam for recording/reproducing and the laser beam for position control in this case is set to approximately 250 nm or so. Such sufficient wavelength difference is provided, and accordingly, with the laser beam for position control, sensitivity as to the recording layer L2 of the hologram recording medium HM is practically nonexistent.

Along with irradiation of such a laser beam for position control, reflected light corresponding to recorded information on the reflective film L5 is obtained from the hologram recording medium HM. This reflected light (referred to as "position control information reflection light") is input to the polarized beam splitter 16 via the objective lens 11, quarter-wave plate 10, partial diffraction element 9, and dichroic mirror 8 in this order. The polarized beam splitter 16 thus reflects the reflected light of the laser beam for position control input via the dichroic mirror 8 (the laser beam for position control reflected at the hologram recording medium HM is also converted into s-polarized light by the operation of the quarter-wave plate 10). The reflected light of the laser beam for position control reflected at the polarized beam splitter 16 is irradiated so as to condense on the detection surface of the photodetector 18 via the condenser lens 17.

The photodetector 18 includes multiple light reception elements, receives the position control information reflection light from the hologram recording medium HM irradiated via the condenser lens 17, and obtains the electric signal corresponding to the light reception result. That is to say, thus, reflected light information (reflected light signal) to which the uneven cross-sectional shape formed on the substrate L6 (on the reflective film L5) is reflected is detected.

Thus, the position control unit 19 is provided as a configuration for executing various types of position control relating to the recording/reproducing position of a hologram, such as focus servo control, tracking servo control, access control to a predetermined address, and the like, based on the reflected light information obtained at the photodetector 18.

The position control unit 19 is configured so as to include a matrix circuit for generating various types of signal used for position control such as a reproduced signal (RF signal) regarding a pit row formed on the reflective film L5 by matrix computation, a tracking error signal, a focus error signal, and the like, a computing circuit for executing servo computation or the like, and a driving control unit for driving and controlling each used unit such as the focus actuator 12, the above tracking driving unit, and the like.

While omitted from the drawings, with the recording/reproducing device shown in FIG. 2, there are provided an address detecting circuit for detecting address information based on the reproduced signal, and a clock generating circuit for generating clocks.

The position control unit 19 controls the tracking driving unit based on the address information or the tracking error signal, and accordingly, executes control of the beam spot position of the laser beam for position control. According to such control of the beam spot position, the beam spot position of the laser beam for recording/reproducing can be moved to a predetermined address, or followed to a position along a track (tracking servo control), or the like. That is to say, thus, control regarding the recording/reproducing position of a hologram is executed.

Also, the position control unit 19 controls the driving operation of the objective lens 11 in the focus direction by the focus actuator 12 based on the focus error signal, and accordingly, also executes focus servo control for having the focal position of the laser beam for position control follow on the reflective film L5. Thus, the focal position of the laser beam for recording/reproducing to be irradiated via the common objective lens 11 is also maintained in a predetermined position.

1-3. Shift of Focal Position

Now, with the recording/reproducing device according to the present embodiment, let us say that the focal position of the laser beam by the objective lens 11 (the ideal focal position set in system design) for recording/reproducing a hologram with the first laser 1 as a light source is shifted from the reflective surface of the reflective film L3 that is a focal position which had been set heretofore, and specifically, is shifted to a position that is further to the front than the reflective surface (objective lens 11 side). More specifically, the focal position of the laser beam for recording/reproducing is shifted to near the surface of the hologram recording medium HM.

Figure 4:
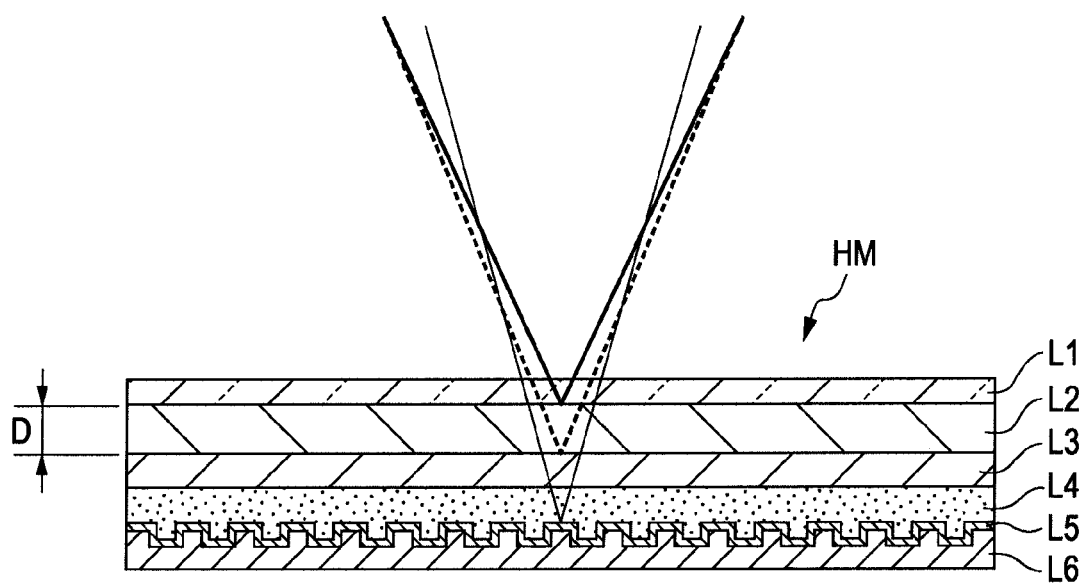
FIG. 4 is a diagram for describing the focal position (ideal focal position) of reproduced/reproduced light to be set with an embodiment.

FIG. 4 illustrates, as a diagram for describing the focal position of the laser beam for recording/reproducing to be set with the present embodiment, the laser beam for position control (thin solid line in the drawing) and the laser for recording/reproducing (heavy solid line in the drawing) to be irradiated on the hologram recording medium HM, along with the cross-sectional configuration of the hologram recording medium HM. Note that FIG. 4 also illustrates the laser beam for recording/reproducing in the case of the recording/reproducing system according to the related art as comparison using a heavy dashed line.

As shown in FIG. 4, with the present embodiment, the focal position of the laser beam for recording/reproducing is assumed to be set to a boundary surface between the cover layer L1 and the recording layer L2. In other words, the upper layer side face of the recording layer L2 is set to a focal position. In this case, the shift amount from the ideal focal position of the laser beam for recording/reproducing set according to the related art is equivalent to the thickness of the recording layer L2, indicated with "D" in the drawing.

Such shift of the ideal focal position of the laser beam for recording/reproducing can be realized by enlarging the separated distance between the objective lens and the hologram recording medium as compared to the related art.

Figure 5A:
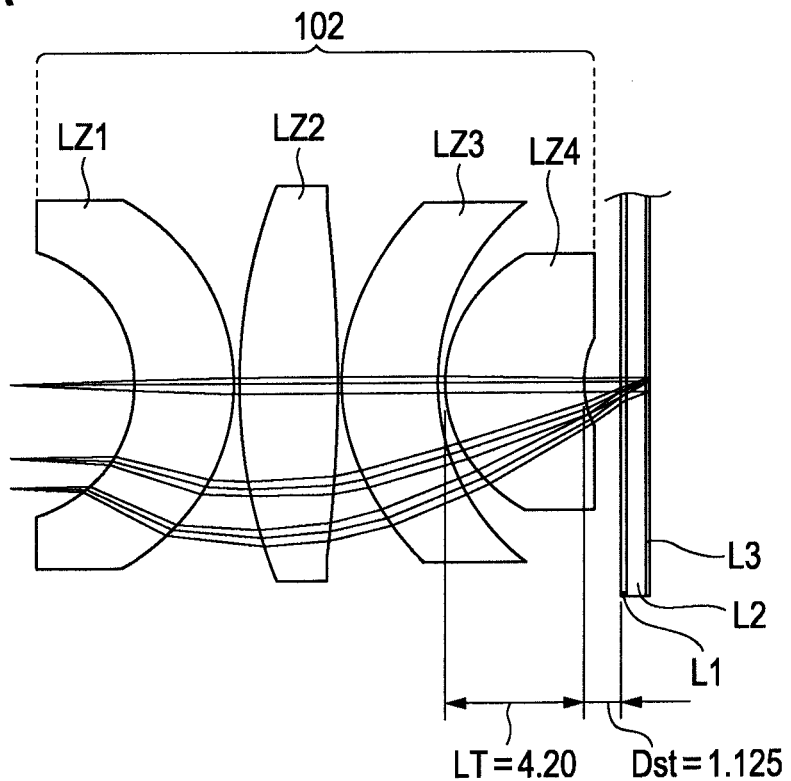
FIGS. 5A and 5B are diagrams for describing a setting example of separated distance between an objective lens and the hologram recording medium at the time of changing the focal position of reproduced/reproduced light.
Figure 5B:
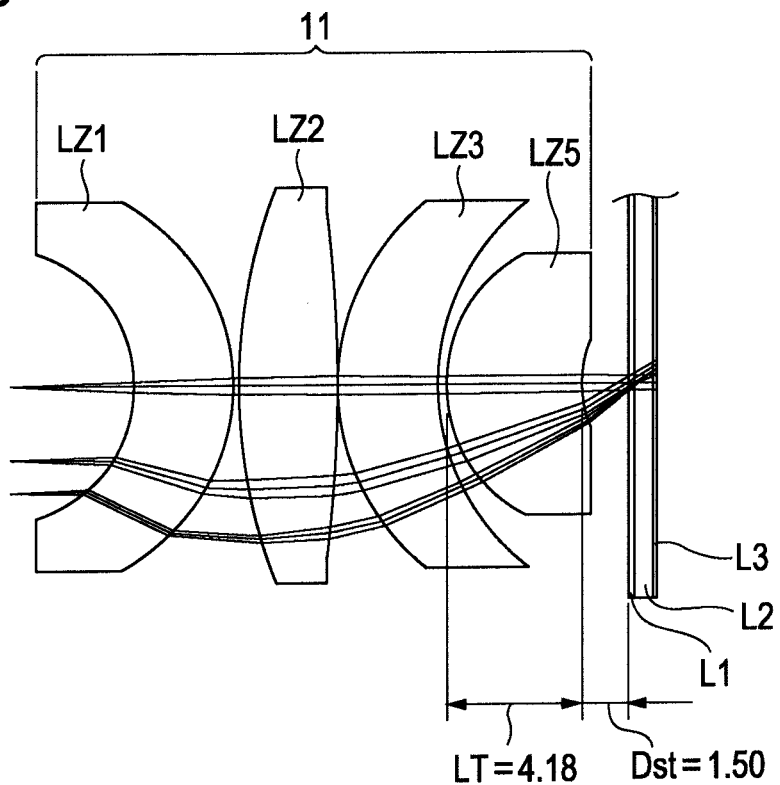

FIGS. 5A and 5B are diagrams for describing a setting example of the separated distance between the objective lens and the hologram recording medium at the time of changing the ideal focal position of the reproduced/reproduced light, wherein FIG. 5A illustrates an example of the case according to the related art using the objective lens 102, and FIG. 5B illustrates an example in the case of the present embodiment using the objective lens 11.

Each of the drawings extracts and illustrates only the objective lens 102 according to the related art or objective lens 11 according to the present example, the laser beam for recording/reproducing irradiated on the hologram recording medium via these objective lens, and the cover layer L1, recording layer L2, and reflective film L3 of the hologram recording medium.

As shown in FIG. 5A, in the case according to the related art, the objective lens 102 is configured so as to include, in order form the light source side, a lens LZ1, a lens LZ2, a lens LZ3, and a lens LZ4. At this time, with regard to the lens LZ4 having the maximum curvature, the thickness thereof (Dst in the drawing) is assumed to be Dst=1.125 mm.

With the recording/reproducing device according to the related art, such an objective lens 102 is used, the separated distance LT from the emission surface of this objective lens 102 to the hologram recording medium (surface) is set to LT=4.20 mm such as shown in the drawing, and accordingly, the ideal focal position of the laser beam for recording/reproducing is set to above the reflective film L3.

On the other hand, in FIG. 5B, in the case of the present embodiment, with regard to the objective lens 11, in the same way as the objective lens 102 according to the related art, it is common that the objective lens 11 includes, in order form the light source side, a lens LZ1, a lens LZ2, and a lens LZ3, but with regard to a lens having the maximum curvature equivalent to the lens LZ4 of the objective lens 102, a lens LZ5 is used of which the thickness LT is 4.18 mm reduced from LT=4.20 mm by 0.02 mm.

With the present example, the reason why the thickness LT is thus reduced is because suppression of spherical aberration caused due to the focal position being shifted is achieved.

In the case of the present embodiment, the distance Dst from the emission surface of the objective lens 11 to the hologram recording medium HM is enlarged from Dst=1.125 mm to Dst=1.50 mm according to the related art such as shown in the drawing by 0.375 mm.

According to the configuration of the objective lens 11 described above, and the setting of the separated distance Dst from the objective lens emission surface to the hologram recording medium, the ideal focal position of the laser beam for recording/reproducing according to the related art, set to above the reflective film L3, can be shifted to the upper layer side face of the recording layer L2 (boundary face between the cover layer L1 and the recording layer L2). Specifically, the ideal focal position of the laser beam for recording/reproducing can be shifted to an upper layer side than the position according to the related art by 0.6 mm.

Here, such adjustment of the separated distance Dst can be executed with adjustment of the installation position of a spindle motor medium holding unit for holding the hologram recording medium so as to be driven rotationally. With the recording/reproducing device according to the present embodiment, the installation position of such a medium holding unit is offset to the side further away from the objective lens than the case of the recording/reproducing device according to the related art. Thus, the ideal focal position of the reproduced/reproduced light is set to a position which is a side further upper than the lower layer side face of the recording layer L2 such as described above.

Note that, according to the separated distance Dst adjustment technique as such a present example, not only the ideal focal position of the laser beam for recording/reproducing is shifted, but also the ideal focal position is also similarly shifted regarding the laser beam for position control. As described with reference to FIG. 4, in the case of the present example, the ideal focal position of the laser beam for position control has to be set above the reflective film L5 as well as the technique according to the related art. That is to say, in the case that the ideal focal position of the laser beam for recording/reproducing is set to the upper layer side face of the recording layer L2 such as the present example, the separated distance between the ideal focal position of the laser beam for position control and the focal position of the laser beam for recording/reproducing has to be equal to distance between the upper layer side face of the recording layer L2 and the reflective surface of the reflective film L5 (L7).

With the present embodiment, this point is taken into consideration, the optical system is adjusted beforehand so that the separated distance between the ideal focal position of the laser beam for position control and the ideal focal position of the laser beam for recording/reproducing is equal to the distance between the upper layer side face of the recording layer L2 and the reflective surface of the reflective film L5 (L7) by changing collimation at the time of input of the laser beam for position control to the objective lens 11, or the like (e.g., adjustment of the position of the collimation lens 15, etc.).

Note that, with regard to a technique for shifting the ideal focal position of reproduced/reproduced light, various techniques can be conceived other than the technique exemplified above. For example, this may be realized by the design modification of the objective lens (102). With the present invention, a specific technique for shifting the ideal focal position of reproduced/reproduced light is not restricted to a particular technique, and a technique determined to be optimal according to the actual embodiment should be used.

1-4. Change of Behavior of Light Following Focal Position Shift

Now, in the case that the ideal focal position of reproduced/reproduced light is shifted from above the reflective surface of the reflective film L3, it goes without saying that the behavior of the light differs from the behavior according to the related art.

Change in a Hologram to be Recorded

The shape of a hologram to be recorded in the recording layer L2 differs from the shape according to the related art, due to the ideal focal position being shifted. This point will be described with reference to FIGS. 6 through 9.

Now, the common parts of FIGS. 6 through 9 will be described. Each of FIGS. 6 through 9 extracts and illustrates only the objective lens 11 (objective lens 102 in the case of FIG. 6), the cover layer L1, recording layer L2, and the reflective surface of the reflective film L3, and also illustrates the situation of the light beam of the reproduced/reproduced light irradiated on the hologram recording medium HM.

As can be understood from the above description in FIG. 1, in reality, the light reflected at the reflective surface of the reflective film L3 (=inbound light) returns to a side where outbound light is input, but for the sake of convenience of drawing in FIGS. 6 through 9, with regard to the inbound light, the recording layer L2, cover layer L1, and objective lens 11 or 102 are also illustrated by being bounced back to the opposite side of the side where the outbound light is input, with the reflective surface as a boundary.

Also, the flat surface SR in FIGS. 6 through 9 represents the real image surface of the SLM 4 formed by the relay lens system (relay lenses 6 and 7) (the object surface for the objective lens). Also, the flat surface Sob in the drawing represents the pupil surface of the objective lens 11 (objective lens 102 in FIG. 6).

Also, in FIGS. 6 through 9, with regard to signal light, of the pixels within the signal light area A2, only a total of three pixels worth of light beam of the central one pixel worth of light beam identical to the optical axis, and other two pixels worth of light beam is extracted and illustrated. Also, with regard to reference light, only two pixels worth of light beam each disposed in the outermost circumferential portion within the reference area A1 is extracted and illustrated.

First, the shape of a hologram to be formed on the hologram recording medium HM by the recording/reproducing system according to the related art will be described with reference to FIG. 6.

In the case according to the related art, the focal position of reproduced/reproduced light is set to above the reflective surface of the reflective film L3. Note that, thus, with the recording/reproducing device according to the related art, the focal length f of the objective lens 102 is set to distance from the pupil surface Sob of the objective lens to the reflective surface.

In this case, each light beam of signal light, and each light beam of reference light condenses in one point on the reflective surface such as shown in the drawing.

At this time, each light beam of signal light and reference light (light beam for each pixel) condenses on the real image surface SR such as shown in the drawing by passing through the relay lenses 6 and 7 shown in FIG. 2, and is then input to the objective lens 102 in a diffusion light state. Subsequently, each light beam input to the objective lens 102 condenses in one point on the reflective surface of the hologram recording medium HM in a parallel light state.

In the case according to the related art where the focal position of reproduced/reproduced light is set to above the reflective surface, the optical path lengths of the inbound light and the outbound light are equal, and accordingly, each light beam of the outbound light and the inbound light has a symmetric shape with the reflective surface as the center axis such as shown in the drawing, and according to this, a hologram to be formed on the recording layer L2 is also formed in a symmetric shape with the reflective surface as the center axis such as surrounded with a heavy frame in the drawing.

Note that a hologram is formed with interference between signal light and reference light. Accordingly, a hologram is formed on a portion where signal light and reference light are overlapped within the recording layer L2. With the coaxial method, the light flux of signal light/reference light is irradiated on a recording medium so as to be converged into one point (on the reflective surface in this case), and accordingly, the shape of the hologram formed in this case is a hourglass shape such as shown in the drawing.

Note that FIG. 6 illustrates the reflected light to originally return to the outbound light side by bouncing back this to the opposite side, and accordingly, the shape of the hologram becomes a hourglass shape such as described above, but in reality, the hologram of the right half in the drawing (trapezoidal shape) is formed so as to overlap with the hologram of the left half in the drawing.

Figure 7:
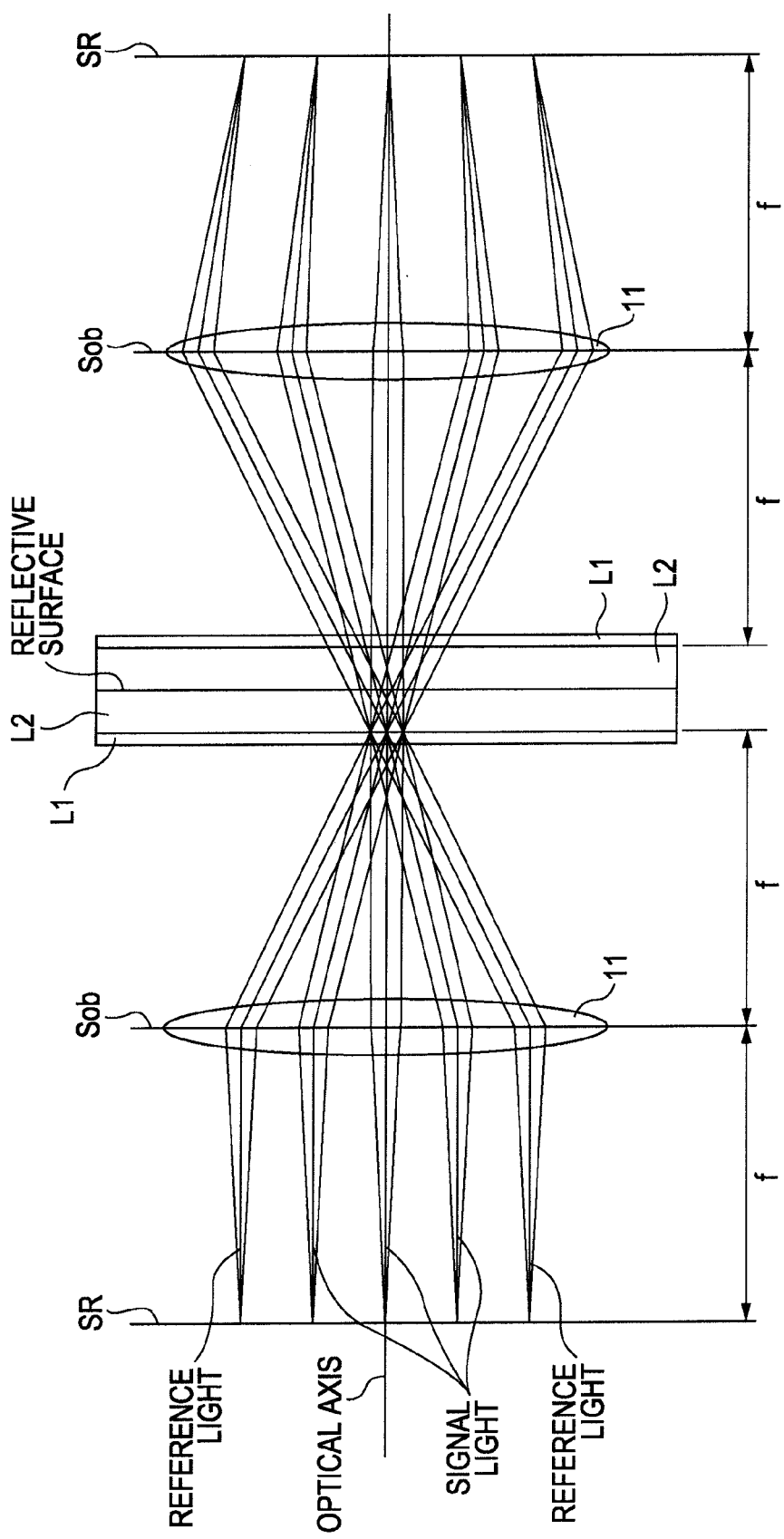
FIG. 7 is a diagram illustrating a situation of the light beams of signal light, reference light, and the inbound light thereof to be irradiated on the hologram recording medium in the case of the present embodiment.

FIG. 7 illustrates the situation of signal light and reference light irradiated on the hologram recording medium HM, and the light beam of the inbound light thereof, in the case of the present example where the focal position of the recording/reproduced light is the upper layer side face of the recording layer L2.

First, in the case that the focal position is set to the upper layer side face of the recording layer L2, the focal length f of the objective lens 11 is, as can be understood from the drawing, the distance from the pupil surface Sob to the upper layer side face of the recording layer L2.

As shown in the drawing, in this case, signal light and reference light which is diffusion light after condensing are irradiated onto the recording layer L2. Thus, in this case, the shape of a hologram formed within the recording layer L2 becomes a shape such as shown with a heavy frame in FIG. 8. FIG. 9 illustrates a situation wherein the hologram thus recorded is reproduced.

As can be understood from the above description, reference light is irradiated on the hologram formed on the recording layer L2, and according to a diffraction phenomenon, reproduced light (reproduced image) regarding recording signal light is output. FIG. 9 illustrates each light beam of reference light (outbound) irradiated at the time of reproducing, reproduced light obtained according to irradiation of the reference light, and reference light reflected at the reflective surface (reflected reference light; inbound reference light). Also, this drawing illustrates the trajectory of each light beam of signal light irradiated at the time of recording together.

Change in the light beam position of the inbound light

Now, as can be clearly seen by comparing FIG. 6 and FIGS. 7 through 9, in the case of the present example wherein the focal position is shifted from above the reflective surface, deviation is caused in the position of each light beam between outbound light and inbound light.

Light behavior in the case according to the related art and light behavior in the present example case as the whole optical system will be confirmed with reference to FIGS. 25, and 10 through 12.

Figure 10:
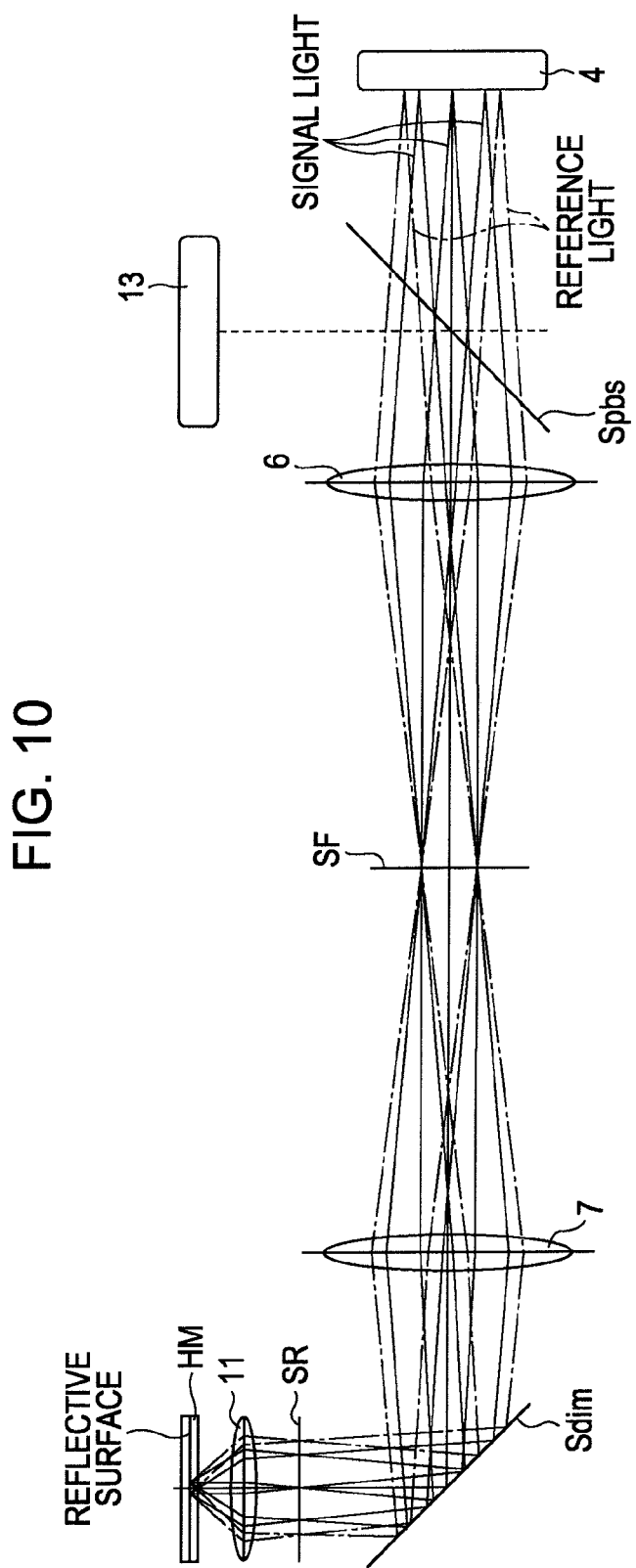
FIG. 10 is a diagram illustrating the behavior of light as the whole of an optical system regarding outbound light at the time of recording in the case of the present embodiment.
Figure 11:
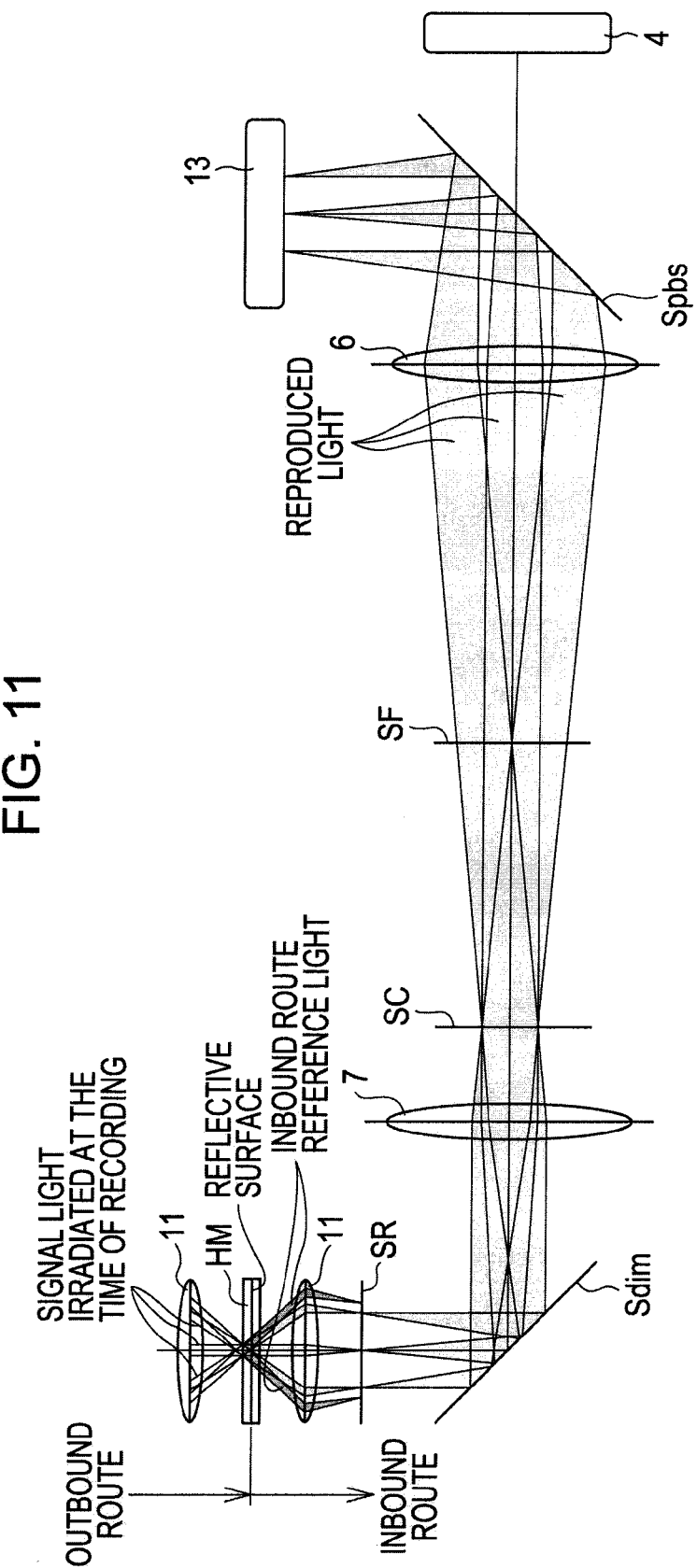
FIG. 11 is a diagram illustrating the behavior of light as the whole of an optical system regarding inbound light at the time of reproducing in the case of the present embodiment.
Figure 12:
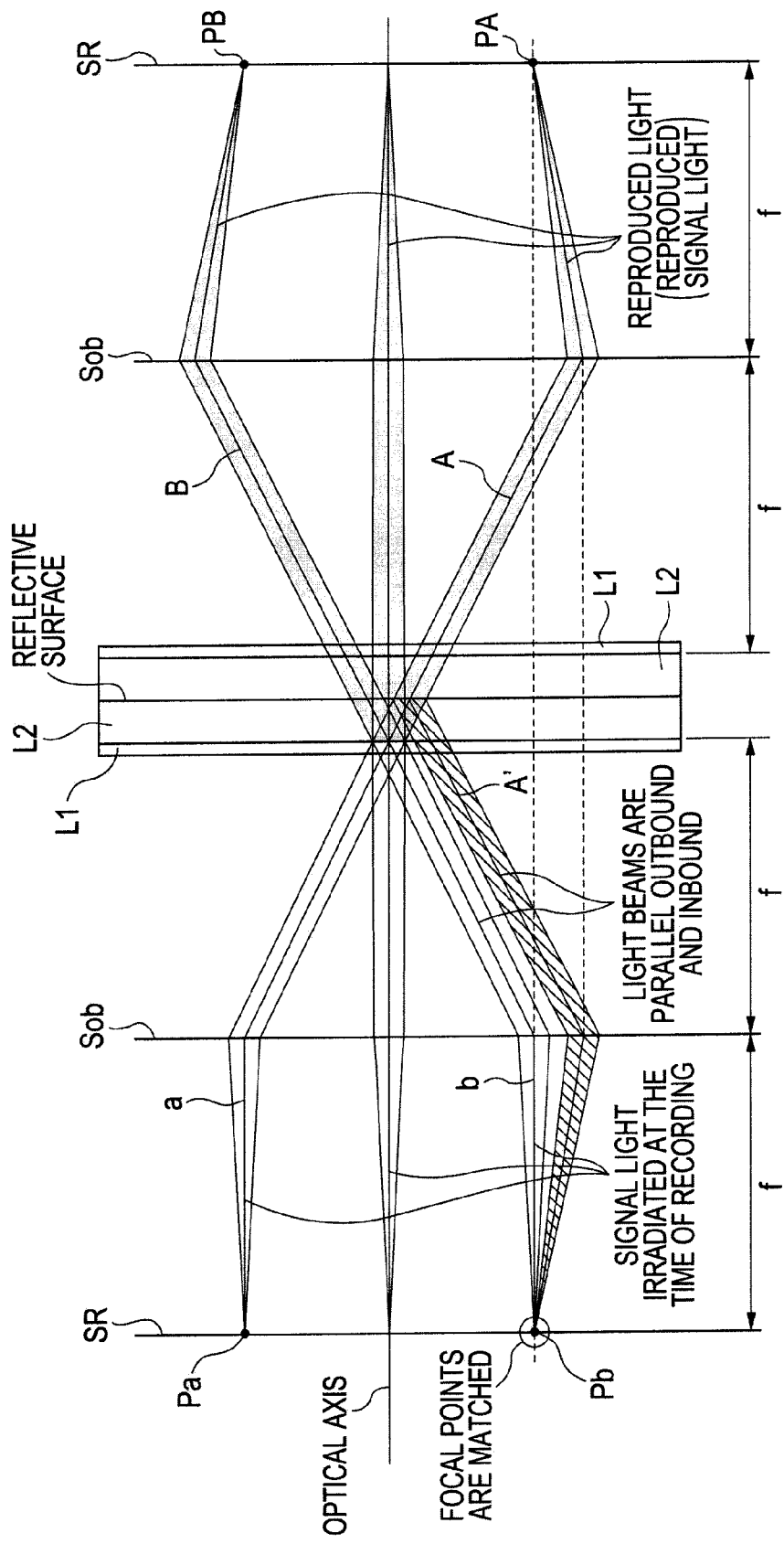
FIG. 12 is a diagram for describing a reason why the position of each light beam of outbound light and inbound light match on a real image surface in the case of the present embodiment.

Note that FIGS. 10 through 12 also representatively illustrate just three pixels worth of light beam regarding signal light and just two pixels worth of light beam regarding reference light, respectively.

Also, FIGS. 10 through 12 extract and illustrate, of the configuration of the whole optical system, just the SLM 4, relay lenses 6 and 7, and objective lens 11. Also, these diagrams illustrate the hologram recording medium HM as well. Note that the flat surface Spbs in each drawing represents the reflective surface of the polarized beam splitter 5, and the flat surface Sdim represents the reflective surface of the dichroic mirror 8.

First, as described above with reference to FIG. 25, in the case according to the related art, the outbound path and the inbound path are the same in a position where each light beam passes.

Note that in the case according to the related art such as shown in FIG. 25, the light beam emitted from each pixel of the SLM 4 is input to the relay lens 6 via the flat surface Spbs (polarized beam splitter 5) in a diffusion light state. At this time, with the emission light beams from the pixels, the corresponding optical axes are in a parallel state.

The light beam of each pixel input to the relay lens 6 is converted from diffusion light to parallel light such as shown in FIG. 25, and also the optical axis of each light beam except for the light beam above the laser beam axis (the optical axis of the whole laser beam flux) is bent to the laser beam axis side. Thus, with the flat surface SF, each light beam condenses on the laser beam axis in a parallel light state. Here, the flat surface SF is, in the same way as the focal point surface by the objective lens 102, a surface where the light beam of each pixel according to parallel light condenses on the laser beam axis, and is referred to as a Fourier surface (frequency flat surface).

As described above, each light beam thus condensing on the laser beam axis of the Fourier surface SF is input to the relay lens 7, but at this time, each light beam emitted from the relay lens 6 (excluding the light beam of the central pixel including the laser beam axis) intersects the laser beam axis on the Fourier surface SF. Thus, the relationship of the input/output position of each light beam between the relay lens 6 and the relay lens 7 assume an axial symmetrical relationship with the laser beam axis as the center.

Each light beam is converted into converged light such as shown in the drawing by passing through the relay lens 7, and also the optical axes of the light beams become parallel one to another. Each light beam passed through the relay lens 7 is reflected at the flat surface Sdim (dichroic mirror 8), and condenses in the corresponding position on the real image surface SR shown in FIG. 6. At this time, with the light beams passed through the relay lens 7, the corresponding optical axes are in a parallel state, and accordingly, with the real image surface SR, the condensing positions of the light beams are not overlapped and become separate positions. Note that the behavior of the light after the real image surface SR is as described above in FIG. 6.

Here, as also described above, FIG. 25 illustrates each light beam of reproduced light reflected at the flat surface Spbs and guided to the image sensor 13, but the reason why only the reproduced light is guided to the image sensor 13 such as shown in the drawing is because reflected reference light is suppressed by the partial diffraction element 9 (and quarter-wave plate 10) described above.

Note that the partial diffraction element 9 is provided to the real image surface SR or the neighborhood thereof. This is because the partial diffraction element 9 has to selectively transmit/diffract light between the region of signal light and the region of reference light such as described above, and accordingly, unless the partial diffraction element 9 is disposed in a position where the same image as with the SLM 4 (image generating surface), the operation of transmission/diffraction suitably selected is not readily obtained.

Also, at the time of reproducing, reproduced light is obtained in the same light beam position as each light beam position of signal light irradiated at the time of recording. That is to say, each light beam of the reproduced light follows the same positions as with each light beam of the signal light in the drawing, reaches the flat surface Spbs, and is reflected at this flat surface Spbs and guided to the image sensor 13. At this time, each light beam of the reproduced light emitted from the relay lens 6 to the flat surface Spbs side is in a convergence state and the corresponding optical axes are in a parallel state such as shown in the drawing, and these light beams condense in a separate position on the detection surface of the image sensor 13. Thus, the same image as the reproduced image of the real image surface SR is obtained on the detection surface of the image sensor 13.

FIG. 10 illustrates the behavior of light regarding the outbound light at the time of recording as the behavior of light in the present example case.

In this case, the behavior of the light from the SLM 4 to the objective lens 11 is the same as the behavior according to the related art. A point different from the behavior according to the related art is in that, such as described above in FIG. 7, the focal position of reproduced/reproduced light (i.e., the condensing position of each light beam of signal light/referenced light passed through the objective lens 11 in the drawing) is not above the reflective surface of the reflective film L3, but is shifted to a boundary surface between the cover layer L1 and the recording layer L2.

FIG. 11 illustrates the behavior of the light of inbound light at the time of reproducing in the present example case. Note that FIG. 11 illustrates both outbound lights of reference light which is outbound light irradiated on the hologram recording medium HM from the objective lens 11 at the time of reproducing, and signal light irradiated at the time of recording (colorless light beam) by bouncing back these to the opposite side with the reflective surface of the hologram recording medium HM as a boundary.

Figure 8:
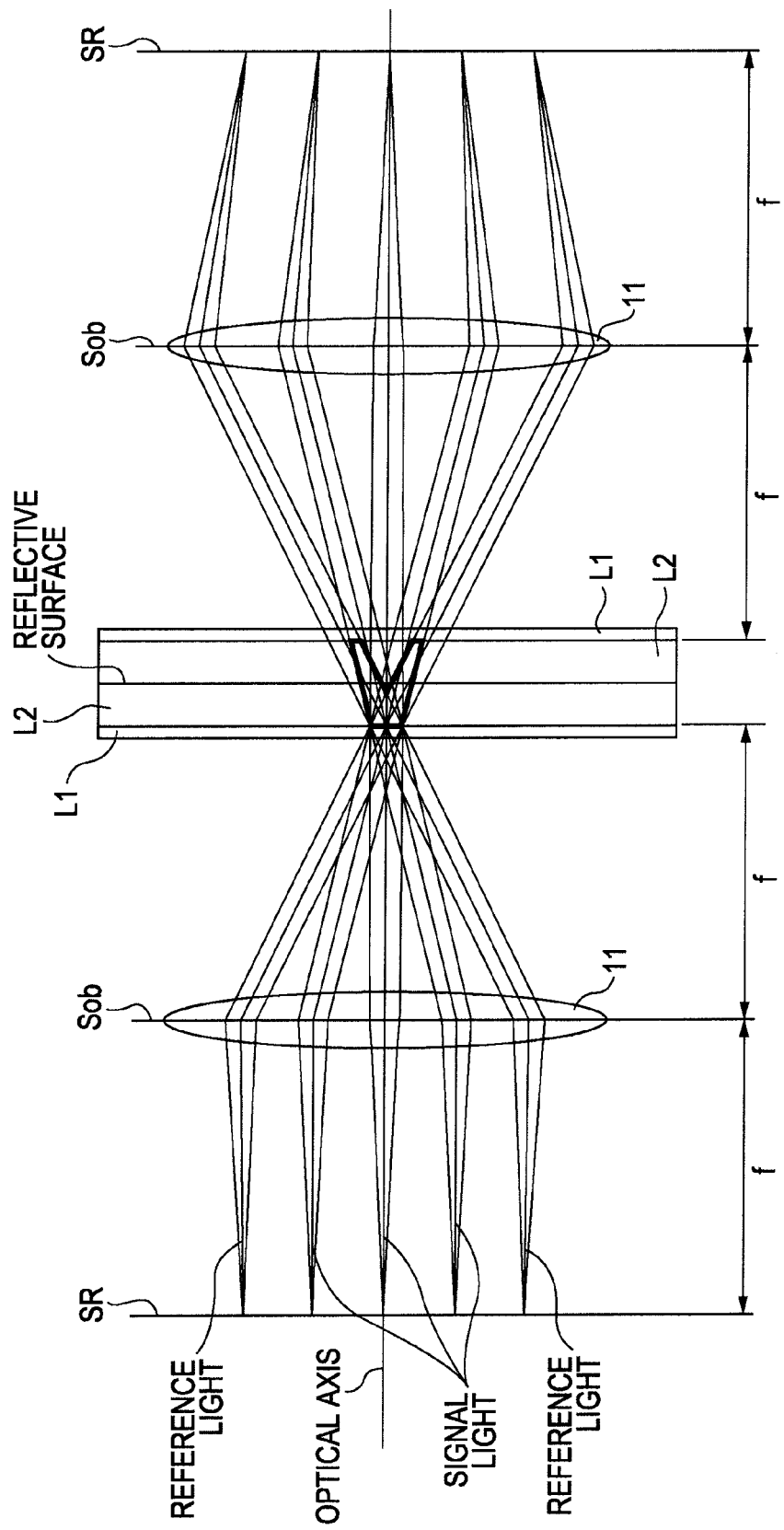
FIG. 8 is a diagram for describing the shape of a hologram to be formed on the hologram recording medium in the case of the present embodiment.
Figure 9:
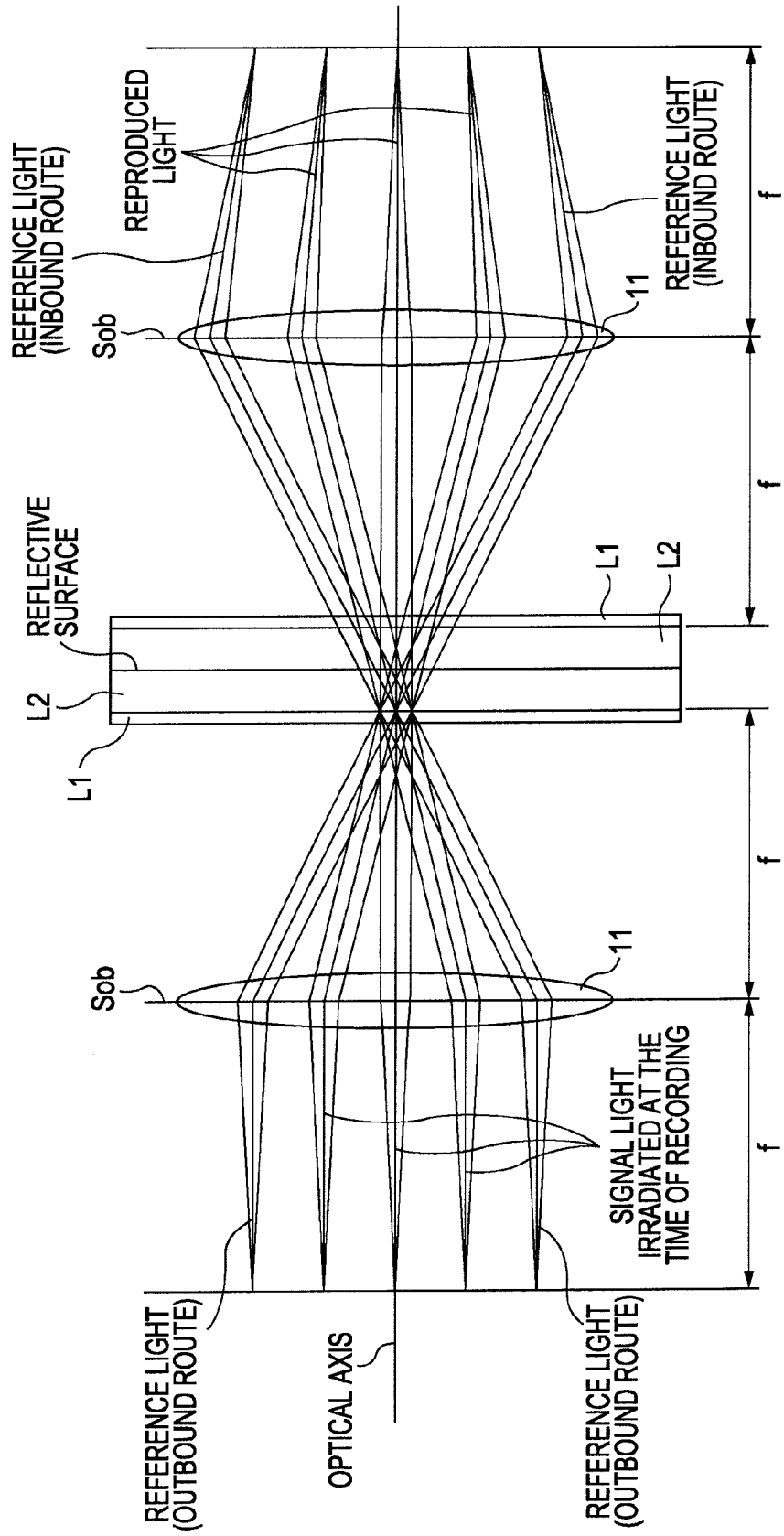
FIG. 9 illustrates a situation where the hologram recorded in the case of the present embodiment is reproduced.

As also shown in FIGS. 7 through 9, in the case of the present example wherein the focal position is shifted from above the reflective surface to the upper layer side, the incident position of each light beam to the pupil surface Sob of the objective lens 11 (excluding the light beam of the central pixel including the laser beam axis) differs between the outbound light and the inbound light. Specifically, the input position of the inbound light is shifted further outwards as compared to the input position of the outbound light. Thus, in the present example case, with the homeward route light shown in FIG. 11 and the outbound light shown in FIG. 10, the positions of the light beams are not matched.

Also, the input position to the pupil surface Sob of the objective lens 11 differs between the outbound light and the inbound light, and accordingly, the input position of each light beam with the pupil surface of the relay lens 7 and the pupil surface of the relay lens 6 differs between the outbound light and the inbound light. According to this, the condensing surface of each light beam formed by the relay lens system made up of the relay lenses 6 and 7 also is a different position between the outbound light and the inbound light.

Specifically, such as described above, in the event that the input position to the pupil surface Sob of each light beam of the inbound light is shifted to outer side, the input position to the pupil surface of the relay lens 7 of each light beam is shifted further inwards than the input position of the outbound light, and accordingly, the condensing surface of the inbound light (referred to as "inbound coupling surface SC") is shifted to the condensing surface of the outbound light, i.e., a position closer to the relay lens 7 side than the Fourier surface SF.

However, it is noteworthy that the condensing position of each light beam is the same as with the case of FIG. 25 or FIG. 10 on the real image surface SR (the detection surface of the image sensor 13 is the same). That is to say, thus, the condensing positions of the light beams are matched on the real image surface SR, and accordingly, a reproduced image can be detected suitably by the image sensor 13 at the time of reproducing in the same way as with the related art.

Now, description will be made regarding the reason why the positions of the light beams of the outbound light/inbound light are matched on the real image surface SR, with reference to FIG. 12. Note that FIG. 12 extracts and illustrates, in the same way as with the above FIGS. 7 through 9, the real image surface SR, the pupil surface Sob of the objective lens 11, and the cover layer L1, recording layer L2, and the reflective surface of the reflective film L3, and also illustrates each light beam of the reproduced light output from the hologram recording medium HM at the time of reproducing. With regard to the light beams of the reproduced light, a total of three of the light beam of the central pixel, and two pixels each positioned in the outermost circumference are illustrated as representatives. Also, FIG. 12 illustrates each light of signal light irradiated at the time of recording as outbound light (with regard to a colorless light beam in the drawing, similarly, only a total of three pixels worth of light beam of the central pixel, and the outermost circumferential pixel ×2), and also the inbound light (reproduced light in this case) is, in the same way as the above FIGS. 7 through 9, illustrated by bouncing back to the opposite side with the reflective surface as a boundary as well as the cover layer L1 and recording layer L2.

Now, let us say that with regard to each light beam of signal light irradiated at the time of recording, a light beam positioned in the uppermost portion in the drawing is a, and a light beam positioned in the lowermost portion is b. Also, with regard to each light beam of reproduced light, a light beam positioned in the uppermost portion is B, and a light beam positioned in the lowermost portion is A.

Also, on the real image surface SR, the condensing position (focal position) of the light beam a in the signal light is taken as Pa, the condensing position of the light beam b is taken as Pb, and similarly, the condensing position on the real image surface SR of the light beam A in the reproduced light is taken as PA, and the condensing position of the light beam B is taken as PB.

In FIG. 12, the light beam A' in the drawing is illustrated without bouncing back the light beam A in the reproduced light. Here, the light beam A is light parallel to the light beam a. Also, with the coaxial method, the light beams a and b are irradiated on the hologram recording medium HM with the same incident angle with the optical axis as a boundary. Accordingly, the light beam A' is light parallel to the light b.

Now, according to the property of the objective lens (convex lens), when such parallel two beams are passed through the objective lens 11, with the focal point surface (real image surface SR here) apart by the focal length f, the condensing positions of these two beams are matched. That is to say, thus, the condensing position Pb on the real image surface SR of the light beam b, and the condensing position PA on the real image surface SR of the light beam A are matched.

Also, such relationship holds regarding the light beams a and B as well, and accordingly, the condensing position Pa on the real image surface SR of the light beam a, and the condensing position PB on the real image surface SR of the light beam B are also matched.

According to such a principle, even in the case that the ideal focal position of reproduced/reproduced light is shifted from above the reflective surface, with the real image surface SR, the condensing position of each light beam of the inbound light is arranged to be identical to the condensing position of each light beam of the outbound light.

Description will now return to FIG. 11. As described above, that with the real image surface SR, the condensing position of each light beam of the inbound light is identical to the condensing position of each light beam of the outbound light means that with the real image surface SR, the condensing position of each light is the same as with the related art.

Thus, the reproduced image obtained on the real image surface SR at the time of reproducing is the same as with the case according to the related art (i.e., a case where the reflective surface is taken as the focal position), and thus, even with the light reception surface of the image sensor 13 having coupling relationship with the real image surface SR, a suitable reproduced image can be detected according to the related art. That is to say, no failure such as deviation or blurring of a reproduced image occurs due to discrepancy of the light beam positions of the outbound light/inbound light by shift of the ideal focal position, and accordingly, suitable reproducing of data can be executed.

Note that, as can be understood from the above description, even in the case of using a technique for shifting the focal position, the configuration according to the related art does not have to be modified except for the objective lens 11 as the configuration of the optical system for guiding reproduced/ reproduced light to the hologram recording medium HM, and also guiding the reproduced light obtained from the hologram recording medium HM to the image sensor 13.

Also, it should be noted that the above description is premised on a state in which the distance between the objective lens 11 and the relay lens 7 is maintained with ideal distance set at the time of system design.

Figure 26:
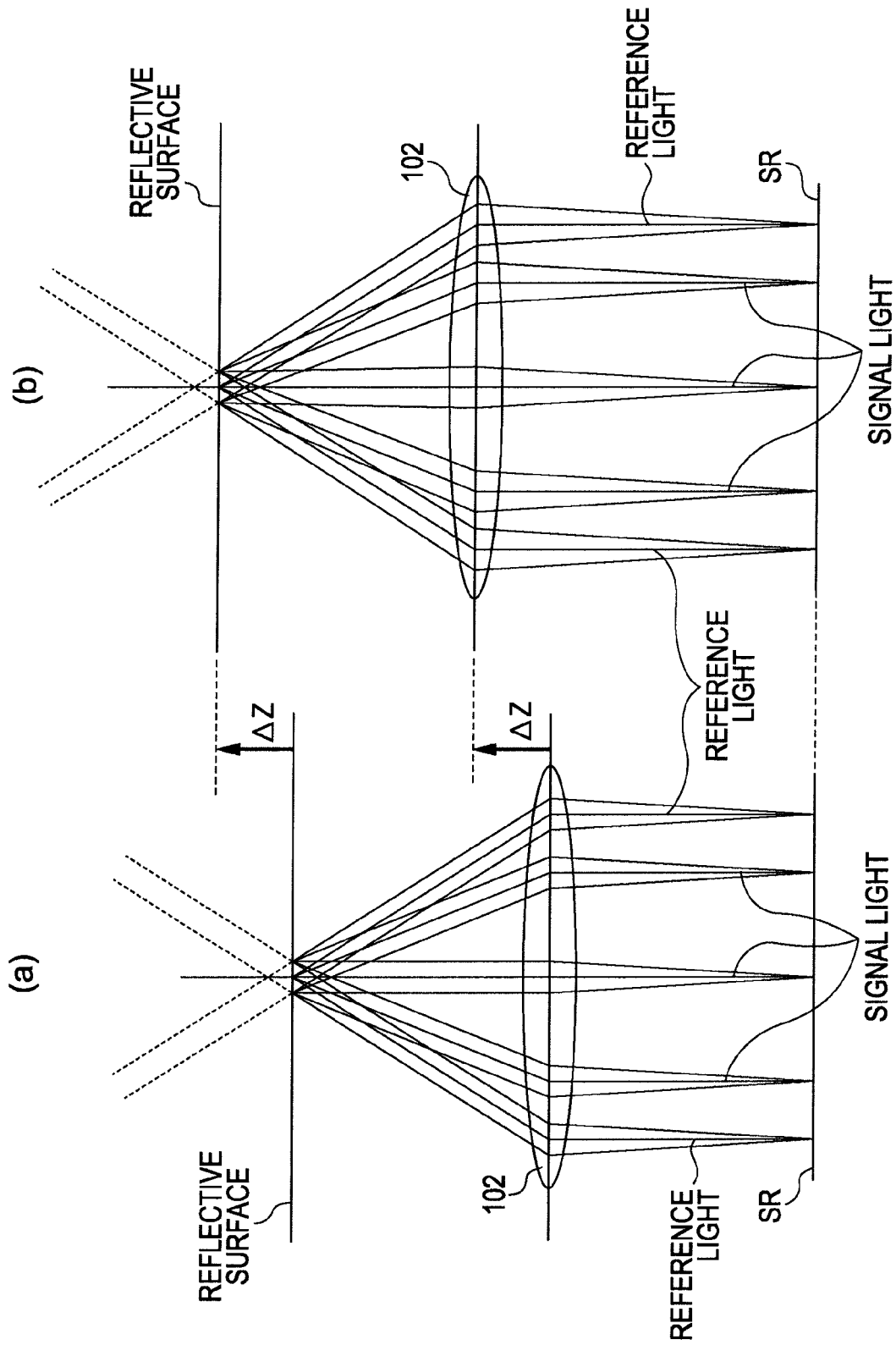
FIG. 26 is a diagram illustrating the situation of each light beam of signal light and reference light in a state in which the reflection surface and the objective lens are disposed in an ideal position, and the situation of each light beam at the time of the objective lens being driven following displacement from the ideal position of the reflection surface in a comparative manner.

1-5. Constant Distance Control between Objective Lens and Relay Lens Serving as Embodiment As described above with reference to FIG. 26, with the hologram recording/reproducing system, in the case that distance between the objective lens which is the output end of reproduced/reproduced light as to the hologram recording medium HM, and the relay lens (relay lens 7) for forming an object surface as to the objective lens is changed from ideal distance, the same reference light is not readily irradiated at the time of recording/reproducing, and with the inbound path, blurring of a reproduced image occurs due to the focal position of each light beam emitted from the objective lens being not identical to the real image surface SR, and accordingly, suitable recording/reproducing is not readily executed.

In response to this, with the recording/reproducing device according to the present embodiment, the relay lens driving unit 22 and the constant distance control unit 23 shown in FIG. 2 are provided, and the relay lens 7 is moved so as to follow the objective lens 11 to be displaced from an ideal position according to focus servo control, thereby executing control so that the distance between the objective lens 11 and the relay lens 7 is constant.

Generation of Marker Light

Now, such as described above with reference to FIGS. 4, 5A, and 5B, with the recording/reproducing device according to the present example wherein the focal position is shifted to a side further to the front than the position according to the related art, error from the ideal distance of the distance between the objective lens 11 and the relay lens 7 due to change in the behavior of light such as described in FIGS. 10 through 12 can optically be detected by taking advantage of the reflected light from the hologram recording medium HM.

Specifically, with the system wherein the focal position is shifted such as the present example, as shown in FIG. 11, of each light beam which input to the image sensor 13 from the flat surface Spbs, a certain angle is given to a light beam other than the center portion. That is to say, with the optical system according to the related art shown in FIG. 25, light beams follow the same position with the outbound path/inbound path, and accordingly, the optical axes of the light beams input to the image sensor 13 are in a parallel state, but with the present example wherein the focal position is shifted, change in the behavior of light is caused such as described in FIG. 11, and accordingly, of the light beams to be input to the image sensor 13, only the light beam of the central pixel including the laser beam axis is input with an incident angle of 0 degree in the same way as with the case according to the related art, and on the other hand, light beams of other regions are input with a certain incident angle.

According to this, in the case that the distance between the objective lens 11 and the relay lens 7 is shifted from the above ideal distance, of light beams to be input to the image sensor 13, change in the incident angles of light beams except for the central light beam is caused, and as a result thereof, deviation is caused as to the light reception positions of these light beams. That is to say, such deviation of the light reception positions is taken advantage, whereby error from the above ideal distance of the distance between the objective lens 11 and the relay lens 7 can optically be detected.

Figure 13:
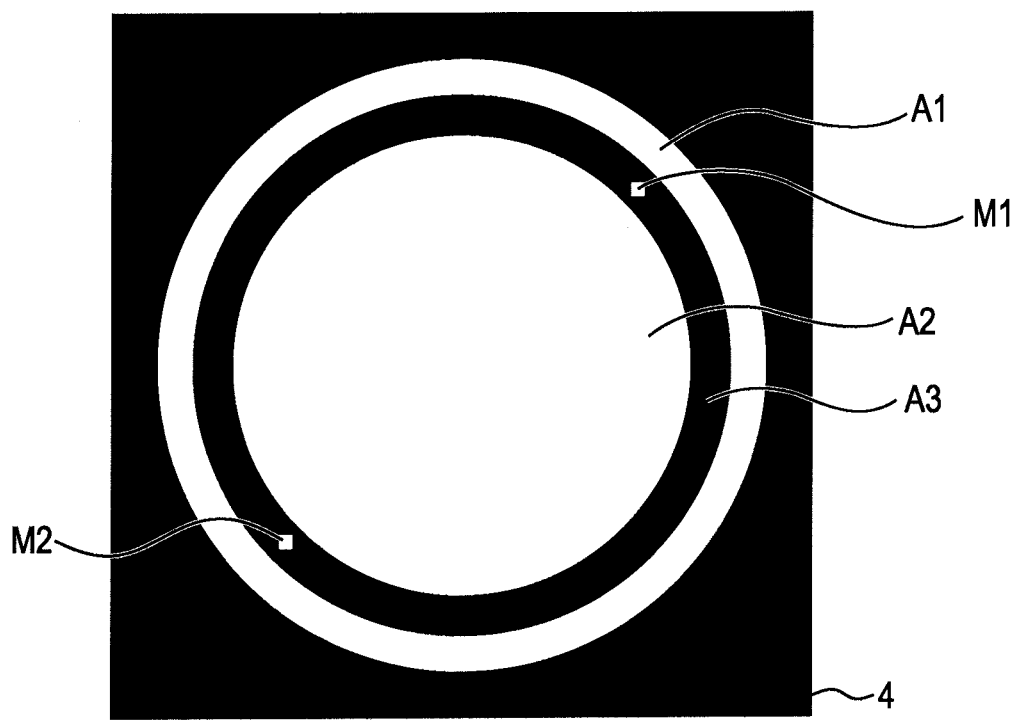
FIG. 13 is a diagram illustrating a generated example of marker light.

With the present embodiment, marker light such as shown in FIG. 13 is generated as light used for detecting distance error between the objective lens 11 and the relay lens 7 based on such light reception position deviation. FIG. 13 illustrates the areas (A1 through A3) set at the SLM 4, but the above marker light is generated in a predetermined region of the modulation surface of the SLM 4. Specifically, with the present embodiment, marker light is generated within the gap area A3 that is a boundary region between the reference area A1 and the signal light area A2. Moreover, with the present embodiment, two of marker light M1 and marker light M2 are generated as marker light. These marker lights M1 and M2 are generated in the corresponding positions making up axial symmetry with the laser beam axis as a reference.

Note that FIG. 13 illustrates the reference light area Al and the signal light area A2 using white, but this does not mean that these areas A1 and A2 are all turned on (transmitted), and as can be understood from description in FIG. 2, the signal area A2 is an area where an on/off pattern according to recorded data is successively given at the time of recording, and the whole area is off at the time of reproducing, and the reference area A1 is an area where a predetermined on/off pattern is given at the time of recording, and the same on/off pattern as that at the time of recording is given at the time of reproducing.

Note that in the case of generating the marker lights M1 and M2 alone, the areas A1 and A2 are all turned off. Also, with the present embodiment, let us say that the sizes of the marker lights M1 and M2 are set to 4 pixels×4 pixels, for example.

Here, the greater the size of marker light is, the more advantageous the ease of detection is. However, the greater the size is, the more occurrence of stray light is aided, and accordingly, deterioration in recording/reproducing performance may be caused. The size of marker light should be set to an optimal size as appropriate according to the configuration of the actual optical system, or the like, taking such a trade-off relationship into consideration.

As described above, the marker lights M1 and M2 in this case are generated in positions away from the laser beam axis. Accordingly, these can suitably be used for detection of distance error between the objective lens 11 and the relay lens 7 based on the light reception position deviation such as described above.

Figure 14A:
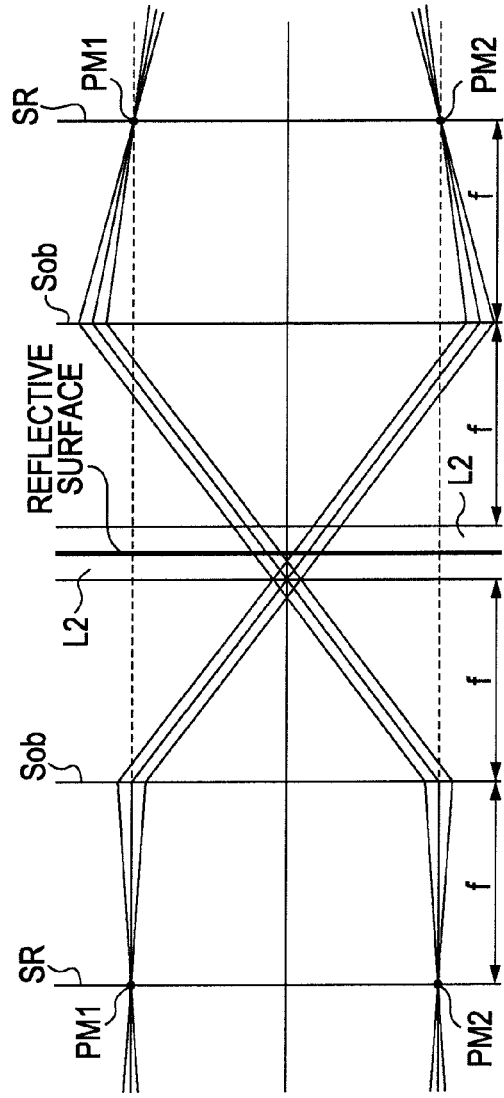
FIGS. 14A and 14B are diagrams for describing change in the behavior of marker light according to change in distance between an objective lens and a relay lens.
Figure 14B:
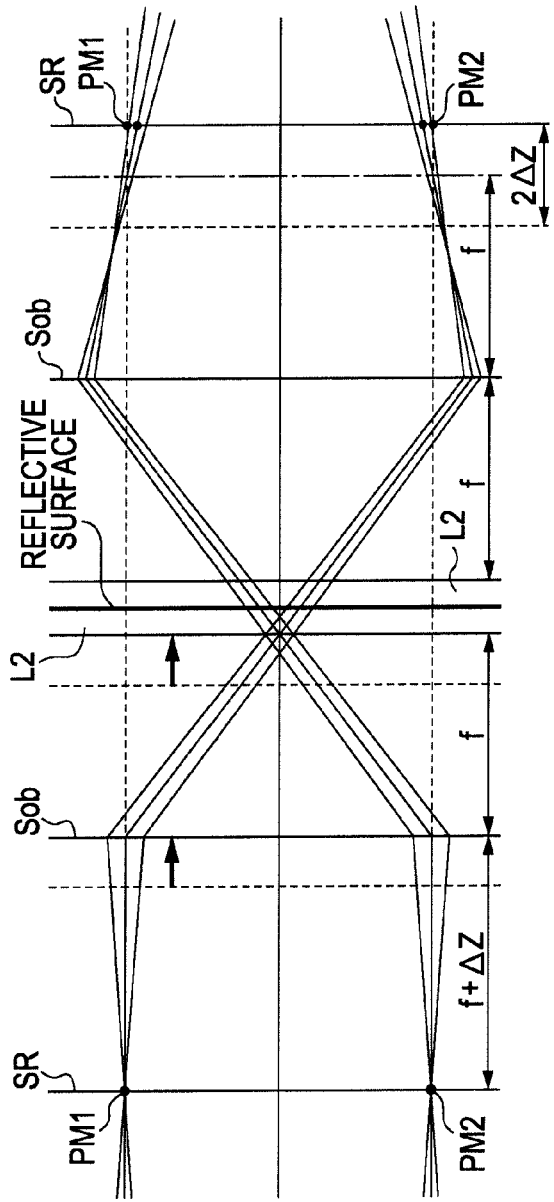

Change in the behavior of marker light according to change in the distance between the objective lens and the relay lens Now, in the case that the distance between the objective lens 11 and the relay lens 7 is changed from the above ideal distance, description will be made regarding how the behavior of the optical system of the marker light changes. FIGS. 14A and 14B are diagrams for describing change in the behavior of marker light according to change in the distance between the objective lens and the relay lens, wherein FIG. 14A illustrates the behavior of marker light in the case that the distance between the objective lens and the relay lens is the ideal distance, and FIG. 14B illustrates the behavior of marker light in the case that the distance between the objective lens and the relay lens changes from the ideal distance by +$\Delta$Z.

Note that each of these FIGS. 14A and 14B extracts and illustrates, in the same way as with the above FIGS. 7 through 9, the real image surface SR, the pupil surface Sob of the objective lens 11, the recording layer L2 of the hologram recording medium HM, and the reflective surface of the reflective film L3, and also illustrates each light beam of the marker lights M1 and M2. In this case, the inbound light (each marker light in this case) is illustrated by being bounced back to the opposite side with the reflective surface as a boundary as well as the recording layer L2, flat surface Sob, and real image surface SR.

Now, in the following description including FIGS. 14A and 14B, with regard to the above "$\Delta$Z" representing the position change amount in a direction parallel to the laser beam axis, let us say that "+$\Delta$Z" represents position change in a direction away from the first laser 1 which is the light source of reproduced/reproduced light, and "−$\Delta$Z" represents position change in a direction toward the first laser 1.

First, in a state in which the distance between the objective lens 11 and the relay lens 7 is identical to the ideal distance, the behavior of the marker lights M1 and M2 is as shown in FIG. 14A. Now, the focal point on the real image surface SR of the outbound light of the marker light M1 is taken as PM1 such as shown in the drawing. Similarly, the focal point on the real image surface SR of the outbound light of the marker light M2 is taken as PM2.

Note that, in the case of the present example wherein the focal position is shifted, such as described in the above FIG. 12, the optical axis of a light beam input to the objective lens 11 (flat surface Sob in the drawing) in the inbound path, the optical axis of a light beam irradiated on the hologram recording medium HM from the objective lens 11 in the outbound path are set to be in parallel, and accordingly, it is an important point that the condensing point of each light beam emitted from the objective lens 11 in the inbound path is identical to each condensing point on the real image surface SR in the outbound path.

FIG. 14A illustrates that the condensing point of the marker light M1 emitted from the objective lens 11 in the inbound path is identical to the condensing point PM2 of the marker light M2 of the real image surface SR, and simultaneously, illustrates that the condensing point of the marker light M2 emitted from the objective lens 11 in the inbound path is identical to the condensing point PM1 of the marker light M1 of the real image surface SR.

If we say that from the state shown in FIG. 14A, the reflective surface moves by +$\Delta$Z, and in response to this, the objective lens 11 is also driven by +$\Delta$Z according to focus servo control, the behavior of each light beam of the marker lights M1 and M2 changes such as shown in FIG. 14B.

First, in response to the reflective surface and the objective lens 11 being displaced by +$\Delta$Z, with the outbound path, as shown in the drawing, the interval between the real image surface SR and the pupil surface Sob of the objective lens 11 is expanded from "f" that is an ideal value by +$\Delta$Z.

According to this, with the inbound path, the position away from the pupil surface Sob of the objective lens 11 shown in a dashed-dotted line in the drawing by the focal length "f" is not a position overlapped with the real image surface SR, a position further advanced by ΔZ (−ΔZ) from the position away from the pupil surface Sob by the focal length "f" is a position overlapped with the real image surface SR.

Now, such as also shown in FIG. 14A, each light beam of the marker lights M1 and M2 input to the objective lens 11 from the hologram recording medium HM in the inbound path condenses at the same position (position in the intra-surface direction) as the condensing point of each light beam of the outbound light on the real image surface SR in the position away by the focal length f from the pupil surface Sob.

That is to say, upon following the trajectories of the optical axes of the marker lights M1 and M2, the optical axis of the marker light M1 emitted from the objective lens 11 in the inbound path intersects the same intra-surface direction position as the condensing point PM2 of the outbound path in the real image surface SR on the flat surface of the dashed-dotted line in the drawing away by the focal length f from the pupil surface Sob, and the optical axis of the marker light M2 intersects the same intra-surface direction position as the condensing point PM1 of the outbound path in the real image surface SR on the flat surface of the dashed-dotted line in the drawing away by the focal length f from the pupil surface Sob.

According to this, with above the real image surface which is a position further away by ΔZ from the flat surface away by the focal length f from the pupil surface Sob shown in the dashed-dotted line, the optical axis position of the inbound marker light M1 is not identical to the condensing point PM2 of the outbound light, and becomes a position further on the inner side from this condensing point PM2 (direction toward the laser beam axis). Similarly, the optical axis position of the inbound marker light M2 is also not identical to the condensing point PM1, and becomes a position further on the inner side from this condensing point PM1.

Thus, according to displacement in the positive direction of the reflective surface and the objective lens 11 (displacement in a direction away from the light source), the position where the marker lights M1 and M2 emitted from the objective lens 11 in the inbound path passes through above the real image surface SR is not identical to the position above the real image surface SR the marker lights M1 and M2 condense in the inbound path, and is shifted to the inner side direction.

Also, on the other hand, along with the reflective surface and the objective lens 11 being displaced by +ΔZ, in response to the interval between the real image surface SR and the pupil surface Sob of the objective lens 11 being expanded by +ΔZ in the outbound path such as described above, the width of each light beam input to the objective lens 11 (pupil surface Sob) in a diffusion light state such as shown in the drawing is expanded more than the case of FIG. 14A.

Thus, according to the width of an incident light beam to the objective lens 11 in the outbound path being expanded from the ideal state shown in FIG. 14A, the emission light beam from the objective lens 11 does not become parallel light, but becomes a converged light state. That is to say, along with this, each light beam input to the objective lens 11 (pupil surface Sob) which is reflected light from the hologram recording medium HM in the inbound path does not become parallel light but becomes a converged light state.

Now, such as also shown in FIG. 14A, each light beam input to the objective lens 11 from the hologram recording medium HM in the inbound path is arranged to become converged light by this objective lens 11. From this point, an incident light beam to the objective lens 11 (pupil surface Sob) changed to a converged light state such as described above focuses on a side further to the front than the position away by the focal length f from the pupil surface Sob, and specifically, condenses on the flat surface that is a side further to the front by ΔZ than the flat surface (flat surface shown in a dashed line in the drawing) of the dashed-dotted line in the drawing away by the focal length f from the pupil surface Sob.

As a result thereof, in response to the reflective surface and the objective lens 11 being displaced by +ΔZ from the ideal position, the condensing surface (focal point surface) of the marker lights M1 and M2 emitted from the objective lens 11 in the inbound path is further at the front side by ΔZ as compared to the real image surface SR, and also the incident position (the position of the optical axis) as to the real image surface SR of the marker lights M1 and M2 serving as the inbound lights is shifted to a side further inner than the condensing points PM1 and PM2 on the real image surface SR in the corresponding outbound path.

Also, though description according to the drawing will be omitted, in response to the reflective surface and the objective lens 11 being displaced conversely by −ΔZ, a phenomenon contrary to the above occurs. Specifically, in the case that displacement of −ΔZ occurs, the distance between the real image surface SR and the pupil surface Sob of the objective lens 11 in the outbound path becomes f−ΔZ, and along with this, the distance between the pupil Sob and the real image surface SR in the inbound path becomes f−ΔZ, and accordingly, the incident position (the position of the optical axis) as to the real image surface SR of the marker lights M1 and M2 serving as inbound lights is shifted further outer than the condensing points PM1 and PM2 on the real image surface SR in the corresponding inbound path.

Also, in this case, the widths of the marker lights M1 and M2 input to the objective lens 11 in the outbound path narrow, and accordingly, each light beam input to the objective lens 11 again via the reflective surface from the objective lens 11 is in a diffusion light state, and accordingly, the condensing surface of the marker lights M1 and M2 emitted from the objective lens 11 in the inbound path is at a position deeper than the real image surface SR by 2ΔZ; in other words, the position of −2ΔZ from the real image surface SR.

Now, as can be understood from the above description, with the recording/reproducing device according to the present embodiment shown in FIG. 2, the optical system is designed so as to have coupling relationship between the real image surface SR and the light reception surface of the image sensor 13. Accordingly, change in the condensing surface of the inbound light as to the real image surface SR described above (focus direction), and change in the incident position (intra-surface direction) are similarly caused even on the light reception surface of the image sensor 13.

That is to say, even on the light reception surface of the image sensor 13, in response to +ΔZ displacement between the reflective surface and the objective lens 11, the light reception positions (optical axis positions) of the marker lights M1 and M2 are shifted further inner than the ideal light reception position, and also the condensing surface of these light beams is further to the front side as compared to the light reception surface by 2ΔZ. Also, conversely, in response to −ΔZ displacement between the reflective surface and the objective lens 11, the light reception positions (optical axis positions) of the marker lights M1 and M2 are shifted to a more outer side than the ideal light reception position, and also the condensing surface is at a deeper side than the light reception surface by 2ΔZ.

Figure 15:
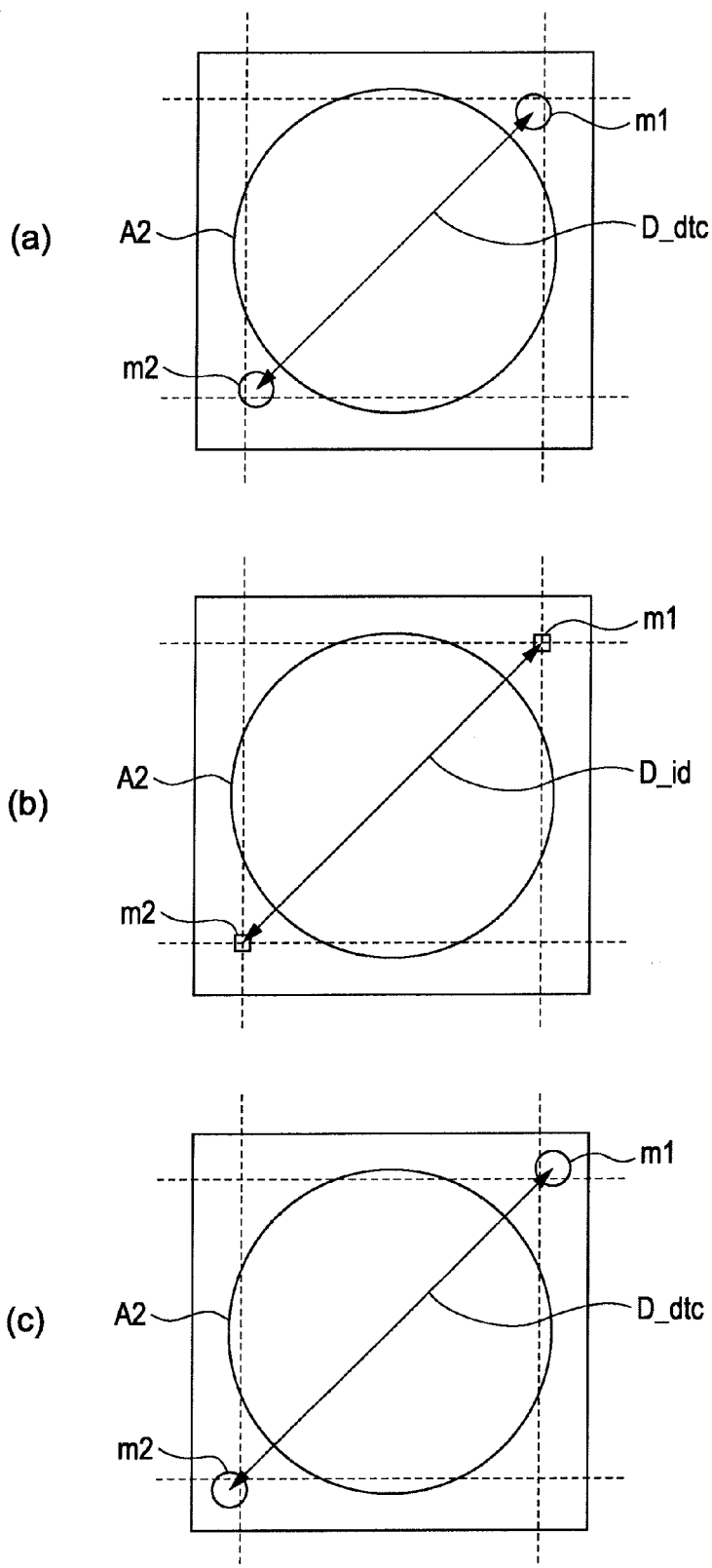
FIG. 15 is a plane diagram representing a situation of an irradiated spot of marker light formed on the light reception surface using a surface parallel to the light reception surface.
Figure 16:
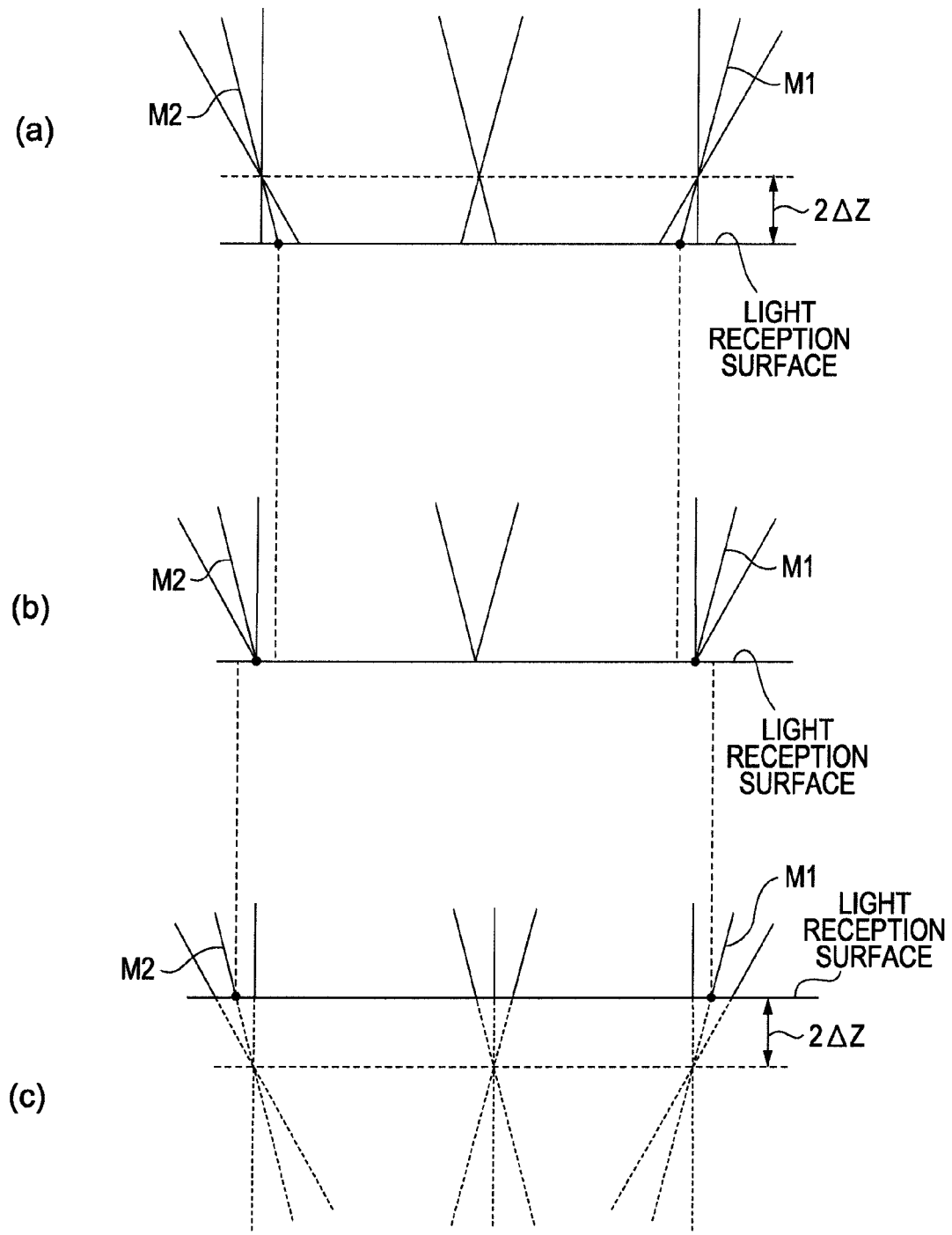
FIG. 16 is a diagram representing a situation of marker light to be input to the light reception surface using a surface perpendicular to the light reception surface.

The situation of change in the incident states of the marker lights M1 and M2 as to the light reception surface of the image sensor 13 in response to displacement from the ideal positions of the reflective surface and the objective lens 11 is compiled in FIGS. 15 and 16.

FIG. 15 is a plan view representing the situation of the irradiation spots m1 and m2 of the marker lights M1 and M2 formed on the light reception surface with a surface parallel to the light reception surface, and FIG. 16 is a cross-sectional view representing the situation of the marker lights M1 and M2 input to the light reception surface with a surface orthogonal to the light reception surface.

In FIGS. 15 and 16, each (a) illustrates a case where the objective lens 11 is displaced by +ΔZ from the ideal position, each (b) illustrates a case where the objective lens 11 is in the ideal position (a case where the distance between the objective lens 11 and the relay lens 7 is the ideal distance), and each (c) illustrates a case where the objective lens 11 is displaced by −ΔZ from the ideal position, respectively.

Note that FIG. 15 extracts and illustrates only the signal light area A2 of the light reception surface, and a region where the light in the neighborhood thereof is input.

Also, FIG. 16 illustrates not only the light beams of the marker lights M1 and M2 but also the central light beam including the laser beam axis. First, as shown in (b) in FIG. 16, in the case that the distance between the objective lens 11 and the relay lens 7 is identical to the ideal distance, the condensing surface of the light beams of the marker lights M1 and M2 is identical to the light reception surface, and accordingly, such as shown in (b) in FIG. 15, no image blurring occurs on these spots m1 and m2.

Also, in the case that the distance between the objective lens 11 and the relay lens 7 shown in each of (a) and (c) in FIG. 16 is not identical to the ideal distance, the condensing surface of the light beams of the marker lights M1 and M2 is not identical to the light reception surface, and accordingly, image blurring occurs on the spots m1 and m2 such as shown in (a) and (c) in FIG. 15 respectively, and the sizes thereof are expanded more than the ideal state in (b) in FIG. 15.

As can be understood from the above description, in the case that the objective lens 11 is displaced in the positive direction, such as shown in (a) in FIG. 15, the irradiation spot m1 (also referred to as "light reception region m1") of the marker light M1, and the irradiation spot m2 (also referred to as "light reception region m2") of the marker light M2 are each shifted further inner than the ideal state case in (b) in FIG. 15 by an amount equivalent to the displacement amount of the objective lens 11, and also in the case that the objective lens 11 is displaced in the negative direction, such as shown in (c) in FIG. 15, the light reception region m1 of the marker light M1, and the light reception region m2 of the marker light M2 are each shifted further outer than the ideal state case by an amount equivalent to the displacement amount of the objective lens 11.

Detection of the Distance Between the Objective Lens and the Relay Lens Based on the Marker Light Reception Results As can be understood from the above description, with the system wherein the ideal focal position is shifted, when error between the distance between the objective lens 11 and the relay lens 7, and the ideal distance occurs along with focus servo control, error also occurs between the ideal light reception positions of the marker lights and the actual light reception positions. That is to say, thus, error between the ideal light reception positions of the marker lights and the actual light reception positions is obtained, whereby error of the distance between the objective lens 11 and the relay lens 7 from the ideal distance can be detected.

Here, with the present embodiment, error between the ideal light reception positions of the marker lights and the actual light reception positions is detected with the distance between the light reception positions of the marker lights M1 and M2 as a reference.

Specifically, the distance between the light reception positions regarding the marker lights M1 and M2 actually generated and irradiated (referred to as "distance between light reception positions D_dtc") is computed, and the value of difference between this actual distance between light reception positions D_dtc, and the distance between the light reception positions of the marker lights M1 and M2 in the case that the objective lens 11 is in the ideal position (ideal distance between light reception positions D_id) is obtained as a value representing error of the distance between the objective lens 11 and the relay lens 7 from the ideal distance.

In this case, according to "D_id−D_dtc", error of the distance between the objective lens 11 and the relay lens 7 from the ideal distance is computed. Thus, an error signal can be obtained with positive polarity in response to +ΔZ displacement of the objective lens 11, and with negative polarity in response to −ΔZ displacement.

Now, it is noteworthy that in the case that the objective lens 11 is displaced from the ideal position, not only the irradiation spots m1 and m2 of the marker lights M1 and M2 are shifted from the ideal positions but also blurring occurs in the image thereof.

While taking this point into consideration, with the present embodiment, the values of the distances D_dtc and D_id are obtained as the distance between the center positions (optical axis positions) of the light reception regions of the marker lights M1 and M2.

Thus, at the time of obtaining the distance between light receptions D_dtc defined as distance between the center positions of the light reception regions, it goes without saying that the center positions of the light reception regions m1 and m2 of the marker lights M1 and M2 have to be detected.

Figure 17A:
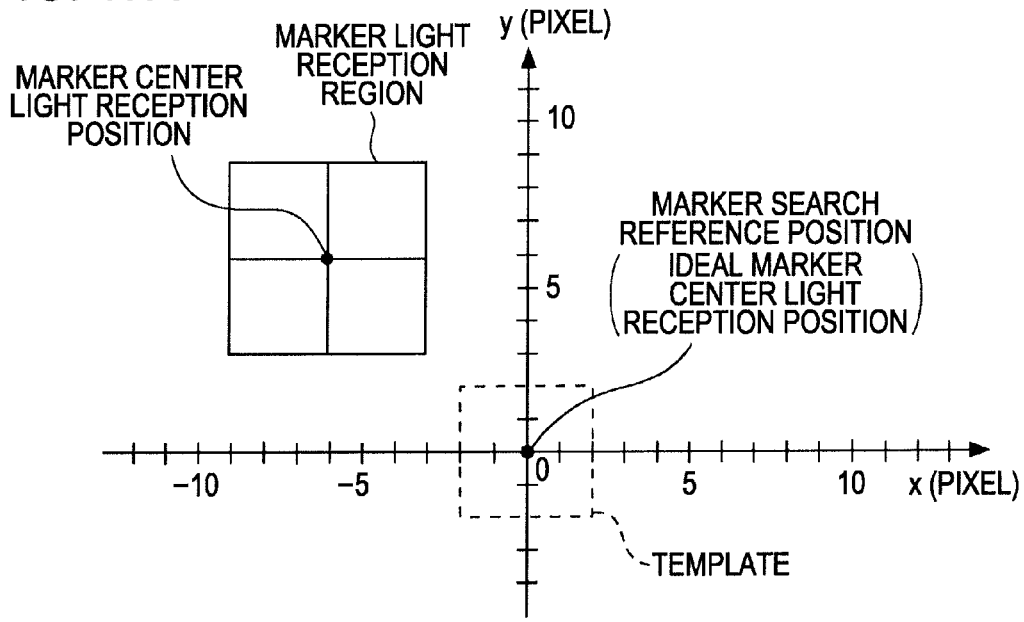
FIGS. 17A and 17B are diagrams for describing a detecting method of the light reception position of marker light.
Figure 17B:
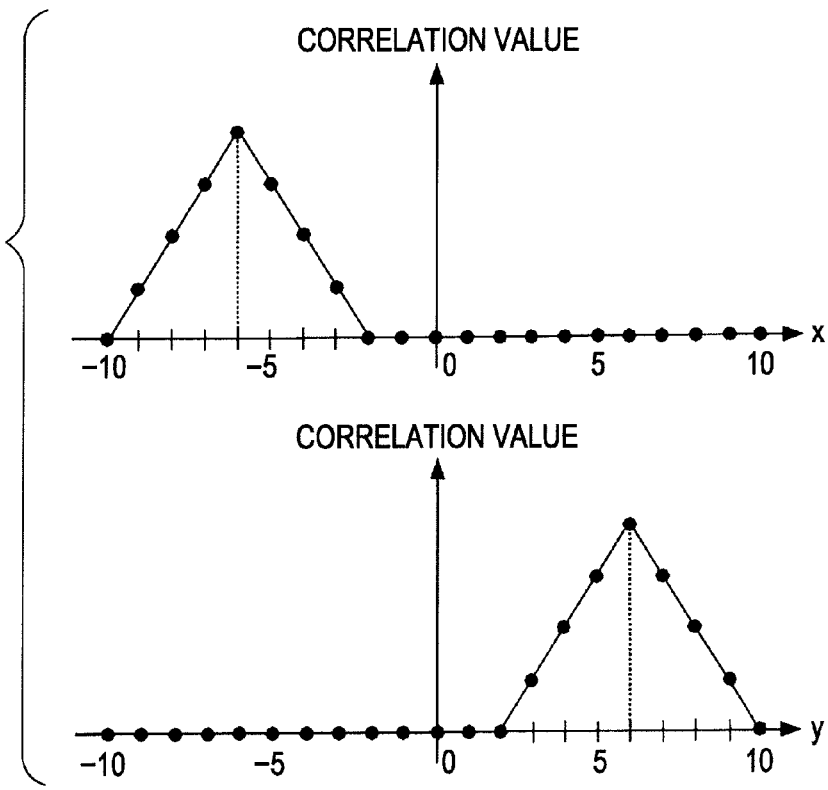

FIGS. 17A and 17B are diagrams for describing such a technique for detecting the light reception positions of the marker light centers. First, FIG. 17A schematically illustrates relationship between the actual marker light reception regions and marker center light reception positions, and the ideal marker center light reception positions on the light reception surface of the image sensor 13. In FIG. 17A, the light reception surface is represented as a two-dimensional flat surface with the coordinates (x, y) of the ideal marker center light reception positions as (0, 0). As shown in the drawing, the horizontal axis is the number of pixels in the x direction, and the vertical axis is the number of pixels in the y direction.

Note that the ideal marker center light reception positions represent the positions where the marker light centers are received in a state in which the objective lens 11 is in the ideal position. Such ideal marker center light reception positions are determined according to the generated positions of the marker lights, and can be taken as known information.

With the present embodiment, detection of the light reception positions of the marker light centers is executed by a so-called correlation detection method. Specifically, a template (image) having the same pattern as the marker light to be detected (in this case, a solid pattern where 4×4 pixels are all on) is used, the correlation value between the detection image at each movement position when moving this template, and this template is computed, and the highest correlativity position is taken as the actual marker center light reception position.

The correlation computation in this case is, with the ideal marker center light reception position on the image sensor 13 regarding the marker light to be detected as a marker search reference position, executed by moving the above template with this search reference position as the center.

Specifically, with the present embodiment, the correlation value between the detected image at each movement position when moving the above template in the x-axis direction and in the y-axis direction with the marker search reference position (ideal marker center light reception position) as the center, and the template is computed respectively. That is to say, according to such a computation of the correlation value in each direction, the peak position of the correlation value in the x-axis direction, and the peak position of the correlation value in the y-axis direction are obtained, and the coordinates (x, y) determined with the peak position in the x-axis direction and the peak position in the y-axis direction are taken as the detection results of the marker center light reception position of the marker light to be detected.

FIG. 17B illustrates results wherein the computation results of the correlation value at each movement position when moving the template shown in FIG. 17A in the x-axis direction and in the y-axis direction with coordinates (0, 0) as the ideal marker center light reception position (marker search reference position) are plotted.

As can be clearly seen from FIG. 17B, when moving the template in the x-axis direction and in the y-axis direction with the search reference position as a reference, the peak position of the correlation value in the x-axis direction is identical to the x coordinate of the actual marker center light reception position, and the peak position of the correlation value in the y-axis direction is identical to the y coordinate of the actual marker center light reception position.

Thus, the peak position in the x-axis direction, and the peak position in the y-axis direction are obtained such as described above, whereby the coordinates (x, y) determined with these peak positions can be taken as the detection result of the marker center light reception position of the marker light to be detected.

Note that, with the example in FIGS. 17A and 17B, a case has been exemplified wherein the peak positions of the correlation values in the x-axis direction and in the y-axis direction are obtained in increments of pixels, but the peak positions may not be obtained in increments of pixels depending on the relationship between the size of marker light, and the oversampling rate of the image sensor 13. In this case, each of the peak positions should be obtained in increments less than increments of pixels by an interpolation computation, based on the computation results of the correlation value of each movement position in the x-axis direction, and the computation results of the correlation value of each movement position in the y-axis direction.

As described above, the marker center light reception position of each of the marker lights M1 and M2 can be detected. Thus, the marker center light reception position regarding each of the marker lights M1 and M2 is determined, whereby the value of the distance between the light reception positions D_dtc can be obtained by obtaining the separated distance thereof.

As also described above, with the present embodiment, "D_id−D_dtc" is computed regarding the ideal distance between the light reception positions D_id regarding predetermined marker lights M1 and M2, and the distance between the light reception positions D_dtc thus obtained, and accordingly, an error signal can be obtained with positive polarity in response to +ΔZ displacement of the objective lens 11, and with negative polarity in response to −ΔZ displacement.

With the present embodiment, the driving operation of the relay lens 7 by the relay lens driving unit 22 is controlled based on the error signal thus computed.

Now, as can be understood from the above description, the error signal computed such as described above represents the change direction and the change amount of the distance between the objective lens 11 and the relay lens 7 from the ideal distance, and also is a signal of which the amplitude becomes "0" in the case that the distance between the objective lens 11 and the relay lens 7 is identical to the ideal distance.

Accordingly, the relay lens driving unit 22 is controlled to displace the relay lens 7 so as to set the error signal to "0", whereby the distance between the objective lens 11 and the relay lens 7 can be maintained constant at the ideal distance.

Now, description will be made for confirmation regarding the behavior of light when the position on the optical axis of the relay lens 7 is changed from the ideal position according to such constant distance control between the objective lens 11 and the relay lens 7, with reference to FIGS. 18 and 19.

Figure 18:
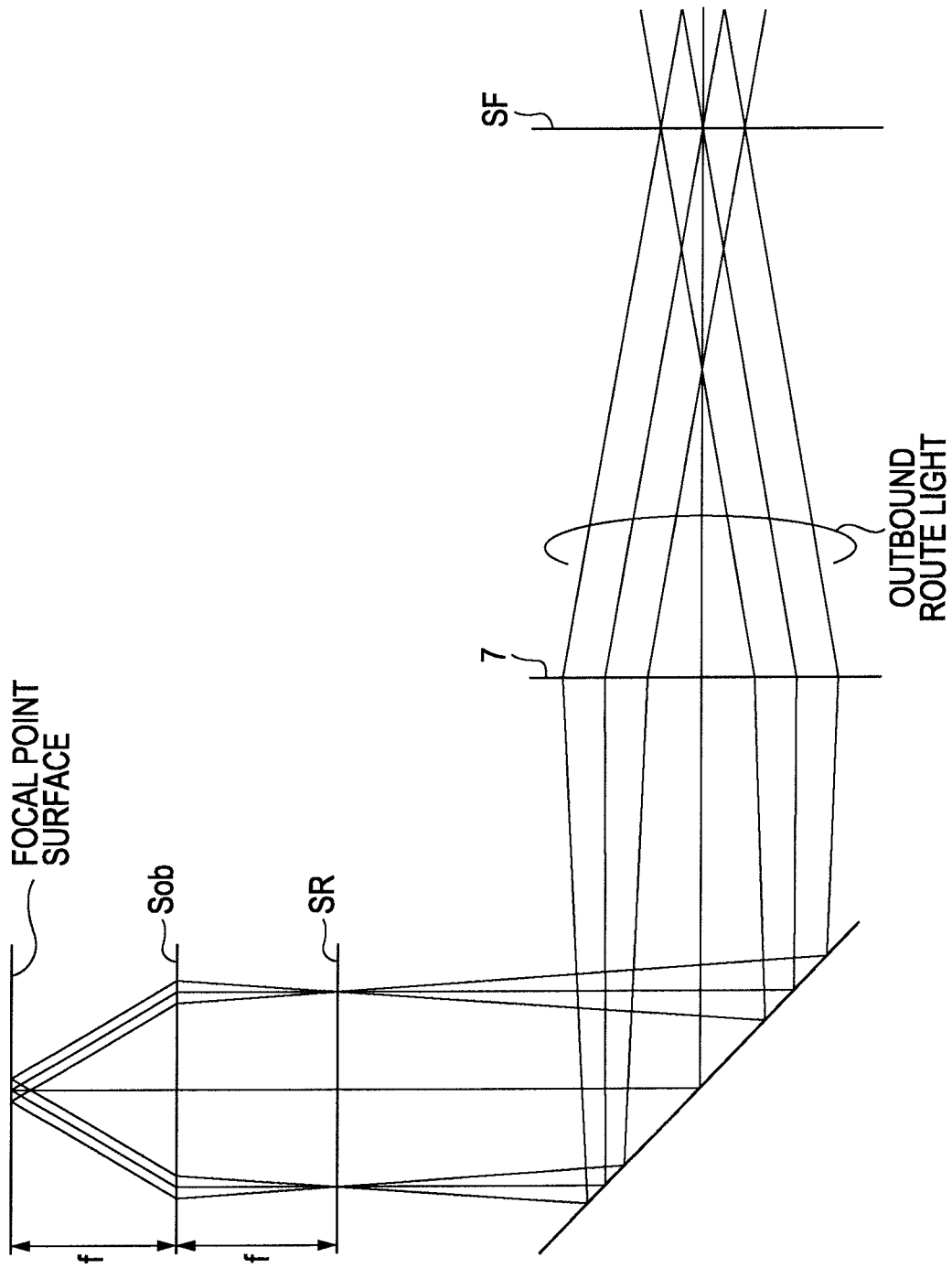
FIG. 18 is a diagram illustrating the behavior of outbound light in a case where the objective lens and the relay lens are disposed in the corresponding ideal position.
Figure 19:
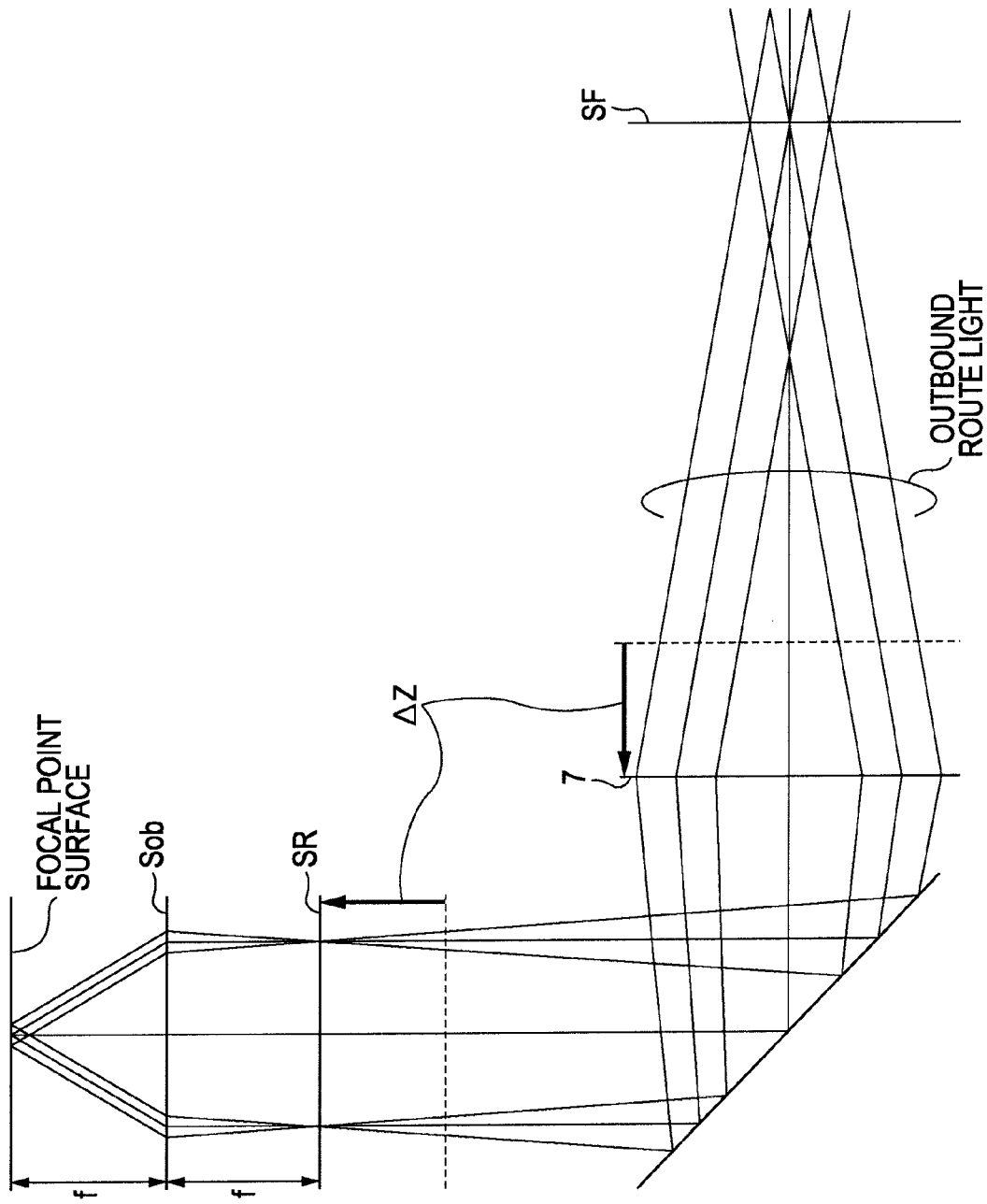
FIG. 19 is a diagram illustrating the behavior of outbound light in a case where the relay lens is displaced according to displacement from the ideal position of the objective lens by constant distance control.

FIG. 18 illustrates the behavior of light in the case that the objective lens 11 and the relay lens 7 are in the corresponding ideal position, and FIG. 19 illustrates the behavior of light in the case that the relay lens 7 is displaced by +ΔZ from the ideal position thereof in response to the objective lens 11 being displaced by +ΔZ from the ideal position thereof. Note that FIGS. 18 and 19 illustrate the behavior of light from the Fourier surface SF to the condensing surface of the objective lens 11 in the outbound path regarding two light beams having axial symmetrical position relationship with the laser beam axis as a reference.

First, in a state in which the relay lens 7 is in the ideal position, with the light beams of the outbound light emitted from the relay lens 7, the corresponding optical axes are in a parallel state such as shown in FIG. 18.

On the other hand, when the relay lens 7 is displaced by +ΔZ from the ideal position, the incident positions of the light beams (excluding the light beam of the central pixel) in the inbound path are shifted to the outer side, and along with this, the optical axes of the light beams emitted from the relay lens 7 are not in parallel, and are inclined to the laser beam axis side (inner side).

Thus, while the incident positions of the light beams to the relay lens 7 are shifted to the outer side, the optical axes of the light beams emitted from the relay lens 7 are inclined to the inner side, and accordingly, as can be understood by comparing FIGS. 18 and 19, the incident positions of the light beams on the real image surface SR become almost the same position. Also, at this time, the distance between the objective lens 11 and the relay lens 7 is identical to the ideal distance by the constant distance control between the objective lens 11 and the relay lens 7, and accordingly, the condensing surface of the light beams is also identical to the real image surface SR in the focus direction.

Now, such as described above, that the distance between the objective lens 11 and the relay lens 7 is identical to the ideal distance means that the distance between the real image surface SR and the pupil surface Sob of the objective lens 11 is "f". In this state, that the incident positions of the light beams on the real image surface SR in the outbound path are generally the same positions as those at the time of the ideal state such as described above, and also the condensing surface of the light beams is identical to the real image surface SR means that generally the same state as the ideal state shown in FIG. 14A is obtained.

As can be understood from this, in this case as well, generally the same image as that in the ideal state can be obtained as an image that the inbound light forms on the real image surface SR, and consequently, detection of a reproduced image on the light reception surface of the image sensor 13 coupled to the real image surface SR can be executed in the same way as in the ideal state.

Note that change in the incident position to the relay lens 7 of each light beam (excluding the light beam of the central pixel) due to displacement of the relay lens 7 from the ideal position, and the inclination of the optical axis of the emission light from the relay lens 7 are extremely minute, and does not affect recording/reproducing of a hologram.

That is to say, as can be understood from this, in the case of the present example as well wherein the ideal focal position is shifted, even in the event that the relay lens 7 is displaced from the ideal position due to the constant distance control between the objective lens 11 and the relay lens 7, recording/reproducing a hologram can suitably be executed in the same way as with the case according to the related art.

1-6. Configuration for Realizing Constant Distance Control of Embodiment

Next, the configuration for realizing the constant distance control between the objective lens and the relay lens serving as the embodiment described above will be described with reference to FIGS. 2 and 20.

First, with the recording/reproducing device according to the present embodiment, spatial light modulation for generating the marker lights M1 and M2 is executed. Specifically, the modulation control unit 20 shown in FIG. 2 executes driving control for turning on each pixel of the generated position of the marker light M1 and the generated position of the marker light M2 set to predetermined positions within the gap area A3 such as shown in FIG. 13. Specifically, at the time of recording, all the effective pixels of on/off patterns of the SLM 4 are generated, which includes an on/off pattern according to the recorded data within the signal light area A2 described above, a predetermined on/off pattern of the reference light area A1, and a pattern for turning on the generated positions (4×4 pixels in this case) of the marker lights M1 and M2 within the gap area A3, and turning off the other remaining all pixels (including the outer side region of the reference light area A1). Subsequently, each pixel of the SLM 4 is driven and controlled according to all the effective pixels of on/off patterns of the SLM 4 thus generated.

Also, at the time of reproducing, the inside of the reference light area A1 is set to the same on/off pattern as that at the time of recording, and all the effective pixels of on/off patterns of the SLM 4 are generated, which turns on the pixels of the generated positions of the marker lights M1 and M2, and also turns off all the pixels other than the reference light area A1, and the generated positions of the marker lights M1 and M2, and accordingly, each pixel of the SLM 4 is driven and controlled according to such on/off patterns.

Now, the constant distance control between the objective lens 11 and the relay lens 7 using the marker lights M1 and M2 may be executed at timing other than during recording/reproducing of a hologram page. In this case, the modulation control unit 20 should not execute driving control for generating signal light and reference light but driving control for generating only the marker lights M1 and M2.

Figure 20:
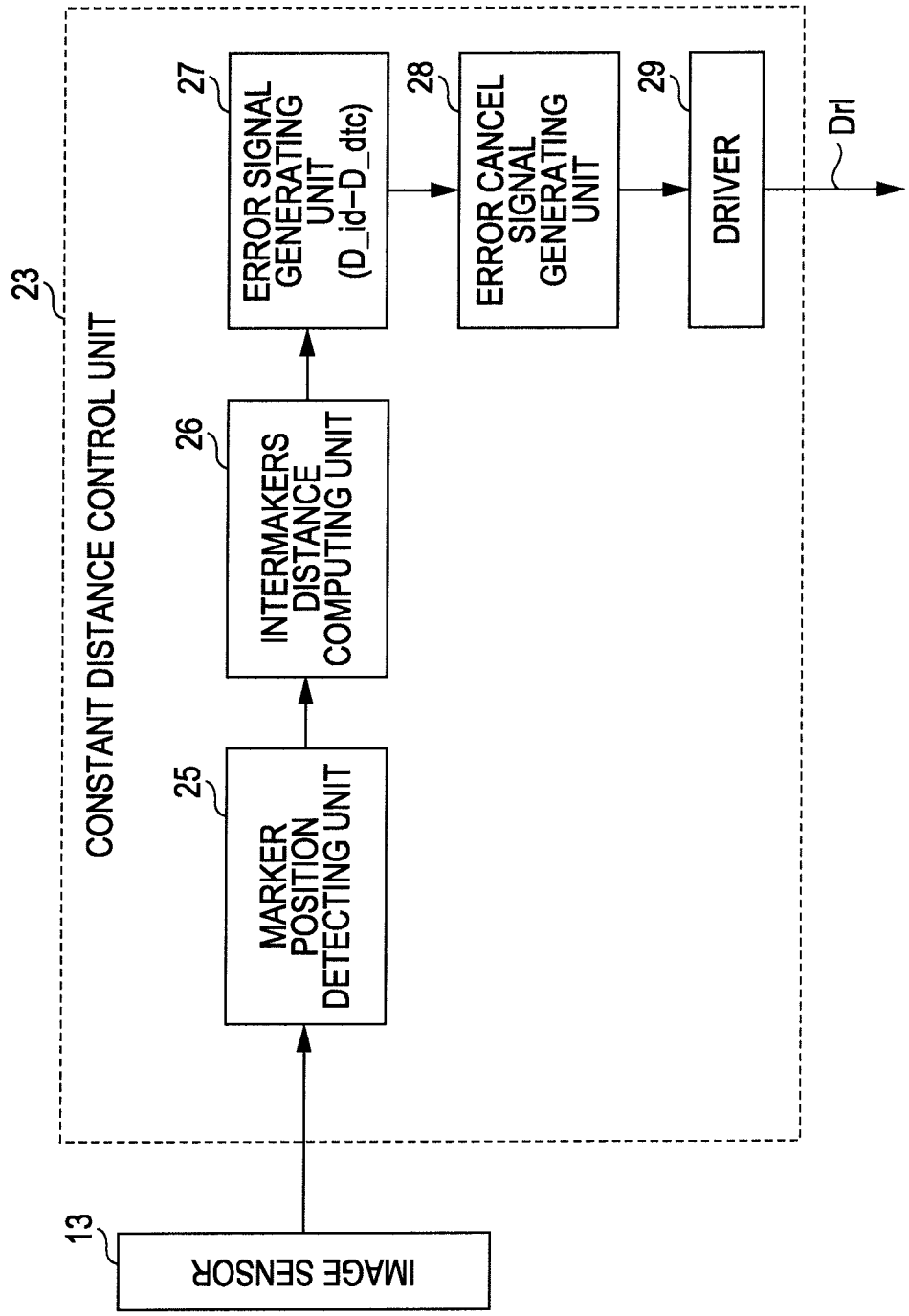
FIG. 20 is a diagram illustrating the internal configuration of a constant distance control unit included in a light irradiation device according to an embodiment.

FIG. 20 illustrates the internal configuration of the constant distance control unit 23 shown in FIG. 2. Note that FIG. 20 illustrates not only the internal configuration of the constant distance control unit 23 but also the image sensor 13 shown in FIG. 2.

As shown in the drawing, the constant distance control unit 23 includes a marker position detecting unit 25, an intermarkers distance computing unit 26, an error signal generating unit 27, a error cancel signal generating unit 28, and a driver 29.

As shown in the drawing, the readout signal (image signal) from the image sensor 13 is input to the marker position detecting unit 25.

The marker position detecting unit 25 executes detection of the marker center light reception position of each of the marker lights M1 and M2 by the correlation detection method described in FIGS. 17A and 17B. In this case, with the marker position detecting unit 25, information of the ideal marker center position (marker search reference position in FIGS. 17A and 17B) regarding each of the marker lights, and the templates regarding the marker lights M1 and M2 (in this case, a common pattern where 4×4 pixels are all on) are set. The marker position detecting unit 25 executes detection of a marker center light reception position by the technique described above in FIGS. 17A and 17B regarding each of the marker lights M1 and M2 based on the readout signal from the image sensor 13, the information of the ideal marker center position of each of the marker lights M1 and M2, and the above templates.

The intermarkers distance computing unit 26 computes the distance between the light reception positions D_dtc regarding the marker lights M1 and M2 based on the information of each marker center light reception position detected by the marker position detecting unit 25.

The error signal generating unit 27 generates an error signal representing error of the distance between the objective lens 11 and the relay lens 7 from the ideal distance based on the value of the distance between light reception positions D_dtc computed by the intermarkers distance computing unit 26. Specifically, with this error signal generating unit 27, the value of the ideal distance between light reception positions D_id representing the distance between the light reception positions of the marker lights M1 and M2 in the ideal state is set, and the error signal generating unit 27 generates the above error signal by executing a computation of "D_id−D_dtc".

The error cancel signal generating unit 28 generates an error cancel signal based on the error signal generated by the error signal generating unit 27. As also described above, the error signal obtained with a computation of "D_id−D_dtc" with positive polarity in response to +ΔZ displacement of the objective lens 11, and with negative polarity in response to −ΔZ displacement, and accordingly, the error cancel signal generating unit 28 inverts the polarity of the error signal, and then generates a signal wherein the absolute value of the error signal is adjusted as appropriate to obtain the error signal value=0, as the error cancel signal.

The driver 29 drives and controls the relay lens driving unit 22 shown in FIG. 2 by the driving signal Drl in the drawing based on the error cancel signal generated by the error cancel signal generating unit 28.

In this case, the relay lens driving unit 22 is configured to drive the relay lens 7 in the positive direction in response to the driving signal Drl based on the error cancel signal according to the positive polarity, and to drive the relay lens 7 in the negative direction in response to the driving signal Drl based on the error cancel signal according to the negative polarity.

According to such a configuration, the position of the relay lens 7 is controlled so as to set the value of the error signal computed by the error signal generating unit 27 to "0". That is to say, thus, the distance between the objective lens 11 and the relay lens 7 can be maintained constant at the ideal distance.

1-7. Conclusion

As described above, with the present embodiment, the ideal focal position of reproduced/reproduced light of a hologram is shifted to a position on a side further to the front than the position according to the related art, and accordingly, in the case that error is caused between the distance between the objective lens 11 and the relay lens 7, and the ideal distance thereof, error is arranged to be caused between the light reception position of each light beam (excluding the central light beam) input to the image sensor 13 and the ideal light reception position thereof. Based on this, with the present embodiment, marker light is generated in a predetermined position away from the laser beam axis, and the distance between the objective lens 11 and the relay lens 7 is adjusted based on error between the ideal light reception position and the actual light reception position regarding that marker light. Thus, control can be executed so as to maintain the distance between the objective lens 11 and the relay lens 7 constant in the above ideal distance.

According to the present embodiment, error of the distance between the objective lens 11 and the relay lens 7 from the ideal distance can optically be detected, and accordingly, position sensors used with the related art for detecting the positions of the objective lens 11 and the relay lens 7 for control so that the distance between the objective lens 11 and the relay lens 7 (104 and 105 in FIG. 23) remains constant, can be omitted. That is to say, thus, reduction in device manufacturing cost can be achieved as compared to the related art.

Also, according to the present embodiment, an error signal representing error of the distance between the objective lens 11 and the relay lens 7 from the ideal distance can be obtained with a push pull signal (a signal of which the amplitude changes, with amplitude "0" at the time of the ideal distance as a reference).

Also, according to the present embodiment, constant distance control between the objective lens 11 and the relay lens 7 can be executed with closed loop control, and high-precision control can be executed accordingly.

Also, with the present embodiment, marker light is generated within the gap area A3, but thus, the constant distance control between the objective lens 11 and the relay lens 7 can be executed even in a state having neither signal light nor reproduced light, i.e., can be executed regardless of whether the current time is recording time or reproducing time.

Also, marker light is generated within the gap area A3, whereby the constant distance control between the objective lens 11 and the relay lens 7 can be executed without sacrificing the recording capacity. Also, simultaneously, the suppression effects of the reflected reference light by the partial diffraction element 9 can be obtained in a usual manner.

Also, with the present embodiment, the two marker lights are generated, and difference between the distance between the ideal light reception positions thereof, and the actual distance between the light reception positions is computed to obtain the above error signal.

Thus, for example, even in the case that the rotation or shift or the like of an image occurs due to the property of the optical system, the precision of the above error signal can be secured, and consequently, improvement in precision of the constant distance control between the objective lens 11 and the relay lens 7 can be achieved.

Also, with the present embodiment, generation of an error signal is executed based on the distance between marker light reception positions such as described above regarding the marker lights M1 and M2 generated in the corresponding positions having axial symmetrical relationship with the laser beam axis as a reference, and thus, tolerability as to the rotation, shift, or the like of an image described above can be further improved.

2. Modifications

While an embodiment of the present invention has been described, the present invention should not be restricted to the specific examples described so far. For example, with the above description, a case has been exemplified wherein the focal position (ideal focal position) of the reproduced/reproduced light of a hologram is set to the upper layer side face of the recording layer L2, the ideal focal position of reproduced/reproduced light of a hologram should be set to at least a side further to the front (objective lens 11 side) than the position according to the related art, i.e., a position at a side further to the front than the lower layer side face of the recording layer L2, and for example, may be set to a position at a side even further to the front than the surface of the hologram recording medium HM.

With the present invention, the above ideal focal position should be set so that the distance between this ideal focal position and the hologram recording medium surface is smaller than the distance from the above surface to the lower side face of the recording layer.

Also, with the above description, a case has been exemplified wherein the two marker lights are generated, but a single marker light may be generated. In this case, an error signal should be computed as error between the ideal light reception position and the actual light reception position regarding this single marker light.

However, as exemplified with the above embodiment, it goes without saying that a case where a technique for obtaining an error signal based on the ideal distance between light reception positions and the actual distance between light reception positions regarding the two marker lights is used is more advantageous in respect of tolerability as to the rotation, shift, or the like of an image described above.

Figure 21A:
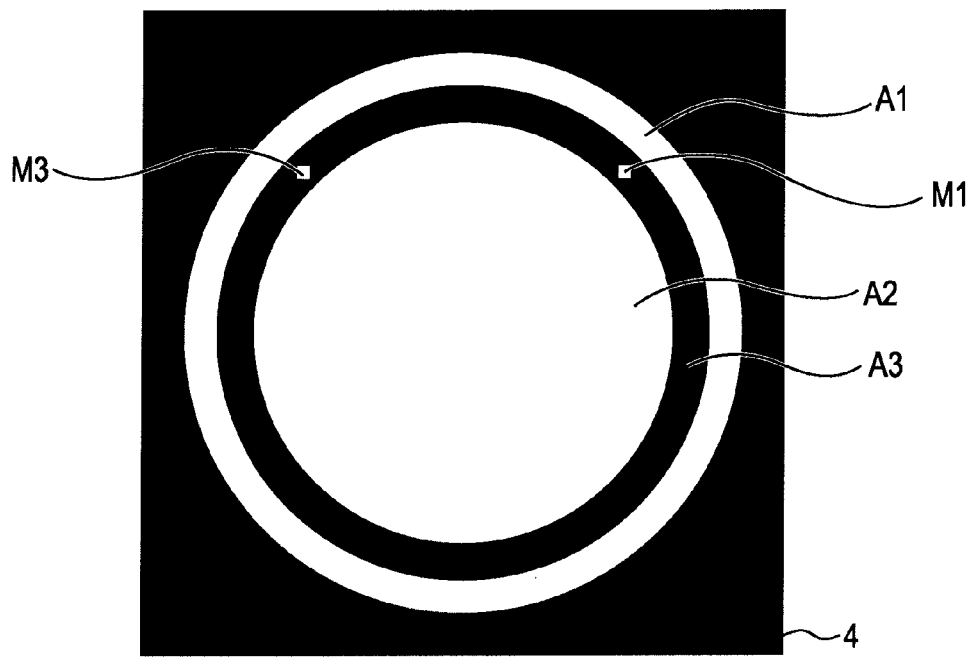
FIGS. 21A and 21B are diagrams for describing a modification relating to generation of marker light.
Figure 21B:
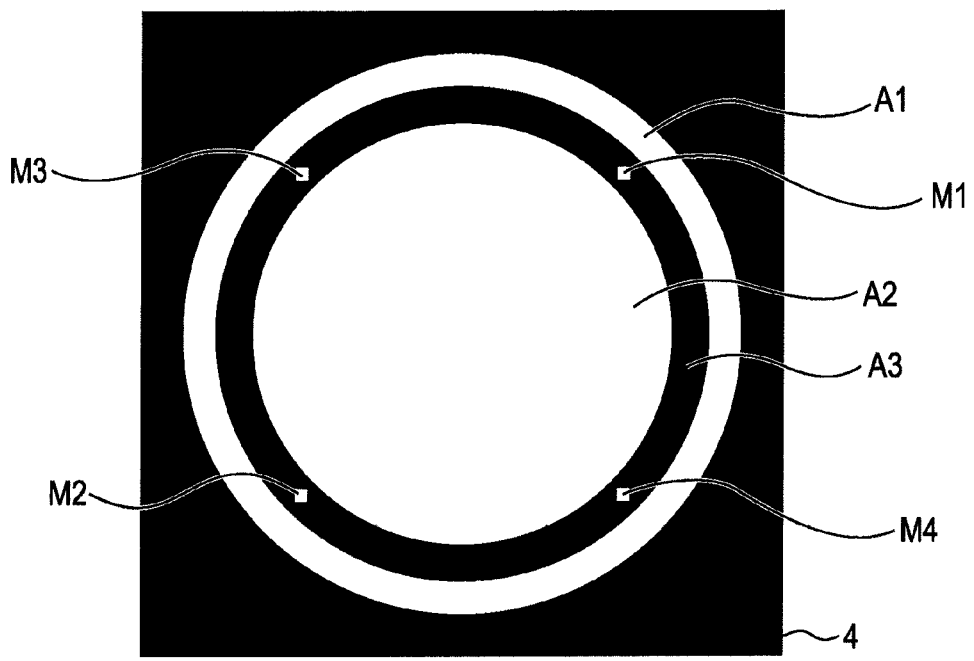

Also, with the embodiment, a case has been exemplified wherein the two marker lights are generated in positions making up axial symmetry with the laser beam axis as a reference, but the generated positions of marker lights, and the number of generations are not restrict to this, and for example, a modification such as shown in FIGS. 21A and 21B may be realized.

FIG. 21A illustrates an example wherein two marker lights are generated in the corresponding positions making up linear symmetry with the laser beam axis as a reference. Specifically, in this case, together with marker light M1, marker light M3 is generated in positions making up linear symmetry with the laser beam axis as to the generated position of this marker light M1.

Also, FIG. 21B illustrates an example wherein two sets of marker light of which the generated positions have axial symmetrical relationship with the laser beam axis as a reference are generated. Specifically, in this case, together with the above marker lights M1, M2, and M3, marker light M4 is further generated in a position making up axial symmetry with the laser beam axis as a reference as to the generated position of the marker light M3.

Now, for example, in the case that a total of four marker lights of [M1, M2] and [M3, M4] on different diagonal lines such as the modification in FIG. 21B, distance between light reception positions regarding two sets of between the marker lights M1 and M2, and between the marker lights M3 and M4 can be obtained. Moreover, distance between the marker lights M1 and M2, and distance between the marker lights M3 and M4 are equal distance, and accordingly, the common value can be used as the value of the ideal distance between light reception positions D_id of each marker light set of these.

Thus, in the case that the two sets or more of distance between light reception positions are obtained, and also the value of the ideal distance between light reception positions of each of thereof can be shared, the mean value of the two sets of distance between light reception positions is computed, and difference between this mean value and the common ideal distance between light reception positions D_id can be generated as an error signal.

If such a technique is used wherein an error signal is computed with difference between the mean value of two sets or more of distance between light reception positions, and the ideal distance between light reception positions D_id, tolerability as to the rotation, shift, or the like of an image described above can be further improved.

Note that, as a combination wherein two sets of distance between light reception positions are obtained such as described above, and also the two sets of the distance between light reception positions have equal distance, there can be conceived other than a case where the four marker lights are generated such as FIG. 21B. For example, in the case that the marker light M4 in FIG. 21B is omitted, distance between light reception positions can be computed regarding each set of [M1, M3] and [M2, M3], and also these two sets of distance between light reception positions are equal distance, and accordingly, the value of the ideal distance between light reception positions D_id can be shared.

Alternatively, the same effects can be obtained by executing the computation of distance between light reception positions, and the computation of an error signal based on the ideal distance between light reception positions independently for each set of marker lights, and computing the mean value of these error signals, without computing the mean value regarding the distance between light reception positions such as described above.

Note that this technique is also adaptable to a case where the distance between light reception positions regarding each set of marker lights is not equal distance.

Also, with the above description, a case has been exemplified wherein the generated positions of the marker lights are set within the gap area A3, but marker light should be generated in a position away from the optical axis of light input to the spatial light modulating unit, and the generated position thereof should not be restricted to particularly within the gap area A3.

Also, with the above description, a so-called solid pattern has been set as the pattern of marker light wherein all the pixels are on, but the spatial light modulation pattern to be set to marker light is not restricted to such a solid pattern, and other patterns may be used.

Also, with the above description, a case has been exemplified wherein the light reception unit for receiving marker light is shared with the image sensor 13 for receiving the reproduced image of a hologram, but the light reception unit used for detection of marker light may be provided separately from the image sensor 13.

Also, with the above description, a configuration has been exemplified wherein adjustment of the distance between the objective lens 11 and the relay lens 7 is executed by driving the relay lens 7, but adjustment of the distance between the objective lens 11 and the relay lens 7 may be realized by driving the hologram recording medium HM in a direction toward or away from the objective lens 11 (focus direction). Note that, in this case, it goes without saying that a driving unit for driving the hologram recording medium HM in the focus direction is provided.

Alternatively, adjustment of the distance between the objective lens 11 and the relay lens 7 may be realized by driving the whole optical system in the focus direction. That is to say, in this case, a driving unit for driving the whole optical system shown in FIG. 2 (at least the hologram recording medium HM, position control unit 19, modulation control unit 20, data reproducing unit 21, and portions excluding the constant distance control unit 23, in FIG. 2) in the focus direction.

Also, with the above description, a case has been exemplified wherein the present invention is applied to a case where recording/reproducing as to the reflection-type hologram recording medium HM is executed, but the present invention may also suitably be applied to a case where recording/reproducing is executed as to a transmission-type hologram recording medium having no reflective film.

Here, with regard to such a transmission-type hologram recording medium as well, the ideal focal position of reproduced/reproduced light according to the related art is arranged to be identical to the lower layer side face of the recording layer. Accordingly, in the case of using a transmission-type hologram recording medium as well, as described above, the ideal focal position of reproduced/reproduced light of a hologram is set to a position at a side further to the front than the lower layer side face of the recording layer, whereby error between the distance between the objective lens and the relay lens, and the ideal distance can optically be detected.

Also, with the above description, a case has been exemplified wherein the present invention is applied to a case where both of recording and reproducing is executed as to the hologram recording medium, but the present invention may also suitably be applied to a case where only recording is executed, or a case where only reproducing is executed.

In the case of executing recording alone, the spatial light modulating unit included in the light irradiation device should be configured so as to generate marker light, and also generate both of signal light and reference light. On the other hand, in the case of executing reproducing alone, the spatial light modulating unit should be configured so as to generate marker light and reference light.

Also, with the above description, a case has been exemplified wherein intensity modulation for generating marker light, and signal light or reference light is realized with a combination of the polarization direction control type spatial light modulator and the polarized beam splitter, but the arrangement for realizing intensity modulation should not be restricted to this. For example, an arrangement may be made by using a stand-alone transmission-type liquid crystal panel capable of modulating the light intensity of incident light according to a driving signal, or a stand-alone spatial light modulator such as a DMD (Digital Micro mirror Device; a registered trademark) or the like.

The present application contains subject matter related to that disclosed in Japanese Priority Patent Application JP 2009-078995 filed in the Japan Patent Office on Mar. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A light irradiation device comprising:
 a focus servo control unit, which includes
  a light source configured to irradiate light on a hologram recording medium having a recording layer where information is recorded with an interference pattern between signal light and reference light,
  a spatial light modulating unit configured to subject light from said light source to spatial light modulation to execute generation of at least said signal light or said reference light, and generation marker light at a position away from an optical axis within an input surface of the light from said light source, and a light irradiating unit configured to irradiate light subjected to spatial light modulation by said spatial light modulating unit on said hologram recording medium via a relay lens system and an objective lens, said focus servo control unit being configured to execute focus servo control so that an ideal focal position of light to be irradiated via said objective lens is set so as to satisfy a condition that distance between said ideal focal position and a hologram recording medium surface is smaller than distance from said hologram recording medium surface to a lower layer side face of said recording layer, and also a focal position of light to be irradiated via said objective lens is constant at said ideal focal position;

an objective-lens/relay-lens distance adjusting unit configured to adjust distance between said objective lens and a relay lens disposed closer to said objective lens of relay lenses making up said relay lens system on the optical axis;

a light reception unit configured to receive said marker light via said hologram recording medium; and a constant distance control unit configured to control said objective-lens/relay-lens distance adjusting unit based on error between an ideal light reception position of said marker light, and an actual light reception position of said marker light by said light reception unit.

2. The light irradiation device according to claim 1, wherein said spatial light modulating unit generates said marker light at two portions away from the optical axis of the light from said light source;

and wherein said constant distance control unit computes error between ideal distance between predetermined light reception positions of said marker light, and distance between the actual light reception positions of said marker light by said light reception unit, and control said objective-lens/relay-lens distance adjusting unit based on the computed error information.

3. The light irradiation device according to claim 2, wherein said spatial light modulating unit generates said marker light at two portions having axial symmetrical relationship with the optical axis of the light from said light source as a reference.

4. The light irradiation device according to claim 2, wherein said spatial light modulating unit generates said marker light so as to obtain at least two sets of marker light of which generated positions have equal distance from the optical axis of the light from the light source;

and wherein said constant distance control unit computes distance between marker light reception positions regarding each set of marker light of which the distance between said generated positions is equal distance, based on the light reception result regarding said marker light by a light reception unit, and then computes a mean value thereof, and also computes error between a value of the ideal distance between marker reception positions determined in common to each set of said two sets of marker light, and said mean value, and control said objective-lens/relay-lens distance adjusting unit based on this error.

5. The light irradiation device according to claim 4, wherein said spatial light modulating unit generates two sets of marker light of which the generated positions have axial symmetrical relationship with the optical axis of the light from said light source as a reference;

and wherein said constant distance control unit computes distance between marker reception positions regarding each set of marker light making up said axial symmetry based on a light reception result regarding said marker light by said light reception unit, and then computes a mean value thereof, and also computes error between the ideal distance between marker reception positions determined in common to each set of said two sets of marker light, and said mean value, and control said objective-lens/relay-lens distance adjusting unit based on this error.

6. The light irradiation device according to claim 1, wherein said objective-lens/relay-lens distance adjusting unit is configured so as to drive said hologram recording medium in a direction to be toward or away from said objective lens.

7. The light irradiation device according to claim 1, wherein said objective-lens/relay-lens distance adjusting unit is configured so as to drive an optical system in a direction to be toward or away from said hologram recording medium.

8. The light irradiation device according to claim 1, wherein the focal position of light to be irradiated via said objective lens is set near a surface of said hologram recording medium.

9. The light irradiation device according to claim 1, wherein said ideal focal position is set to an upper layer side face of said recording layer.

10. The light irradiation device according to claim 1, wherein said ideal focal position is set to a position that is a layer side further upper than a lower layer side face of said recording layer according to adjustment of separated distance between said objective lens and said hologram recording medium.

11. A control method for a light irradiation device including a focus servo control unit, which includes a light source configured to irradiate light on a hologram recording medium having a recording layer where information is recorded with an interference pattern between signal light and reference light, a spatial light modulating unit configured to subject light from said light source to spatial light modulation to execute generation of at least said signal light or said reference light, and generation marker light at a position away from an optical axis within an input surface of the light from said light source, and a light irradiating unit configured to irradiate light subjected to spatial light modulation by said spatial light modulating unit on said hologram recording medium via a relay lens system and an objective lens, said focus servo control unit being configured to execute focus servo control so that an ideal focal position of light to be irradiated via said objective lens is set so as to satisfy a condition that distance between said ideal focal position and a hologram recording medium surface is smaller than a distance from said hologram recording medium surface to a lower layer side face of said recording layer, and also a focal position of light to be irradiated via said objective lens is constant at said ideal focal position, and an objective-lens/relay-lens distance adjusting unit configured to adjust distance between said objective lens and a relay lens disposed closer to said objective lens of relay lenses making up said relay lens system on the optical axis;

said method comprising:

receiving said marker light via said hologram recording medium; and controlling said objective-lens/relay-lens distance adjusting unit based on an error between an ideal light reception position of said marker light, and an actual light reception position of said marker light; and
wherein control is executed to set a distance between said objective lens and said relay lens to be constant.

\* \* \* \* \*